(12) United States Patent
Nguyen et al.

(10) Patent No.: US 12,271,360 B1
(45) Date of Patent: Apr. 8, 2025

(54) DYNAMIC INDEXING IN KEY-VALUE STORES

(71) Applicant: Amazon Technologies, Inc., Seattle, WA (US)

(72) Inventors: Natalie Thuy-Tien Nguyen, Bellevue, WA (US); Shyam Sunder Kumar, Seattle, WA (US); Pramod Ramchandra Khare, Bothell, WA (US); Joseph G Kim, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/598,727

(22) Filed: Mar. 7, 2024

(51) Int. Cl.
| | | |
|---|---|---|
| *G06F 16/00* | (2019.01) | |
| *G06F 16/22* | (2019.01) | |
| *G06F 16/2455* | (2019.01) | |
| *G06F 16/28* | (2019.01) | |
| *G10L 15/18* | (2013.01) | |
| *G10L 15/183* | (2013.01) | |
| *G10L 15/22* | (2006.01) | |

(52) U.S. Cl.
CPC ...... *G06F 16/2228* (2019.01); *G06F 16/2455* (2019.01); *G06F 16/285* (2019.01); *G10L 15/1815* (2013.01); *G10L 15/183* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 7,472,140 B2 * | 12/2008 | Agarwal | G06F 16/322 |
| | | | 707/999.203 |
| 11,080,332 B1 * | 8/2021 | Acheson | G06F 16/2379 |
| 2017/0344588 A1 * | 11/2017 | Horowitz | G06F 16/2228 |
| 2023/0114514 A1 * | 4/2023 | Miyahara | G06F 16/2237 |
| | | | 707/769 |

* cited by examiner

*Primary Examiner* — Anhtai V Tran
(74) *Attorney, Agent, or Firm* — Pierce Atwood LLP

(57) ABSTRACT

Devices and techniques are generally described for key-value store having improved support for indexing and querying. The proposed system can expand query functionality by adding compound indexing. In some implementations, compound index may allow multiple simple key-value store queries (e.g., for multiple event types) to be replaced with a single query. In some implementations, compound index may allow for query filtering otherwise unavailable for the key-value store. The system may return results from the compound query in timestamp order and with appropriate pagination. Indexing may be updated dynamically; for example, manually via a self-service portal and/or automatically in response to frequent query combinations. The expanded query functionality can improve the efficiency and usability of, for example, an event timeline system.

20 Claims, 20 Drawing Sheets

FIG. 2A

Event data schema 200

```
{
  "header": {
    "version": "2.1",
    "eventID": {
      "ID": "{uniqueEventID}"
    },
    "eventType": {
      "namespace": "{eventNamespace}",
      "name": "{eventName}"
    },
    "entities": {
      "deviceSerialNumber": {
        "type": "DeviceSerialNumber",
        "deviceType": "{DeviceType}",
        "dsn": "{dsn}"
      },
      "deviceAccount": {
        "type": "{DeviceAccount}",
        "id": "{deviceAccountID}"
      }
    }
  },
  "payload": {# defined by the event producer, encrypted
}
```

FIG. 2B

Key-value pair 210

{ key: EventType=Foo&EventId=ABC, value: event }

Index update 220

{ key: EventType=Foo&AID=123, value: [... , {eventId=ABC, timestamp=t1...}] }

FIG. 2E

Keys 270

{ key: EventType=Foo&DevType=Spkr&EventId=ABC }
{ key: EventType=Foo&DevType=Spkr&EventId=DEF }
{ key: EventType=Foo&DevType=Phn&EventId=GHI }
{ key: EventType=Bar&DevType=Spkr&EventId=JKL }
{ key: EventType=Bar&DevType=Phon&EventId=MNO }
{ key: EventType=Baz&DevType=Spkr&EventId=PQR }

Index update 280

{ key: 2ETandDT=FooBarSpker&UID=123, value: [
{eventType=Foo, DevType=Spkr, EventId=ABC, timestamp=t1},
{eventType=Foo, DevType=Spkr, EventId=DEF, timestamp=t2},
{eventType=Bar, DevType=Spkr, EventId=JKL, timestamp=t3} ]

DYNAMIC INDEXING IN KEY-VALUE STORES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A shows an example event data schema, according to embodiments of the present disclosure.

FIG. 2B shows an example of event data stored as a key-value pair with a corresponding index update, according to embodiments of the present disclosure.

FIG. 2E shows a third example of event data stored as a set of key-value pairs with a corresponding index update, according to embodiments of the present disclosure.

DETAILED DESCRIPTION

Figure 1:
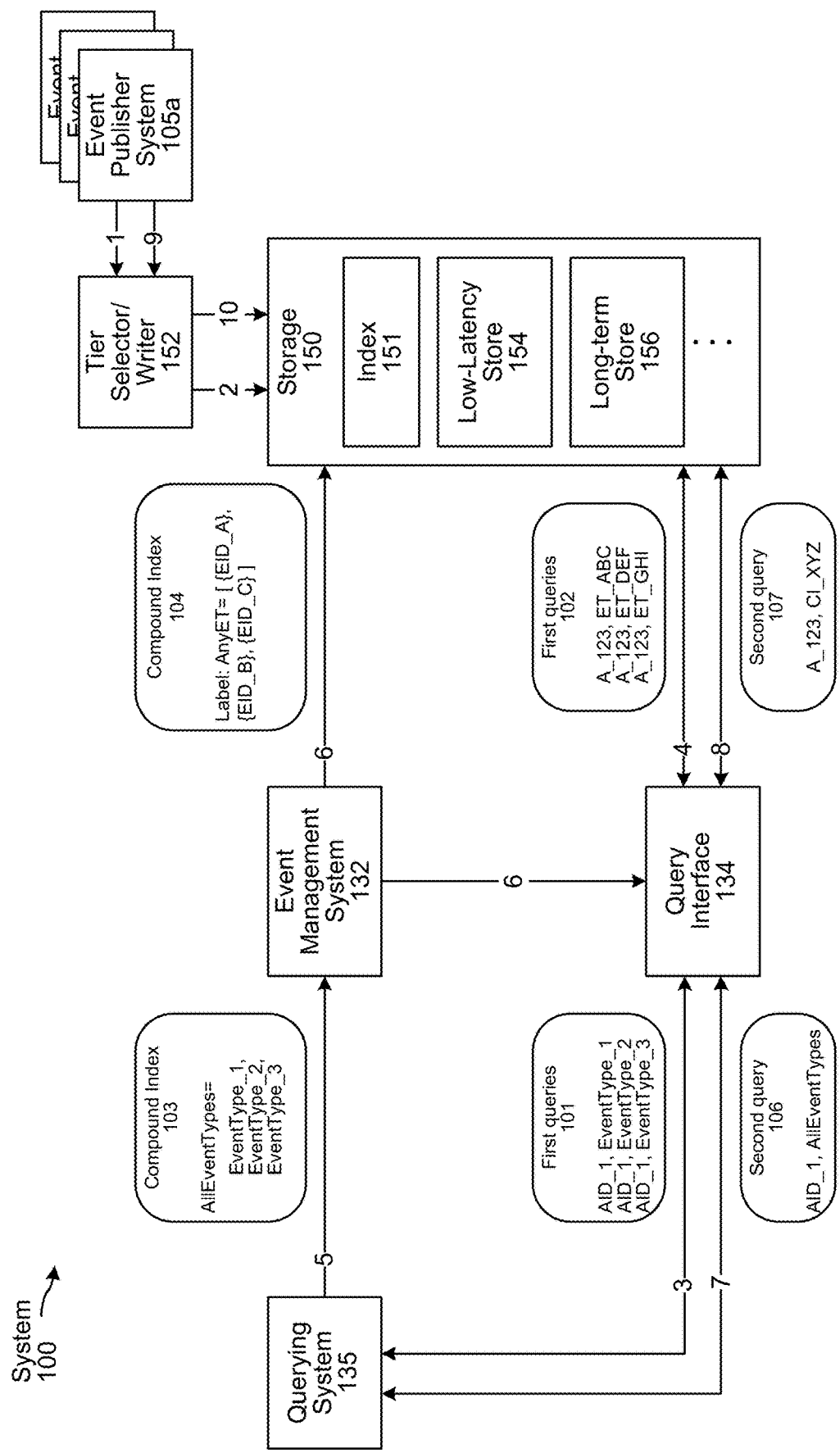
FIG. 1 is a conceptual diagram illustrating a dynamic indexing system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech-processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A user may interact with a virtual assistant system using a speech-controlled device such as a smart speaker, smartphone, automobile-based device, etc. The speech-controlled device may provide a voice user interface (VUI) that allows the user to utter natural language commands and receive responses in the form of synthesized (e.g., computer generated) speech. Through the device, the user may pose questions to the system, communicate with other people, and/or control other devices.

In some cases, a user may interact with multiple interconnected devices. For example, the user may utter commands to a first device to control content output by a second device's visual display. The user may use the first device to control smart home devices such as windows, locks, environmental controls, etc. In another example, the system may transfer content from one device to another device in response to the user's request and/or upon conditions being met (e.g., If This Then That (IFTTT) recipes, presence information, etc.).

The user may be able to engage in a dialog (e.g., a multi-turn interaction) with the virtual assistant system such that the response is based not only on the latest command but on previous commands and responses from that interaction as well. For example, a user may ask, "How much would it cost to fly business class to Seattle tomorrow?" The user may subsequently ask, "What about economy plus?" The system may use the previous questions and responses as context for processing the latest command.

Similarly, when the user later interacts with the system using a different device, the system may leverage additional context data from beyond the current interaction. For example, the system may use data resulting from interactions with other devices and/or components of the system. The virtual assistant system may retrieve relevant interaction data from an event timeline system that unifies access to timestamped event data across any number of devices and/or services provided by the virtual assistant system. This can avoid a disconnected user experience where the system appears to have no "memory" of previous interactions with the user.

The event timeline system may receive event data from various event publishers and store it for use by the virtual assistant system and/or other consumers. Due to the volume of interactions and a desire for fast retrieval, the event data may be stored in a non-relational database such as a key-value store. Queries to a key-value store may be processed quickly and efficiently because the data (e.g., the "value") can be located directly using the key; e.g., without searching the database. However, key-value stores may have limited query functionality. They may lack native support for indexing and complex query commands, which may limit the extent to which data may be filtered and sorted before accessing it. For example, in cases where a user wishes to query event data across multiple event types or devices, the user may have to query each event type or device individually. Thus, the results may be returned in query order rather than timestamp order. Furthermore, the results may exhibit pagination issues, such as showing all events for one event type but only a subset of another for the same time window.

Offered herein are systems and methods for dynamic indexing in key-value stores. The dynamic indexing system may facilitate the creation of compound indices manually via a self-service portal and/or automatically in response to frequently received queries. The system may use the indices to store and retrieve event data resulting from, for example, user interactions with a virtual assistant system. Users may create their own indices, including compound indices that allow the user to access event data for multiple keys (e.g., event types, device types, etc.) using a single query and receive properly filtered and sorted results. In some implementations, the system may automatically generate a compound index based on, for example, receiving frequently combined queries. The system may index and store subsequently received event data using the new, compound index and/or any other dynamically created indices.

In some implementations, the system may implement a tiered storage architecture. For example, incoming event data may be routed to various storage destinations including low-latency or long-term storage (e.g., for access by query consumers), or offline storage (e.g., for use in analytics and machine learning workflows). The system may perform destination routing based on one or more keys and/or indices associated with the event data as specified by a rule. In some implementations, the system may also route some or all event data to a subscription system for real-time or near real-time forwarding to subscription consumers.

These features may be implemented alone and/or in combination with each other and/or other features described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a dynamic indexing system 100, according to embodiments of the present disclosure. The system 100 may include one or more event publisher systems 105a, 105b, 105c, etc. (collectively "event publisher systems 105"). The event publisher systems 105 may be, for example, a user device 110 and/or a system component 120 as shown, for example, in FIGS. 4, 5A, and 5B. The event publisher systems 105 may publish events. An event may refer to a single or multi-turn interaction between a user and a user device 110. The interaction may further involve operations performed by one or more system components 120 of a natural language command processing system 400 as described further below with reference to FIG. 4. The published event data may include information about the event and operations performed by the system in response. Although operations of the system 100 are described using events and event data as an example application, the system 100 is not limited to any particular type of data, and may implement dynamic indexing with a variety of data and storage types.

Figure 5A:
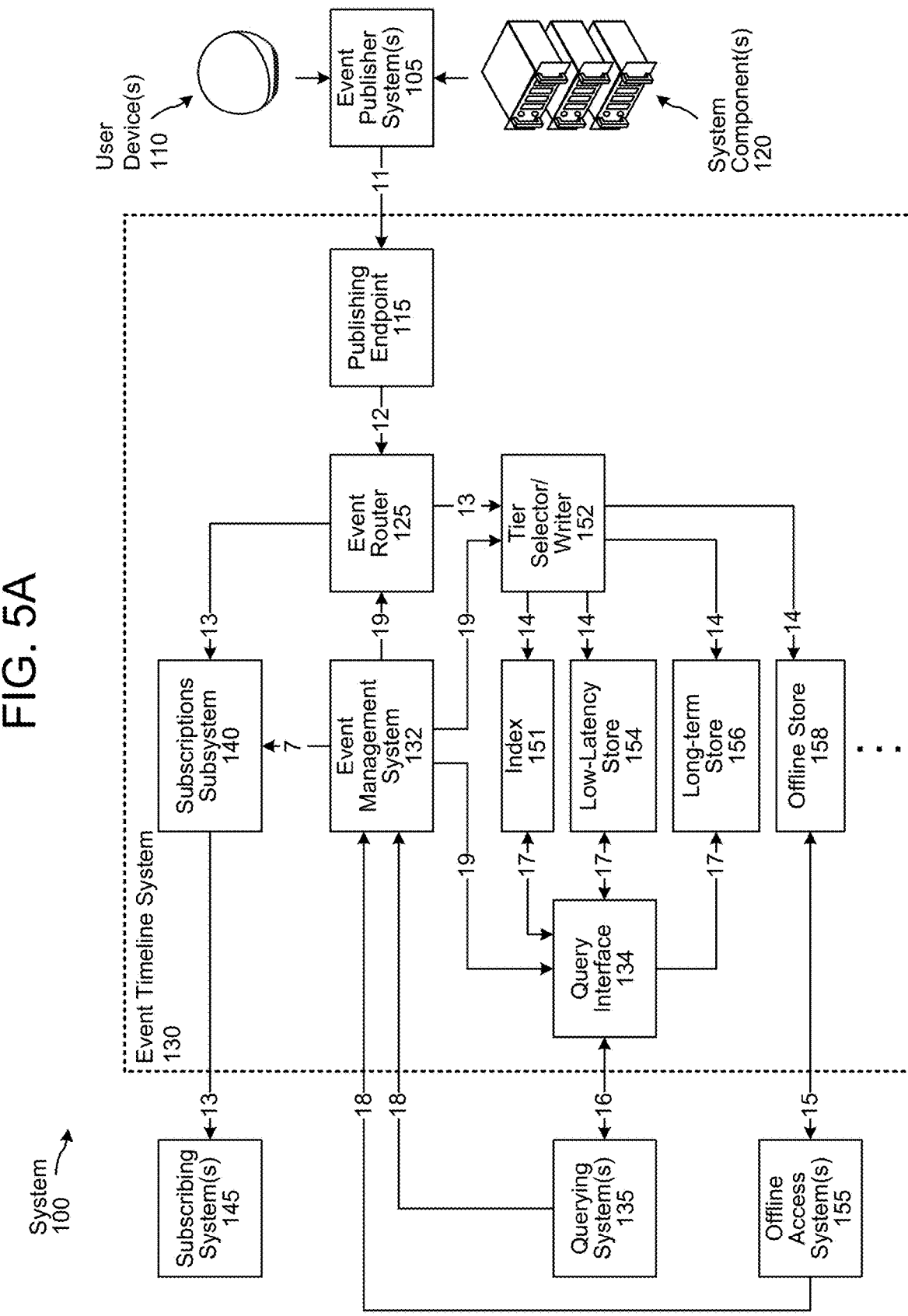
FIG. 5A is a conceptual diagram illustrating dynamic indexing in an event timeline system, according to embodiments of the present disclosure.

The event publisher system(s) 105 may publish events to the system 100, which may provide event data to various consumers; for example, as part of an event timeline system 130 as described in FIG. 5A. Consumers of the event data may include, for example, one or more querying systems 135 as shown in FIG. 1, one or more subscribing systems 145 as shown in FIG. 5A, and/or one or more offline access systems 155 as also shown in FIG. 5A.

The querying system 135 may be a user of the system 100 that may request particular event data using one or more queries. Although FIG. 1 shows a single querying system 135, the system 100 may serve multiple querying systems 135. The querying system 135 may use the event data to measure, diagnose, optimize, and/or otherwise monitor and/or control various components and/or services associated with the querying system 135.

The system 100 may be used to receive, process, and/or provide access to diverse event data. The event publisher systems 105 may be any service, device, or system that may generate and send event data to the system 100. Event data (e.g., corresponding to individual or multiple events) may represent point-in-time information related to an interaction with a service, user device 110, and/or system component 120. Examples of events may include user-initiated actions (e.g., button presses, clicks, on-screen selections, voice commands to a voice assistant, searches executed using a search engine, registering a device to an account and/or floorplan, etc.). In some further examples, events may include ambient and/or reported events such as motion detection events, sound detection events (e.g., acoustic events such as glass-breaking, dog barking, etc.), visual attention detection, etc. In yet other examples, events 112 may include proactive events such as recipe suggestions provided on a device (e.g., on a home screen or via audio), movie recommendations output on a display device, a smart light being turned on according to a user-defined routine, closing of a smart garage door upon detection that no activity is present within a home, turning off an oven after determining that no user is at home, etc. In still other examples, events may include derived/composite events such as a person detection or device-added events generated by a new Wi-Fi connection to an access point, a computer-vision detection, a geolocation detection, etc. In still further examples, events may include system events such as a media player failing to play a request (e.g., due to a transcoding error), a screen failing to render on a multi-media device, ASR hypothesis data, etc. In some further examples, events may include purchase events, webpage viewing events, e-books read, etc. In general, events may be timestamped such that a time-series of such events from a variety of different systems, devices, and/or services may be received. In some implementations, the data received, indexed, stored, and/or retrieved may be unrelated to events and may include any data that may be stored and/or retrieved using keys and indexing as described herein.

An event type may refer to a type or category of a particular event. For example, a speech input to a voice-controlled device, a touch event on a home screen of a touchscreen-enabled device, a motion event detected by a smart-home security camera, an acoustic event detected by a microphone, etc. Event ingestion represents the process of publishing events 112 and sending event data 122 to the system 100 (e.g., via a publishing endpoint 115 as shown in FIG. 5A). Event consumption is the process of accessing events from the system 100. An event owner is an entity that is responsible for registering and/or managing a certain event type in the system 100. Event owners are responsible for granting access to an event type, maintaining event type payload schema, etc. An event producer may be a service, system, or device ingesting events into the system 100. An event consumer is a service, system, or device reading events from the system 100. Examples of event consumers include mobile applications, autonomous robots, large-language-model (LLM)-based natural language processing systems (e.g., as described below with reference to FIGS. 7A through 7C), smart televisions, lights, cameras, and other IoT devices, etc. An event schema is the format of event data including the header and payload of the event (e.g., field definitions, per-field data types expected (e.g., int, string, etc.)). An example event data schema is described below with reference to FIG. 2A.

Figures 2C, 2D:
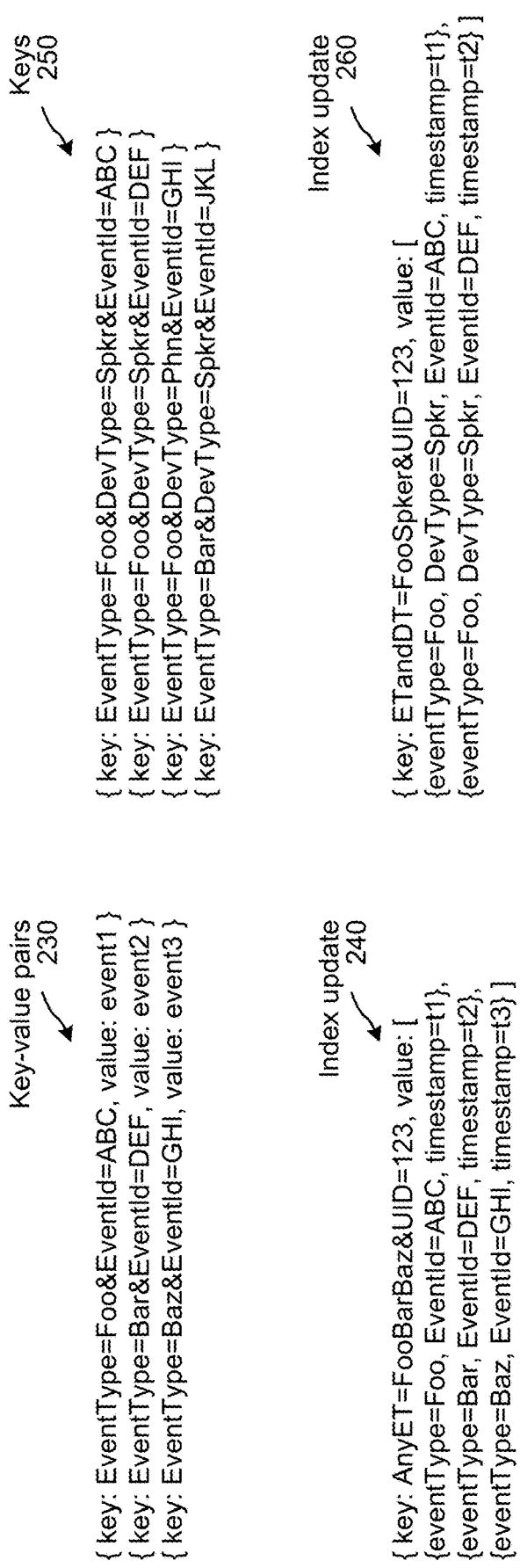
FIG. 2C shows a first example of event data stored as a set of key-value pairs with a corresponding index update, according to embodiments of the present disclosure.
FIG. 2D shows a second example of event data stored as a set of key-value pairs with a corresponding index update, according to embodiments of the present disclosure.

Event publisher systems 105 may register their event types (as described in further detail below) with the system 100. Thereafter, event data 122 generated by the event publisher systems 105 may be published to the system 100 using a publisher-subscriber asynchronous event messaging service (Step 1). For example, Apache Kafka or a similar synchronous messaging protocol may be used to asynchronously send event data 122. Such event messaging architectures are sometimes referred to as event-driven architectures (EDAs). In various examples, the system 100 may also provide a representational state transfer (REST) API through which data may be sent to the system 100. In any case, the system 100 may define one or more publishing endpoints for receiving event data 122. The publishing endpoint(s) may forward the event data 122 to a tier selector/writer 152 (e.g., via an event router 125 as shown in FIG. 5A). The tier selector/writer 152 may determine a data store for storing the event data. For example, the system may include data storage components 150, which may include a low-latency store 154 and/or long-term store 156, etc. Although, two data stores (low-latency store 154 and long-term store 156) are shown and described in FIG. 1, the system 100 may include any number of data stores having various access latency profiles and/or retention policies. The tier selector/writer 152 may write the event data to the appropriate data storage component (Step 2). In some implementations, the tier selector/writer 152 may generate an index update and store it in an index component 151 of (or associated with) the data storage components 150. The index component 151 may include hardware and or software configured to store data that enables the retrieval of event data based on attributes of the event data such as an account identifier (e.g., user identifier), device type, event type, etc. Other examples of attributes may include device identifier, utterance identifier, dialog identifier, marketplace, application identifier, resource identifier, skill identifier, etc. The index component 151 may also store compound indices that allow the data storage components 150 to index and retrieve event data based on complex combinations of attributes. For example, a compound index may be based on an "OR" operation in which event data corresponding either a first attribute or a second attribute, etc. are combined. An example "OR" operation may include a query for event data for multiple different event types for a particular account identifier within a particular time window. In another example, a compound index may be based on an "AND" operation in which only event data that corresponds to each of two different attributes are to be returned. An example "AND" operation may include a query for event data corresponding to a certain event type and a certain device type (e.g., returning only speech interactions occurring on smart speaker devices, but not excluding acoustic events received on a smart speakers or speech interactions occurring on smart phone devices, etc.). An example data schema of event data is shown in FIG. 2A. An example key-value pair for storing event data and a corresponding index update is shown in FIG. 2B. FIGS. 2C through 2E, described in further detail below, illustrate multiple key-value pairs corresponding to an "OR" an "AND", and a combination of "AND" and "OR" operations, respectively, as well as their corresponding index updates.

The system 100 may provide a query interface 134 to enable the query system(s) 135 to retrieve specific event data from the storage provided by the system 100. In an example operation, the querying system 135 may submit first queries 101 for event data (Step 3). In some implementations, the data storage components 150 may store event data as, for example, key-value pairs. Key-value pairs may be retrieved quickly and efficiently relative to, for example, relational databases, and may also provide flexibility with respect to the content and format of the data stored. A key-value store may not, however, support indexing or complex queries. Furthermore, a typical index component 151 may be limited to storing only simple indices that, for example, index the key-value pairs based on individual attributes. Thus, the data storage components 150 may have each event type indexed individually. In the example shown in FIG. 1, if the querying system 135 wishes to retrieve event data corresponding to three different event types (e.g., EventType_1, EventType_2, EventType_3, etc.) and a particular account identifier (e.g., AID_1), the querying system may have to submit three separate queries. The query interface 134 may receive the queries and submit first queries 102 to the data storage components 150 for retrieving the relevant key-value pairs (Step 4). In some implementations, the query interface 134 may translate the first queries 101 (e.g., AID_1 becomes A_123 and EventType_1 becomes ET_ABC). This may abstract the structure and/or labeling of the data in the data storage components 150 to provide the querying system 135 with a more intuitive interface and/or provide a level of security/privacy. The data storage components 150 may handle each query by using the index component 151 to locate relevant event data based on each queried event type individually. The query interface 134 may return the relevant event data to the querying system.

The dynamic indexing system 100 may allow the querying system 135 to create compound indices that may enable the querying system 135 to, for example, retrieve event data corresponding to multiple event types with a single query. The event timeline system 130 may include an event management system 132. The event management system 132 may be a combination of hardware and/or software executing on, for example, one or more system components 120 (e.g., which may be the same or different from the system component(s) 120 providing event data 122). The event management system 132 may provide a portal (e.g., available via the Internet and/or one or more APIs) through which users (e.g., querying systems 135, offline access systems 155, and/or subscribing systems 145) may configure certain aspects of the event timeline system 130. For example, a querying system 135 may configure the way event data 122 is stored (e.g., in which data store 154, 156, and/or 158, etc.), indexed (including the use of compound indices), and/or delivered.

In some implementations and as described further herein, a user (e.g., a querying system 135) may create a compound index manually; for example, by submitting a request to the event management system 132. In some implementations, the system 100 may create a compound index automatically; for example, based on repeatedly receiving a particular set of queries. FIG. 1 describes operations related to a user-implemented compound index. For example, the querying system 135 may define a compound index 103 that combines event types with a new label "AllEventTypes." The AllEventTypes label may include the event types "EventType_1", "EventType_2", "EventType_3", etc. The querying system 135 may send a request to create the compound index 103 to the event management system 132 (Step 5). The event management system 132 may be a component that creates and/or translates the compound index and sends instructions to the query interface 134, tier selector/writer 152, and/or the data storage components 150 defining rules dictating when and how the compound index should be applied for received event data and used to retrieve queried event data as well as a label (e.g., identifier) corresponding to the compound index. In some implementations, the event management system 132 may translate the compound index 103 to compound index 104 (e.g., the AllEventTypes label may be assigned a unique compound index identifier "AnyET" and the event types to "EID_A," "EID_B," etc.). The event management system 132 may send data representing details of the compound index 104 to the query interface 134, the data storage components 150, and/or the tier selector/writer 152 (Step 6). The tier selector/writer 152, data storage components 150, and/or query interface 134 may apply the compound index to subsequently received event data and use the compound index to retrieve the relevant event data.

With the compound index implemented, the querying system 135 may query multiple event types using the new compound index label (Step 9). Step 9 may be similar to Step 1. When the system 100 receives new event data from event publisher systems 105, the tier selector/writer 152 may determine a particular data store of the data storage components 150 for storing the event data (Step 10). Step 10 may be similar to Step 2, however, the tier selector/writer 152 may further determine whether the event data corresponds to any rules (e.g., operations) defining any compound indices that have been defined. If so, the tier selector/writer 152 may generate one or more index updates corresponding to the compound indices that apply, as well as any relevant simple index updates. The tier selector/writer 152 may send the index updates to the index component 151, which may allow the query interface 134 to retrieve event data using the label assigned to the compound index.

The querying system 135 may send a second query 106 for AllEventTypes corresponding to the account identifier AID_1 (Step 7). The query interface 134 may translate and/or forward the second query 107 to the data storage components 150, which may return the relevant event data (Step 8). The system 100 may return the event data in timestamp order and with proper pagination. In some implementations, the querying system 135 may send multiple event queries as in Step 3 (e.g., the first queries 101) and the query interface 134 may determine that the set of queries corresponds to a compound index, and translate the set of queries into a single query corresponding to the compound index (e.g., once a compound index is defined, the query interface 134 may translate a set of queries similar to the first queries 101 to a single query and corresponding to the appropriate compound index similar to the second query 107).

An event timeline system 130 using compound indexing is described in further detail below with reference to FIG. 5A. FIGS. 2A through 2E describe examples of an event data schema, a key-value pair and a corresponding index update, multiple key-value pairs and corresponding index updates for a query corresponding to an "OR" operation and for a query corresponding to an "AND" operation.

FIG. 2A shows example event data schema 200, according to embodiments of the present disclosure. The event data 122 (e.g., an event object) may be split into Header fields and Payload. The Header and/or Payload field may correspond to a portion or portions of the value of a key-value pair. Header fields may describe the event type and provide tools to filter, index, and/or route the event to the appropriate consumers. The Payload may include the event data. The schema 200 may be controlled by the event publisher systems 105 and provided to the event timeline system 130 during registration.

The Header may include one or more fields such as eventType, an entities map used to transmit resources related to the event data, (e.g., identifier data such as a unit identifier data, account identifier data, device identifier data, etc.), and the timestamp for the event data. The Header may be extensible with fields added through a natural language processing system (e.g., the system 400) and/or companion application to support future use cases.

In some implementations, the Header filed may additional include a sensitive data tag. The sensitive data tag may be used for compliance and/or in order to maintain proper custody of sensitive data. For example, a sensitive data tag may indicate that a particular event includes child data or health data to ensure that such event data are not transmitted outside of a local network.

Upon registration, an event publisher system 105 may define the event type in the payload, provide the schema for the event type, identify any event processing and/or encryption for the event type, identify storage and/or latency requirements for the event, and/or whether the event type will be accessible via synchronous query-based API, asynchronous event-driven API, or both. The event timeline system 130 may provide a registration portal (e.g., to the event management system 132) for event publisher systems 105 to register their own event types. Event types may be associated with different configuration data defining such information as storage tiers for the event type (e.g., low-latency store 154, long-term store 156, offline store 158, etc.). The event timeline system 130 may not permit custom one-off modification for individual event types, but may instead enable a list of common re-usable features across all event types in order to standardize event type data and make it easier to consume by consumer systems/services. As an example, for event types that are stored in offline store 158, the event timeline system 130 may build this support in a generic fashion as an offline storage target/destination configuration for an event type, rather than building the offline store 158 with explicit hard coding for certain event types. The event timeline system 130 may provide support for multiple configurations ranging from event-type and/or ownership metadata (e.g., in Header), online storage tiers-configuration data (e.g., enabled storage tiers), internal configurations per-event type (such as retention policy, encryption configurations (e.g., Keymaster vs. Key Management Service (KMS) and encryption keys), offline bulk storage configuration data such as destination storage type (e.g., Datamart vs. S3 instances, etc.), offline encryption configuration data (e.g., KMS keys), subscription support configuration data (e.g., limitations on targets, etc.), event payload schema reference (e.g., payload reference to schema stored at remote location), etc.

FIG. 2B shows an example of event data 122 stored as a key-value pair 210 with a corresponding index update 220, according to embodiments of the present disclosure. In some implementations, when the event data 122 is stored in one of the data stores, it may be stored in a form such as the example key-value pair 210 shown in FIG. 2B. An event publisher system 105 may define a schema for the event data 122. A value-of the key-value pair may have a schema corresponding to the example schema 200 shown in FIG. 2A.

In an example operation, the event timeline system may receive a published event 112 corresponding to and event type "Foo", an event identifier "ABC", and an account identifier "123." E.g., the primary key may be the event identifier ("EventID") and the secondary key may be the event type ("EventType"). The event timeline system 130 may retrieve the key-value pair using the key(s) to obtain the event data stored as the value.

In some implementations, the event timeline system 130 may be able to implement a simple index. In such cases, the event timeline system 130 may generate an index update 220; for example, in the form of another key-value pair. The index update 220 may allow the event timeline system 130 to retrieve the key-value pair using the account identifier ("AID"). By doing so, the event timeline system 130 may obtain the event identifier from the value of the index update 220, and use it to retrieve the key-value pair 210 (as well as other key-value pairs corresponding to the account identifier).

FIG. 2C shows an example of event data 122 stored as a set of key-value pairs 230 with a corresponding index update 240, according to embodiments of the present disclosure. In this example, the compound index may correspond to an "OR" operation, in which query corresponds to different attributes of an attribute category (e.g., first, second, and third event types). The event timeline system 130 has received three published events 112. The first event corresponds to event type "Foo", the second event corresponds to event type "Bar", and the third event corresponds to event type "Baz". Using a simple index such as would include the index update 220 shown in FIG. 2B, the indices would have separate keys corresponding to each event type. Lacking the capability to perform complex queries, the event timeline system 130 may not be able to retrieve the event data 122 for the different event types based on a single query.

To improve the efficiency and/or usability of the event timeline system 130, the event timeline system 130 may implement a compound index to create a key with which all event types for a particular account identifier may be retrieved. The event timeline system 130 may create a new identifier for the compound index (e.g., "FooBarBaz") to act as a key for the index update 240. The event timeline system 130 may create a value for the index update 240 that represents an operation with respect to attributes of the event data. In the example shown in FIG. 2C, the operation is "eventType=Foo OR eventType=Bar OR eventType=Baz"; that is, a query for key "FooBarBaz" may return event data 122 corresponding to the account identifier and any event type specified in the value field of the index update 240. Thus, to retrieve event data corresponding to these event types, a querying system 135 can submit a single query corresponding to the identifier FooBarBaz.

In some implementations, the query interface 134 may provide querying systems 135 with abstraction of the of event data 122 as it is stored. For example, the query interface 134 may provide a portal or web interface via which a querying system 135 may submit requests for event data 122. The query interface 134 may allow the querying system 135 to retrieve event data 122 by various attributes and/or attribute categories (e.g., an attribute category may be device types and an attribute in that category may correspond to a smart phone). The querying system 135 may not see the indices and/or identifiers created for those indices; rather, the query interface 134 may translate requests from the querying systems 135 into the particular identifier/index implemented by the event timeline system 130.

FIG. 2D shows an example of event data 122 stored as a set of key-value pairs having keys 250 with a corresponding index update 260, according to embodiments of the present disclosure. In this example, the compound index may correspond to an "AND" operation, in which query corresponds to a first attribute of a first attribute category and a second attribute of a second attribute category (e.g., a query to return key-value pairs represent both a particular event type and a particular device type). The event timeline system 130 has received four published events 112 corresponding to the keys 250 shown in FIG. 2D. The first event has an event type "Foo" and a device type "Spkr" corresponding to a smart speaker device type (e.g., such as one of the speech-detection devices 110*a* shown in FIG. 12). The second event also has an event type "Foo" and a device type "Spkr". The third event has an event type "Foo" but a device type "Phn" corresponding to a smartphone (e.g., such as the smart phone 110*b* shown in FIG. 12). The fourth event has an event type "Bar" and a device type "Spkr."

In the example shown in FIG. 2D, the system 100, either automatically or by request of a querying system 135, may implement a compound index to be applied to all key-value pairs corresponding to the event type "Foo" and the device type "Spkr." Thus, the compound index may apply to the first and second events, but not the third and fourth: the third event has the wrong device type, and the fourth event has the wrong event type. The third and fourth events may still be stored by the data storage components 150, but may have different indexing (or no indexing) applied. The system 100 may generate the index update 260 indicating that the first event and the second event should be indexed according to the compound index "ETandDT" (e.g., for "event type AND device type"). Thus, the querying system 135 may retrieve these key-value pairs with a single query and without additional filtering steps, which may not otherwise be supported by the data stores of the data storage components 150.

FIG. 2E shows an example of event data 122 stored as a set of key-value pairs having keys 270 with a corresponding index update 280, according to embodiments of the present disclosure. In this example, the compound index may correspond to a combination of "AND" and "OR" operations, in which query corresponds to first and second possible attributes of a first attribute category and a third attribute of a second attribute category. Such a query would be fore key-value pairs corresponding to device type "Spkr" and event type "Foo" or "Bar". The event timeline system 130 has received six published events 112 corresponding to the keys 270 shown in FIG. 2E. The system 100, either automatically or by request of a querying system 135, may implement a compound index to be applied to all key-value pairs corresponding to the event types "Foo" and "Bar" and the device type "Spkr." Thus, the compound index may apply to the first, second, and fourth events, but not the third, fifth, or sixth. The third, fifth, and sixth events may still be stored by the data storage components 150, but may have different indexing (or no indexing) applied. The system 100 may generate the index update 280 indicating that the first event and the second event should be indexed according to the compound index "2ETandDT" (e.g., for "two event types AND device type"). Thus, the querying system 135 may retrieve these key-value pairs with a single query and without additional filtering steps, which may not otherwise be supported by the data stores of the data storage components 150.

Figure 3A:
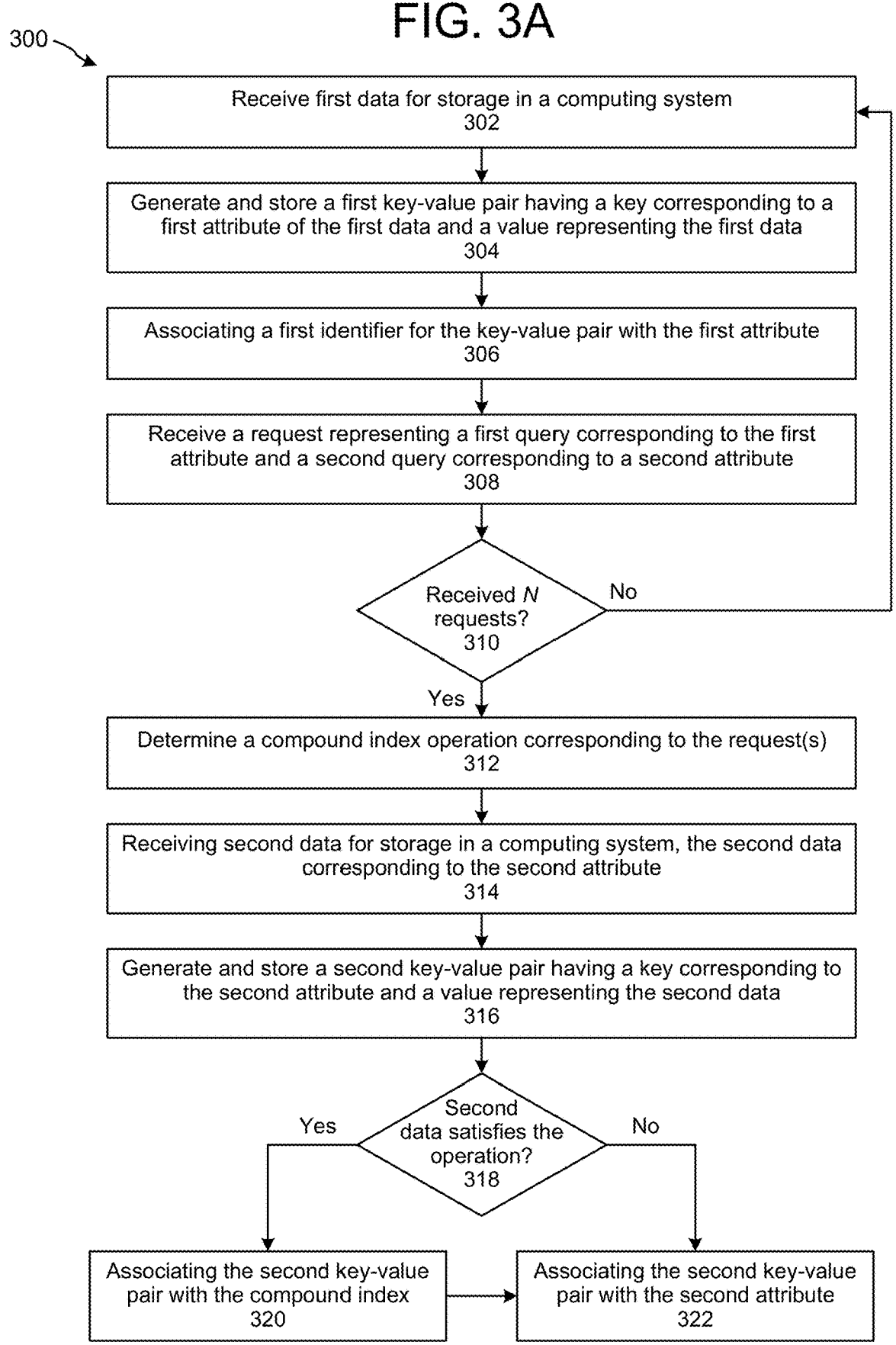
FIG. 3A is a flowchart illustrating an example method for automatic creation of a compound index, according to embodiments of the present disclosure.

FIG. 3A is a flowchart illustrating an example method 300 for automatic creation of a compound index, according to embodiments of the present disclosure. The system 100 may automatically generate a compound index to represent a set of queries (or a filtered query) if it determines that it has received the same set if queries/filtered query N times, where N may be any natural number (e.g., integers greater than zero). The method 300 may include receiving (302) first data for storage in the system 100. The first data may be, for example, a published event 112 received by the publishing endpoint 115. The system 100 may generate (304) a key-value pair representing the first data, where the key corresponds to a first attribute of the first data (e.g., an event type, device type, etc.) and includes an event identifier uniquely identifying the event (e.g., a first identifier) and/or the key-value pair. The value of the key-value pair may represent some aspect of the first data and may include all of the first data. The method 300 may include associating (306) the first identifier with the first attribute. The system 100 may update an index (e.g., the index component 151) with the association. This may enable a querying system 135 to retrieve the key-value pair using a query corresponding to the first attribute.

The method 300 may include receiving (308) a request representing a first query corresponding to the first attribute and a second query corresponding to a second attribute. The first attribute and the second attribute may both belong to a same attribute category (e.g., representing different event types, different device types, etc.). In some implementations, the system 100 may receive the request in the form of one or more queries. In some implementations, the system 100 may receive requests for data and translate them (e.g., using the query interface 134) into queries for the data storage components 150. The method 300 may include determining (310) whether it has received the same or similar request N times. If not, the system 100 may return to the stage 302 and continue receiving data for storage. If the system 100 has received N queries ("Yes" at 310), the system 100 may determine (312) an operation that corresponds to the request. For example, if the request is for data corresponding to one of the first attribute or the second attribute, the operation may represent an "OR" operation (e.g., the first attribute OR the second attribute). If the request is for data corresponding to both the first attribute and the second attribute, the operation may represent an "AND" operation (e.g., the first attribute AND the second attribute). The system 100 may assign a label to the compound index. When data is received that satisfies the operation, the system 100 may generate a new key-value pair and update the index component 151 to associate the new key-value pair with the label. Querying systems 135 and/or the query interface 134 may be able to retrieve data (e.g., including the key-value pair) corresponding to the compound index using the label.

The method 300 may include receiving (314) second data for storage in the system 100. The system 100 may determine that the second data corresponds to the second attribute. The system 100 may generate (316) a second key-value pair representing the second data, where the key corresponds to the second attribute and includes a unique identifier, and the value of the key-value pair represents some or all of the second data. The method 300 may include determining (318) whether the second data satisfies the operation determined at the stage 312. If so ("Yes" at 318), the method 300 may include associating (320) the unique identifier with the label (e.g., corresponding to the compound index). The method 300 may include associating (322) the unique identifier with the second attribute. If the second data does not satisfy the operation ("No" at 318), the method 300 may skip the stage 320 and proceed directly to the stage 322. The system 100 may update an index (e.g., the index component 151) with the association(s). This may enable a querying system 135 to retrieve the second key-value pair (and any other key-value pairs corresponding to the compound index) by referencing the compound index.

Figure 3B:
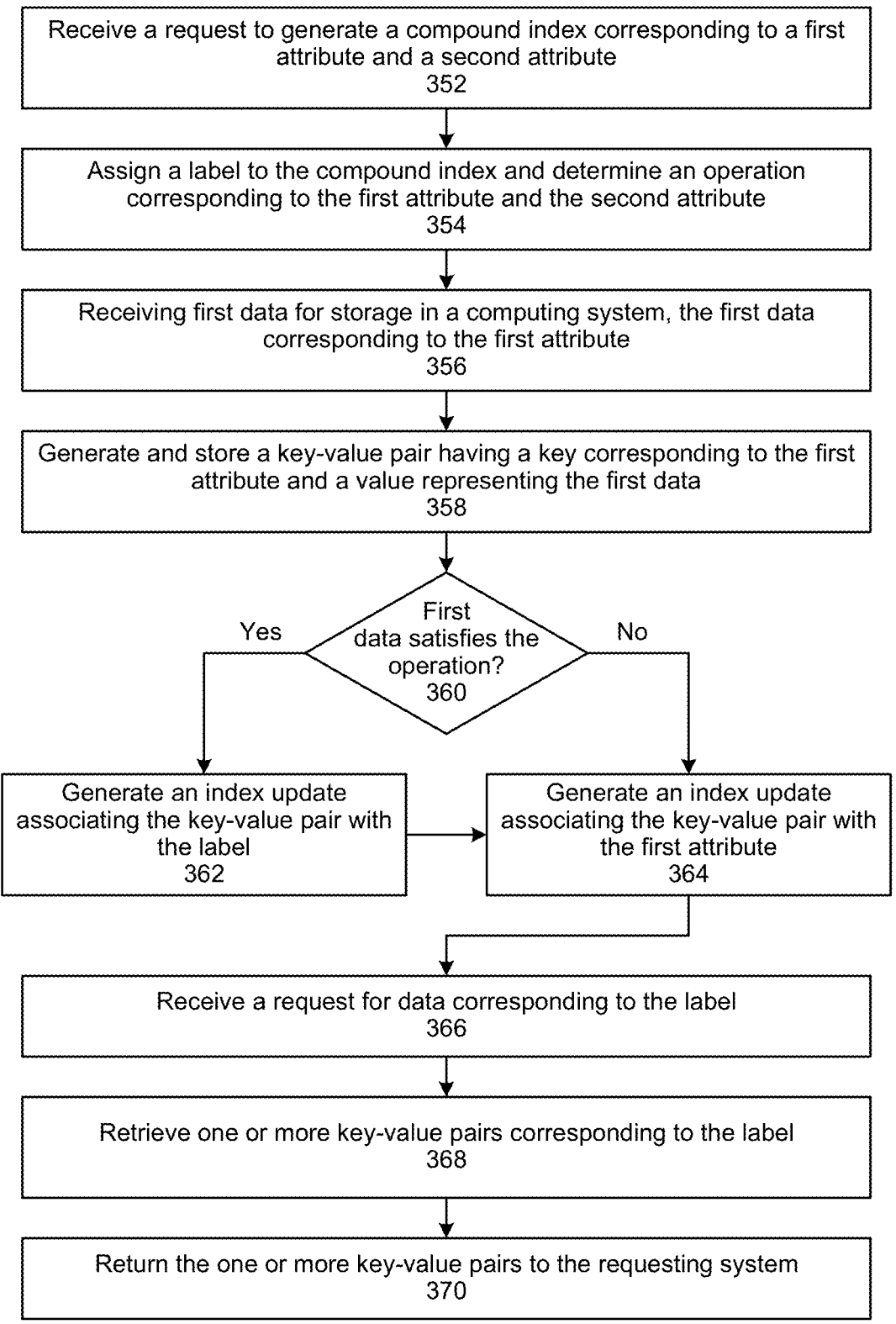
FIG. 3B is a flowchart illustrating an example method for manual creation of a compound index, according to embodiments of the present disclosure.

FIG. 3B is a flowchart illustrating an example method 350 for manual creation of a compound index, according to embodiments of the present disclosure. The system 100 may allow a user (e.g., a querying system 135) to create a compound index manually. The querying system 135 may refer to the compound index when requesting data from the system 100. Such a request may be more efficient and have more easily interpretable results than attempting multiple queries and/or filtering in a data store that may lack support (native or otherwise) for complex queries.

The method 350 may include receiving (352) a request to generate a compound index corresponding to a first attribute and a second attribute. The first and second attributes may belong to the same or different attribute categories. The method 350 may include determining (354) an operation corresponding to compound index may (e.g., an "OR" operation that returns results corresponding to the first attribute OR the second attribute, or an "AND" operation that returns results corresponding to both the first attribute AND the second attribute). The system 100 may assign a label to the compound index that may be used to invoke it when retrieving data from the data store.

The method 350 may include receiving (356) first data for storage in the system 100. The system 100 may determine that the first data corresponds to the first attribute. The method 350 may include generating and storing (358) a key-value pair having a key corresponding to the first attribute and a unique identifier, and a value representing the first data. The method 350 may include determining (360) whether the first data satisfies the operation previously determined for the compound index. If so ("Yes" at 360), the method 350 may include generating (362) an index update associating the unique identifier of the key-value pair with the label (e.g., corresponding to the compound index) and updating the index component 151 with the association. The method 350 may include generating (364) another index update associating the unique identifier of the key-value pair with the second attribute, and updating the index component 151. If the first data does not satisfy the operation ("No" at 360), the method 350 may skip the stage 362 and proceed directly to the stage 364.

The associations stored in the index component 151 may allow a querying system 135 to retrieve the key-value pair (and any other key-value pairs corresponding to the compound index) by referencing the label. For example, the method 350 may include receiving (366) a request for data corresponding to the label. The query interface 134 may use the index component 151 to identify data corresponding to the label in the data storage components 150. The method 350 may include retrieving (368), using identifiers determined from the index, one or more key-value pairs corresponding to the label. The method 350 may include returning (370) the one or more key-value pairs to the querying system 135.

In some implementations, some or all stages of the method 300 and the method 350 may be combined. In various implementations, the method 300 and/or the method 350 may include more, fewer, and/or different stages. Unless otherwise specified, some stages may be repeated, skipped, and/or occur in different orders and/or execute partially or fully in parallel.

Figure 4:
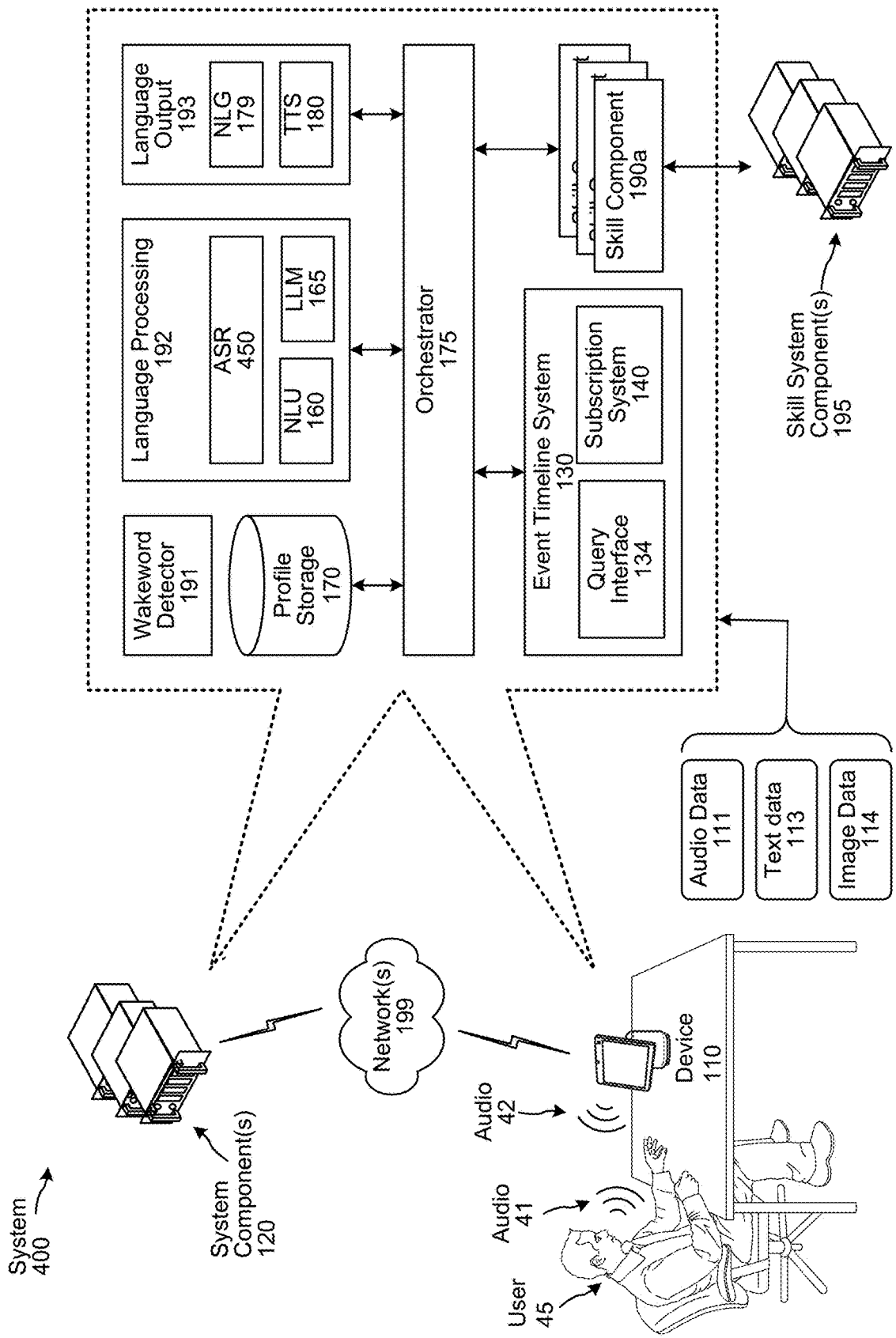
FIG. 4 illustrates a natural language command processing system publishing and consuming event data, according to embodiments of the present disclosure.

FIG. 4 illustrates an example integration of the event timeline system 130 in a natural language command processing system 400, according to embodiments of the present disclosure. The natural language command processing system 400 may perform the operations of a virtual assistant system that receives spoken commands from a user 45 (e.g., received as audio 41), performs actions, and/or responds via synthesized speech (e.g., output as audio 42). The user device 110 and/or system component(s) 120 may publish and/or consumer event data 122 using the event timeline system 130.

The system 400 may operate using various components as illustrated in FIG. 4. The various components may be located on same or different physical devices; for example, the various components may reside on one or more user devices 110 and/or one or more system components 120. In some implementations, one or more components may be shared and/or duplicated between a user device 110 and a system component 120. The user device(s) 110 and system component(s) 120 may communicate directly (e.g., via one or more wired and/or wireless connections) and/or across one or more computer network(s) 199 as previously described. The user device 110 may include audio capture component(s), such as a microphone 1020 or array of microphones. The user device 110 may capture audio 41 (e.g., human speech, acoustic events, etc.) and create corresponding audio data 111. Once speech is detected in the audio data 111, the user device 110 may determine if the speech is directed at the natural language command processing system 400. In at least some embodiments, such determination may be made using a wakeword detection component 191. The wakeword detection component 191 may be configured to detect various wakewords. In at least some examples, each wakeword may correspond to a name of a different digital assistant. An example wakeword/digital assistant name is "Alexa." In another example, input to the system may be in form of text data 113, for example as a result of a user typing an input into a user interface of the user device 110. Other input forms of input may include indication that the user has pressed a physical or virtual button on the user device 110, the user has made a gesture, etc. The user device 110 may also capture images using camera(s) 918 of the user device 110 and may send image data 114 representing those image(s) to the system component(s). The image data 114 may include raw image data or image data processed by the user device 110 before sending to the system component(s) 120. The image data 114 may be used in various manners by different components of the system to perform operations such as determining whether a user is directing an utterance to the system, interpreting a user command, responding to a user command, etc.

The wakeword detection component 191 of the user device 110 may process the audio data 111, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data 111, is analyzed to determine if specific characteristics of the audio data match preconfigured acoustic waveforms, audio signatures, or other data corresponding to a wakeword.

Thus, the wakeword detection component 191 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 191 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 191 and/or input is detected by an input detector, the user device 110 may "wake" and begin processing the audio data 111 and/or transmitting the audio data 111, to the system component(s) 120. The audio data 111 may include data corresponding to the wakeword; in other embodiments, the portion of the audio corresponding to the wakeword is removed by the user device 110 prior to processing/transmitting. In the case of touch input detection or gesture-based input detection, the audio data 111 may not include a wakeword.

In some implementations, the system 400 may include more than one system component(s) 120. The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 191 may result in sending audio data to a first system component(s) for processing while detection of the wakeword "Computer" by the wakeword detector may result in sending audio data to a second system component(s) for processing. The system 400 may have a separate wakeword and system for different skills/systems (e.g., "Dungeon Adventure" for a game play skill/system component(s)) and/or such skills/systems may be coordinated by one or more skill component(s) 190 of one or more system component(s) 120.

Upon receipt by the system component(s) 120, the audio data 111 may be sent to an orchestrator component 175. The orchestrator component 175 may include memory and logic that enables the orchestrator component 175 to transmit various pieces and forms of data to various components of the system, as well as perform other operations as described herein.

The orchestrator component 175 may send the audio data 111 to language processing components 192. The language processing components 192 (sometimes also referred to as a spoken language understanding (SLU) components) includes an automatic speech recognition (ASR) component 150 and a natural language understanding (NLU) component 160. The ASR component 450 may transcribe the audio data 111 into text data or some other representation of the linguistic content of the input speech. The text data output by the ASR component 450 represents one or more than one (e.g., in the form of an N-best list) ASR hypotheses representing speech represented in the audio data 111. The ASR component 450 interprets the speech in the audio data 111 based on a similarity between the audio data 111 and pre-established language models. For example, the ASR component 450 may compare the audio data 111 with models for sounds (e.g., acoustic units such as phonemes, senons, phones, etc.) and sequences of sounds to identify words that match the sequence of sounds of the speech represented in the audio data 111. The ASR component 450 sends the text data generated thereby to an NLU component 160, via, in some embodiments, the orchestrator component 175. The text data sent from the ASR component 450 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 450 is described in greater detail below with regard to FIG. 6.

The language processing components 192 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the user device 110, the system component(s) 120, a skill component 190, a skill system component(s) 195, etc.) to execute the intent. For example, if the text data corresponds to "play the 5th Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the user device 110. In another example, if the text data corresponds to "turn off the lights," the NLU component 160 may determine an intent that the system turn off lights associated with the user device 110 or the user 45. However, if the NLU component 160 is unable to resolve the entity—for example, because the entity is referred to by anaphora such as "this song" or "my next appointment"—the language processing components 192 can send a decode request to other language processing components for information regarding the entity mention and/or other context related to the utterance. The language processing components 192 may augment, correct, or base results data upon the audio data 111 as well as any data received from the other language processing components.

The NLU component 160 may return NLU results data (which may include tagged text data, indicators of intent, etc.) back to the orchestrator component 175. The orchestrator component 175 may forward the NLU results data to a skill component(s) 190. If the NLU results data includes a single NLU hypothesis, the NLU component 160 and the orchestrator component 175 may direct the NLU results data to the skill component(s) 190 associated with the NLU hypothesis. If the NLU results data includes an N-best list of NLU hypotheses, the NLU component 160 and the orchestrator component 175 may direct the top scoring NLU hypothesis to a skill component(s) 190 associated with the top scoring NLU hypothesis. The system 400 may also include a post-NLU ranker 865 which may incorporate other information to rank potential interpretations determined by the NLU component 160. The NLU component 160, post-NLU ranker 865 and other components are described in greater detail below with regard to FIGS. 5A and 5B.

In some implementations, the system 400 may include an LLM 165 in addition to, or instead of, the NLU component 160. Some natural language processing flows may employ one or more large language models (LLMs) in order to process natural language requests. An LLM is an artificial intelligence (AI) model that may be capable of processing and generating text based on the latent information it has learned from vast amounts of training data. The term "large" may refer to the size of these models in terms of the number of parameters or weights, which are the values that the model learns during training to make predictions and generate text. LLMs may have millions, billions (or even more) parameters, which enable such models to capture complex patterns and nuances in language that, in turn, allow the models to process and generate more natural-sounding text (relative to previous approaches). Examples of LLMs include the generative pretrained transformer models (e.g., GPT-3, GPT-4), Pathways Language Model (PaLM), Large Language Model Meta Artificial Intelligence (LLaMA), and even non-generative examples such as BERT (bidirectional encoder representations from Transformers), etc. The system 400 may use the LLM to, for example, parse a user input, generate a query to the event timeline system 130, and/or generate a natural language response to the user input.

The natural language command processing system 400 may include, or interact with, the event timeline system 130. The system 400 may, when processing a user input, query the event timeline system 130 for event data 122. The system 400 may use the event data 122 to, for example, create a prompt for the LLM 165 and/or to perform NLU functions such as classifying intents, recognizing entities, and/or resolving entities. The system 400 may use the compound indexing features described herein to retrieve relevant event data 122 from the various data stores more efficiently. Additionally or alternatively, the user 45 may use the system 400 to access the event timeline system 130; for example, to monitor, diagnose, repair, and/or update various components and/or services of the system 400.

A skill component 190 may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the user device 110, to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill system component(s) 195 may communicate with a skill component(s) 190 within the system component(s) 120 and/or directly with the orchestrator component 175 or with other components. A skill system component(s) 195 may be configured to perform one or more actions. An ability to perform such action(s) may sometimes be referred to as a "skill." That is, a skill may enable a skill system component(s) 195 to execute specific functionality in order to provide data or perform some other action requested by a user. For example, a weather service skill may enable a skill system component(s) 195 to provide weather information to the system component(s) 120, a car service skill may enable a skill system component(s) 195 to book a trip with respect to a taxi or ride sharing service, an order pizza skill may enable a skill system component(s) 195 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 190 dedicated to interacting with the skill system component(s) 195. Unless expressly stated otherwise, reference to a skill, skill device, or skill component may include a skill component 190 operated by the system component(s) 120 and/or skill operated by the skill system component(s) 195. Moreover, the functionality described herein as a skill or skill may be referred to using many different terms, such as an action, bot, app, or the like. The skill component 190 and or skill system component(s) 195 may return output data to the orchestrator component 175.

In some implementations, a skill component 190 may be referred to and/or function as a "speechlet." A speechlet may be a speech-enabled component that may run in the system 400. Speechlet(s) may receive and respond to speech-initiated requests. Speechlet(s) may define life-cycle events for a skill as experienced by a user 45, a way to process speech requests from the user, and/or call-backs from events happening on the device the user 45 is interacting with. A given speechlet may be capable of handling a certain intent. For example, the NLU component 160 may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to another component of the system for performance of the action (e.g., to a TTS component 180 for generating synthesized speech, to an associated device to actuate a physical component such as a lamp, door lock, etc.).

The system 400 may include language output components 193. The language output components 193 include a natural language generation (NLG) component 179 and a TTS component 180. The NLG component 179 may generate text for purposes of TTS output to a user. For example, the NLG component 179 may generate text corresponding to instructions corresponding to a particular action for the user to perform. The NLG component 179 may generate appropriate text for various outputs as described herein. The NLG component 179 may include one or more trained models configured to output text appropriate for a particular input. The text output by the NLG component 179 may become input for the TTS component 180 (e.g., output text data 915 discussed below). Alternatively or in addition, the TTS component 180 may receive text data from a skill component 190 or other system component for output.

The NLG component 179 may include a trained model. For example, and similar to the language processing components 192 described above, the NLG component 179 may be or include one or more LLMs. In a generative context, an LLM may generate text that is responsive to the input prompt provided to the LLM and/or system-generated prompts (e.g., based on event data 122 from the event timeline system 130 as described herein). LLMs excel at generating natural sounding text that appears as though it has been generated by a native speaker in the relevant language. In addition to fluency, generative LLMs are able to generate detailed, relevant, and largely accurate responses to input prompts in many cases due to the large amount of latent information the generative LLM has learned during training. The NLG component 179 generates text data 915 from dialog data received by, for example, a dialog manager such that the output text data 915 has a natural feel and, in some embodiments, includes words and/or phrases specifically formatted for a requesting individual. The NLG may use templates to formulate response and/or include one or more models trained from the various templates for forming the output text data 915. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 180.

The TTS component 180 may generate audio data (e.g., synthesized speech) from text data using one or more different methods. Text data input to the TTS component 180 may come from, for example, the LLM 165, a skill component 190 or speechlet, the NLG component 179, the orchestrator component 175, and/or other component of the system. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder.

The user device 110 may include still image and/or video capture components such as a camera 918 or cameras to capture one or more images. The user device 110 may include circuitry for digitizing the images and/or video for transmission to the system component(s) 120 as image data. The user device 110 may further include circuitry for voice command-based control of the camera, allowing a user 45 to request capture of image or video data. The user device 110 may process the commands locally or send audio data 111 representing the commands to the system component(s) 120 for processing, after which the system component(s) 120 may return output data that can cause the user device 110 to engage its camera.

The system 400 (either on user device 110, system component(s), or a combination thereof) may include a profile storage 170 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 170 may include one or more user profiles, with each user profile being associated with a different account identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more account identifiers, representing one or more users associated with the device. For example, a household device's profile may include the account identifiers of users of the household.

In some implementations, the profile storage 170 may act as a registry. The profile storage 170 may be configured to identify, determine, and/or generate associations between users, user accounts, and/or devices. For example, one or more associations between user profiles and user accounts may be identified, determined, and/or generated by the profile storage 170 (and/or a processing component associated with the profile storage 170). The profile storage 170 may store information indicating one or more applications and/or resources accessible to and/or enabled for a given user account. Additionally, the profile storage 170 may include information indicating device identifiers, such as naming identifiers, associated with a given user account, as well as device types associated with the device identifiers. The profile storage 170 may also include information indicating user account identifiers, naming indicators of devices associated with user accounts, and/or associations between user devices 110 and/or accessory devices. The term "user account" may describe a set of data and/or functionalities associated with a given account identifier. For example, data identified, determined, and/or generated while using some or all of the system 400 may be stored or otherwise associated with an account identifier. Data associated with the user accounts may include, for example, account access information, historical usage data, device-association data, and/or preference data.

Figure 5B:
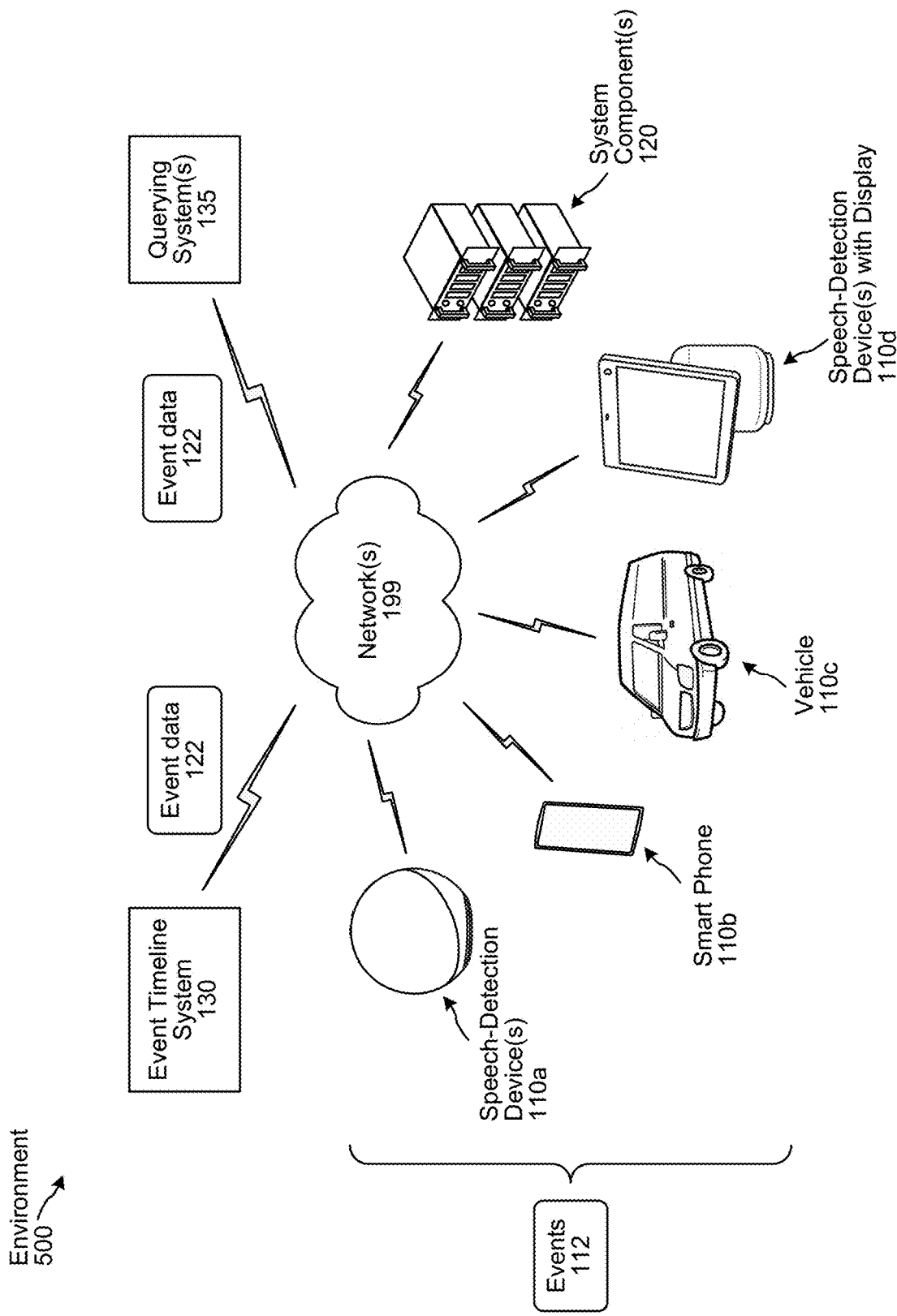
FIG. 5B illustrates an example environment where a diverse set of devices and systems publish event data to the event timeline system, according to embodiments of the present disclosure.

FIG. 5A is a conceptual diagram illustrating use of the dynamic indexing system 100 in an event timeline system 130, according to embodiments of the present disclosure. The event timeline system 130 may operate in, for example, an environment 500 shown in FIG. 5B. FIG. 5B illustrates the example environment 500 in which a diverse set of user devices 110 and system components 120 publish event data to the event timeline system 130, according to embodiments of the present disclosure. The system environment may include one or more user devices 110 and/or one or more system components 120 acting as event publisher systems 105. The publisher systems may generate an event 112 and send event data 122 to the event timeline system 130 for storage as event data 122. A querying system 135 may send requests to the event timeline system 130 for event data 122. An event 112 may refer to a single or multi-turn interaction between a user 45 and a user device 110. The interaction may further involve operations performed by one or more system components 120 as described above with reference to FIG. 4.

Returning to FIG. 5A, the event publisher system(s) 105 may send event data 122 to the event timeline system 130, which may then provide event data 122 to various consumers. Consumers of the event data 122 may include one or more subscribing systems 145, one or more querying systems 135, and/or one or more offline access systems 155. A subscribing system 145 may receive event data 122 as events occur and are processed by the event timeline system 130 (e.g., in real-time, near real-time, and/or periodically with some frequency and without necessarily requesting the event data 122 explicitly for each receipt of the event data 122). A querying system 135 may be a user of the system 100 requesting particular event data 122 (e.g., based on queries). A querying system 135 may use the event data 122 to measure, diagnose, optimize, and/or otherwise monitor and/or control various components and/or services associated with the querying system 135. An offline access system 155 may analyze event data 122 offline (e.g., in batches and not necessarily closely in time following occurrence of the event(s) 112. Examples of offline access systems 155 may include data analytics and/or machine learning workflows.

The event timeline system 130 may be used to receive, process, and/or provide access to diverse event data 122. An event type represents a type or category of a particular event 112. Event publisher systems 105 may register their event types (as described in further detail below) with the event timeline system 130. Thereafter, event data 122 generated by the event publisher systems 105 may be published to the event timeline system 130 using a publisher-subscriber asynchronous event messaging service (Step 11). The event timeline system 130 may define one or more publishing endpoints 115 for receiving event data 122. The publishing endpoint(s) 115 may forward the event data 122 to an event router 125 (Step 12). The event router 125 may comprise computer-implemented logic for parsing the headers and/or payload of the received events to determine how to process and/or store such event data.

Event router 125 may send some event types to subscriptions subsystem 140 (e.g., a message broker of an EDA) that may identify one or more subscribing systems 145 and send event data 122 to the relevant subscribing system(s) 145 (based on the subscribing system(s) 145 that are subscribed to, and authorized to receive, events 112 of the relevant type) (Step 13). Accordingly, the subscriptions subsystem 140 may send the relevant event data 122 to the subscribing system(s) 145 (e.g., services and/or event stream data). Examples of such consuming systems and/or services are described in further detail below. Subscriber systems (e.g., subscribing system(s) 145) may subscribe to particular topics which may include one or more event types. The particular event types and/or topics (e.g., groups of one or more event types) may be determined by querying a message broker and/or other interface of the particular event-driven architecture used to implement the publisher-subscriber messaging service of the event timeline system 130.

Additionally or alternatively, the event router 125 may determine that some event types are classified for storage in a persistent data store, such as low-latency store 154, long-term store 156, and/or offline store 158 (Step 13). A tier selector/writer 152 may be a component or subsystem configured to apply rules to determine an appropriate tier of storage for event data 122 received from the event router 125. Storage of the various event data types by the tier selector/writer may occur at Step 14. A low-latency store 154 may comprise event data that is time-sensitive in nature (e.g., context data used by a voice assistant, such as previous dialog turns and/or state data used by an LLM-based voice assistant) and/or which are subject to low-latency service level agreements (SLAs). In various examples, the low-latency store 154 may comprise memory or a cache that is flushed/overwritten on a relatively short time scale (e.g., every hour, day, 48 hours, etc.) to provide only the most recent event data 122 with fast retrieval. Accordingly, the low-latency store 154 may exhibit a faster retrieval time than a long-term store 156. The long-term store 156 may be a data store devoted to storage of longer-term event data 122 (e.g., a week, month, years). This type of event data 122 may not be needed for rapid retrieval (e.g., for handling a user request), but may be made readily available for reasonably responsive service to a querying system 135. Examples may include device registrations, system settings, etc. Once the tier selector/writer 152 determines where to store the event data 122, the tier selector/writer 152 may generate an index update and store it in the index component 151. The query interface 134 may refer to the index component 151 when handling queries representing certain attributes and/or compound indices, as described further below.

An offline store 158 may store bulk data intended for batch access. For example, batches of event data 122 (e.g., downloads of large amounts of event data in a single download) that may be used to retrain machine learning models and/or for analysis (to determine event data trends) may be stored in the offline store 158. One or more offline access systems 155 may be a consumer of bulk download of event data 122 and/or act as an interface for bulk download of event data 122 from the offline store 158 (Step 15). For example, an event data consumer may query the offline access system(s) 155 data by device identifier, account identifier, and/or for particular date and/or time ranges. Although, three data stores (low-latency store 154, long-term store 156, and offline store 158) are shown and described in FIG. 5A, the event timeline system 130 may include any number of data stores having various access latency profiles and/or retention policies.

The event timeline system 130 may provide a query interface 134 to enable the query system(s) 135 to retrieve specific event data 122 from the storage provided by the event timeline system 130 (Step 16). The query interface 134 may retrieve the requested data from one or more of the low-latency store 154, the long-term store 156, and/or other data stores, and return the requested data to the querying system 135. In an example operation, a virtual assistant system (e.g., as described in further detail below) may receive a user request to "play my favorite songs." The event timeline system 130 may have the user's profile data and/or playback history (e.g., for a particular music service) stored in the long-term store 156. Accordingly, the virtual assistant system may generate a query for the query interface 134 to retrieve the playback history associated with the user's account. The query may include the account identifier and/or a request to retrieve the top 20 most played songs for the past year. The query interface 134 may retrieve the top-20 most played songs for the past year for the relevant account and may provide this event data 122 in response to the query. Thereafter, the virtual assistant system may use this data directly to generate an output in response to the request (e.g., by playing the most-played song). Additionally or alternatively, the virtual assistant system may insert the event data 122 as context into the prompt for a subsequent iteration of LLM processing. For example, upon determining the most-played song, the LLM may generate a prompt to determine on which user device 110 the user typically plays music (or on which device the user plays this specific song) in order to determine an endpoint that is most likely to be associated with the user request.

In various examples, the virtual assistant system may use the query interface 134 to query the low-latency store 154 as speech processing and/or natural language processing tends to be latency sensitive. However, in some examples, the virtual assistant system may instead subscribe to various event types and store the event timeline data locally to be used as context upon receipt of a natural language request.

In various examples, the event publisher systems 105 may generate timestamped event data 122 when there is a change in the state of the device/system/service or its resources (e.g., compute, memory-usage, connectivity). The event publisher systems 105 may opt for appropriate published event transport and delivery to event timeline system 130 based on a variety of factors such as connectivity, latency SLA, accuracy of information, durability requirements, volume of event data, cost, etc. As previously described, the event timeline system 130 may provide a synchronous REST API and an asynchronous EDA API. A client (e.g., a consumer of event data 122) that needs low latency event data access (e.g., ~20 ms) and acknowledgement may opt for the synchronous option. By contrast, a client that is more latency tolerant (e.g., ~200 ms) and that does not need acknowledgement may opt for the asynchronous interface. A client may also change mechanisms as needed/desired.

The event timeline system 130 may provide event processors that may offer opt-in features for event publisher systems 105 and/or clients. Event processors may be used to modify, decrypt, re-encrypt, in-direct, redact, filter, encode, and/or batch events or their attributes. Once an event is processed by all relevant event processors (e.g., as determined on a per-event type basis), the processed event can be sent to subscribers and/or made available via the query interface 134.

In at least some examples, the event timeline system 130 may be executed by a local device (e.g., an edge device) such that events ingested by the event timeline system 130 and/or consumed from the event timeline system 130 are only used in a local environment (e.g., on a local area network within a business or a user's home) to preserve privacy and enhance data security. For example, the event timeline system 130 may be executed on a hardware hub that may communicate via a local wireless network with one or more other on-premises devices (e.g., only with devices that are connected to the same local area network). In various examples, such a local instantiation of the event timeline system 130 may mitigate privacy and/or security concerns.

In some cases, a querying system 135 may query the event timeline system 130 multiple times to obtain data for a single operation. For example, a querying system 135 may send a request to the query interface 134 for event data 122 published by all user devices 110 registered to a particular account identifier. Because the event timeline system 130 stores event data 122 as key-value pairs in a non-relational database, the query interface 134 may not be able to perform complex queries, such as for one account identifier and one of multiple different device identifiers. Thus, the querying system 135 may send a request that consists of multiple queries, each query corresponding to one of the device identifiers. In addition to being inefficient (e.g., using three queries to obtain event data 122 for one operation), the results may be out of timestamp order and/or exhibit pagination issues, such as showing all events for one event type but only a subset of another for the same time window. For example, during a requested time window, there may be 10 events of type ABC and 50 events of type DEF. If the max page size is 10, the results may show all events for type ABC but only a subset of events for type DEF for the same time window. As the user pages through additional results for DEF, the remaining events may appear out of sequence.

Although many key-value storage systems do not natively support indexing, they may allow for use of secondary keys. For example, a primary key may be a unique value such as a hash or event identifier, a secondary key may be an account identifier, and another secondary key may be an event type. Event data 122 may be queried using one of the secondary keys (e.g., the account identifier or event type). The index component 151 may maintain an index of event data 122 based on certain attributes such as the event type, device, type, etc. The data storage components 150 may not support complex queries such as for multiple attributes or certain combinations of attributes.

The dynamic indexing system 100 may improve the efficiency, usability, and responsiveness of the event timeline system 130. The event management system 132 may create new indices corresponding to operations with respect to various attributes. This may allow the query interface 134 and/or querying systems to perform complex queries using the compound index. For example, ABC and DEF may be attributes of an attribute category corresponding to event type. Other attribute categories may include device identifier (e.g., corresponding to multiple devices associated with an account identifier), device type, domain (e.g., shopping, music, navigation, etc.), etc. The event timeline system 130 may therefore create a compound index corresponding to an operation with respect to the attributes. The operation may be an "OR" operation, where the compound index represents, for example, combined event data 122 corresponding to event type ABC or event type DEF (e.g., corresponding to a union operator). The operation may be an "AND" operation, where the compound index represents, for example, filtered event data 122 corresponding to event type ABC and device type GHI. The compound index may have a label (e.g., an identifier corresponding to the compound index) that is added to the key-value pair for that event data 122 as a secondary key. When the query interface 134 receives a query corresponding to the compound index, the query interface 134 may retrieve key-value pairs indexed according to the compound index label.

In an example operation, a querying system 135 may send a request to an event management system 132 to create a compound index (Step 18). In some implementations, the offline access system(s) 155 may also submit requests to create compound indices. The event management system 132 may create a label for the compound index and one or more rules for when to apply the label to a published event 112. The event management system 132 may distribute the identifier and rule(s) to the event router 125, tier selector/writer 152, the query interface 134, and/or the subscriptions subsystem 140 (Step 19). When the event timeline system 130 receives a published event 112 (e.g., at Step 11), the event router 125 (e.g., at Step 13) and/or the tier selector/writer 152 (e.g., at Step 14) may determine whether and/or which rule(s) corresponding to a compound index applies to the published event 112. The event router 125 and/or the tier selector/writer 152 may create the event data 122 to include the label corresponding to the compound index. In some implementations, the subscriptions subsystem 140 may additionally or alternatively determine whether a compound index rule applies to the published event 112 and, if so, apply the corresponding identifier. The compound index may be used by the subscriptions subsystem 140 to, for example, filter event data 122 and/or to compile event data 122 into batches based on a particular attribute and/or combination of attributes.

The querying system 135 may submit a request corresponding to the compound index (e.g., for event data 122 corresponding to all event types for an account identifier) (e.g., by repeating Step 16). In some implementations, querying system 135 may refer to the label explicitly. In some implementations, the query interface 134 may translate the request; for example, from a set of queries, or a request indicating the compound index to one or more queries representing the label assigned to the compound index by the event management system 132. In either case, the query interface 134 may retrieve event data 122 that includes the compound index identifier as a secondary key and return the event data 122 to the querying system 135 (e.g., by repeating Step 17).

Although the operations illustrated in FIG. 5A are described in a particular order, the operations may execute in different orders, with some steps repeated, modified, or omitted. For example, event timeline system 130 may implement a request to create a compound index (e.g., at Steps 18 and 19) prior to receiving and storing event data 122 (e.g., at Steps 11 through 14).

FIG. 5B illustrates an example environment 500 where a diverse set of user devices 110 and system components 120 publish event data to the event timeline system 130, according to embodiments of the present disclosure. The user devices 110 and system components 120 may communicate with each other and with the event timeline system 130 over a computer network 199. The computer network 199 may be any type of computer communication network; for example, in some embodiments, the computer network 199 may be a wide area network (WAN) such as the Internet. In other examples, the computer network 199 may be a local area network (LAN). In various examples, the event timeline system 130 executing locally on a device communicating on a LAN may allow the event timeline system 130 to maintain custody of potentially sensitive data while still providing event data 122 to various consumer devices/services on the local network, thereby enabling contextually aware processing. For example, the user devices 110 may be devices connected to a wireless access point within a user's home or within a business. In such an example, the event timeline system 130 may receive and make available event data 122 from the user devices 110 without sending the event data 122 over the Internet in order to maintain custody of the event data 122 and/or to avoid divulging private or sensitive information outside the LAN. At the same time, the user devices 110 may consume the event data 122 to enable rich, context-aware services and/or experiences. For example, the user devices 110 may include a vehicle 110c (or a computing device of a vehicle). Upon coming within a geofence surrounding the user's home (and/or upon connecting to a common wireless access point with the other user devices 110, the vehicle 110c may transmit event data 122 indicating that the vehicle has arrived at the house. In response, a speech-detection device 110a may consume the event data 122 (e.g., by subscribing to the event type using the event timeline system 130) and may begin playing the user's Welcome Home from Work playlist in response. Other user devices 110 may include a smart phone 110b, a speech-detection device with display 110d, and/or any of the user devices 110 illustrated in FIG. 12 or others. For example, the system 400 and/or environment 500 may include accessory devices such as "smart" devices, which may have certain computing components and be configured to send and/or receive data to/from other devices. The accessory devices may be, for example, light bulbs, plugs, locks, televisions, appliances, doorbells, cameras, etc. In some cases, accessory devices may be "paired" or otherwise associated with the user device 110 and/or system component(s) 120.

In the example of FIG. 5B, the user devices 110 may represent various types of devices and/or services. For example, the speech-detection device 110a may be a voice assistant-enabled smart speaker that may publish events 112 as, for example, timestamped event data 122. The timestamped event data may represent events of any type published by the speech-detection device 110a. An example may include a previous received voice request to play a specific song, detection of a dog barking, baby crying, user snoring, a request to provide the weather forecast, make a dinner reservation, etc. The smart phone 110b may publish event data representing events detected by and/or generated by the smart phone 110b (e.g., a phone call being placed, accelerometer data, a low battery warning, a received text message, etc.). The speech-detection device with display 110*d* (e.g., a smart television, a voice assistant device including a display, etc.) may publish event data representing an event detected by and/or generated by the user device 110*d* (e.g., a video call being initiated, a voice request to play a particular video (such as a movie, a recipe video), a song, a request to display a particular product, etc.). The user device 110 may be a computing device such as a desktop computing device and/or may represent one or more computing devices that provides a computer-implemented service. For example, the user device 110 may represent multiple computing devices that implement various components of a virtual assistant system (such as the natural language command processing system 400 described in reference to FIG. 4). The user device 110 may send event data according to the types of event data associated with this device and/or computer-implemented service to the event timeline system 130.

In an example operation, a first event 112 may be associated with playback by the user device 110 of <Song Y> by <Artist X>. Corresponding timestamped event data may be published to the event timeline system 130. One or more other user devices 110 and/or system component(s) 120 may subscribe to events of this type. For example, one or more other smart speakers that are playback-paired with the speech-detection device 110*a* may subscribe to song playback events in order to initiate playback on these devices and/or to adjust equalization settings for music playback. The playback event may be stored in a data store of the event timeline system 130 so that such data is available to, for example, a virtual assistant system such as those discussed herein (e.g., the natural language command processing system 400). Accordingly, when the user 45 requests "Turn up the song," the virtual assistant system may retrieve the playback event which may be included in prompt data as contextual information used by an NLU component and/or an LLM during inference to determine what song the user is referring to (e.g., anaphora resolution). Additionally, the user utterance "Turn up the song" may itself be a time-stamped event. Accordingly, this event data may also be published to the event timeline system 130. The event router 125 may determine (using the event type of the volume event) to which data store(s) to store the event data and/or which other devices and/or systems subscribe to events of this type.

Accordingly, the event timeline system 130 may receive a time series of event data 122 via a publishing interface of an EDA. The event data 122 may be made available to consuming devices, systems, and/or computer-implemented services, according to the event type (defined during event on-boarding). For example, event data of a first event type may be stored in low-latency store 154 (FIG. 5A) and made available via query interface 134. Event data of a second type may be stored in offline store 158 and may also be published to subscribers (e.g., subscribing systems 145). The data stores and/or access APIs (e.g., Asynchronous EDA API vs. query interface 134) for a given event type may be defined during on-boarding of that event type and/or creation of a relevant compound index.

Although the user devices 110 shown in FIG. 5B depict specific types of devices, these depictions are for illustrative purposes only. Any types of devices and/or computer-implemented services may publish and/or consume the time-stamped event data. In addition, although the descriptions above primarily describe publishing of event data by the various devices/services, it should be appreciated that these devices/services may also consume the event data from the event timeline system 130 (e.g., using query interface 134, offline access system 155, and/or a subscription-based EDA via the subscriptions subsystem 140).

Figure 6:
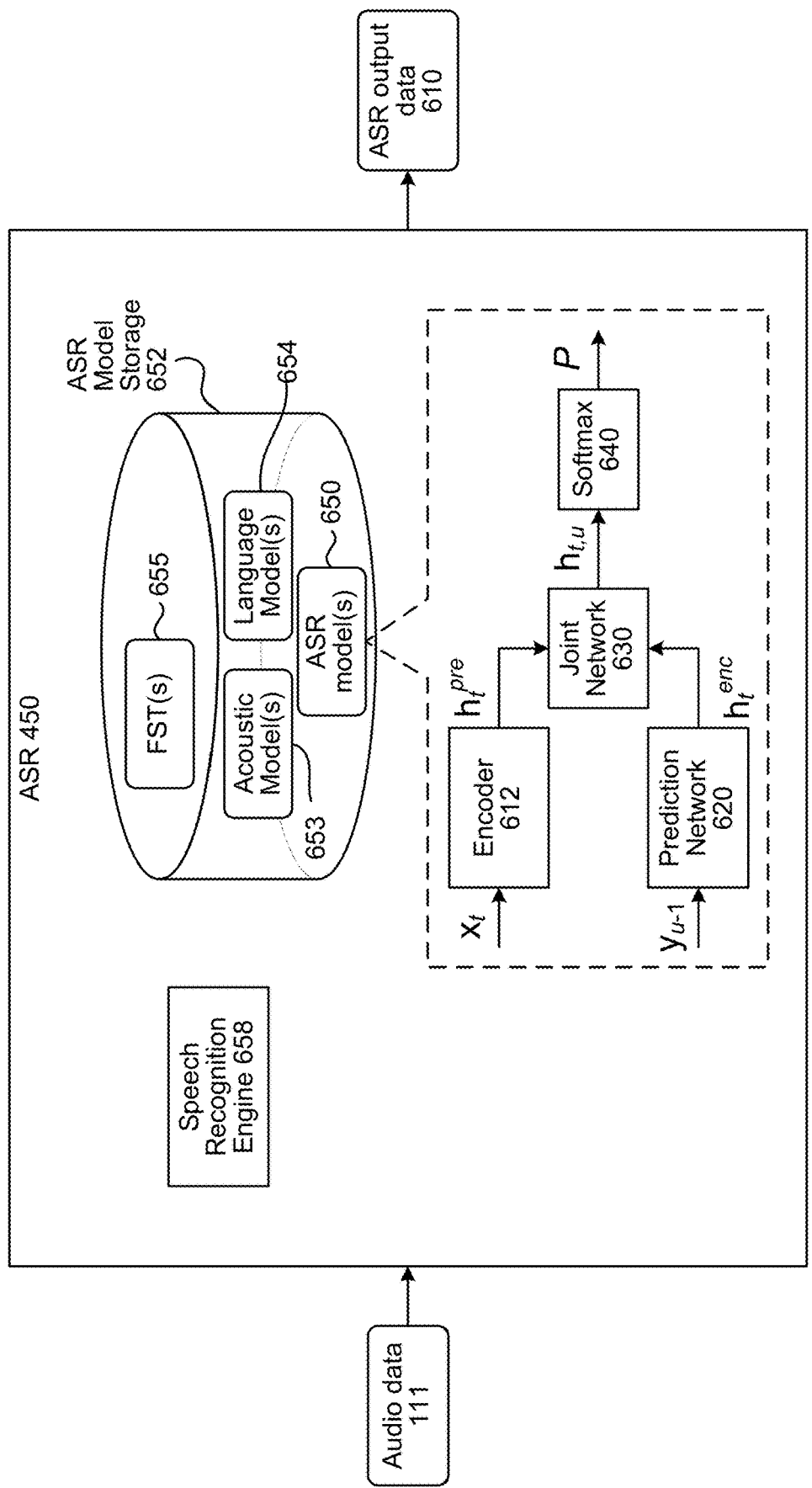
FIG. 6 is a conceptual diagram of an ASR component, according to embodiments of the present disclosure.

FIG. 6 is a conceptual diagram of an ASR component 450, according to embodiments of the present disclosure. The ASR component 450 may interpret a spoken natural language input based on the similarity between the spoken natural language input and pre-established language models 654 stored in an ASR model storage 652. For example, the ASR component 450 may compare the audio data with models for sounds (e.g., subword units or phonemes) and sequences of sounds to identify words that match the sequence of sounds spoken in the natural language input. Alternatively, the ASR component 450 may use a finite state transducer (FST) 655 to implement the language model functions.

When the ASR component 450 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 450 may output an ASR hypothesis that most likely matches the spoken natural language input, or may output multiple ASR hypotheses in the form of a lattice or an N-best list, with each ASR hypothesis corresponding to a respective score.

The ASR component 450 may include a speech recognition engine 658. The ASR component 450 receives audio data 111 (for example, received from a user device 110 having processed audio detected by a microphone by an acoustic front end (AFE) or other component). The speech recognition engine 658 compares the audio data 111 with acoustic models 653, language models 654, FST(s) 655, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 658 and/or prior to processing by the speech recognition engine 658.

In some implementations, the ASR component 450 may process the audio data 111 using the ASR model 650. The ASR model 650 may be, for example, a recurrent neural network such as an RNN-T. An example RNN-T architecture is illustrated in FIG. 6. The ASR model 650 may predict a probability (y|x) of labels y=(y$_1$, . . . y$_u$) given acoustic features x=(x$_1$, . . . , x$_t$). During inference, the ASR model 650 can generate an N-best list using, for example, a beam search decoding algorithm. The ASR model 650 may include an encoder 612, a prediction network 620, a joint network 630, and a softmax 640. The encoder 612 may be similar or analogous to an acoustic model (e.g., similar to the acoustic model 653 described below), and may process a sequence of acoustic input features to generate encoded hidden representations. The prediction network 620 may be similar or analogous to a language model (e.g., similar to the language model 654 described below), and may process the previous output label predictions, and map them to corresponding hidden representations. The joint network 630 may be, for example, a feed forward neural network (NN) that may process hidden representations from both the encoder 612 and prediction network 620, and predict output label probabilities. The softmax 640 may be a function implemented (e.g., as a layer of the joint network 630) to normalize the predicted output probabilities.

The speech recognition engine 658 may process the audio data 111 with reference to information stored in the ASR model storage 652. Feature vectors of the audio data 111 may arrive at the system component(s) encoded, in which case they may be decoded prior to processing by the speech recognition engine 658.

The speech recognition engine 658 attempts to match received feature vectors to language acoustic units (e.g., phonemes) and words as known in the stored acoustic models 653, language models 654, and FST(s) 655. For example, audio data 111 may be processed by one or more acoustic model(s) 653 to determine acoustic unit data. The acoustic unit data may include indicators of acoustic units detected in the audio data 111 by the ASR component 450. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR output data 610. The ASR output data 610 can include one or more hypotheses. One or more of the hypotheses represented in the ASR output data 610 may then be sent to further components (such as the NLU component 160) for further processing as discussed herein. The ASR output data 610 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 450 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 450 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 450 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7A:
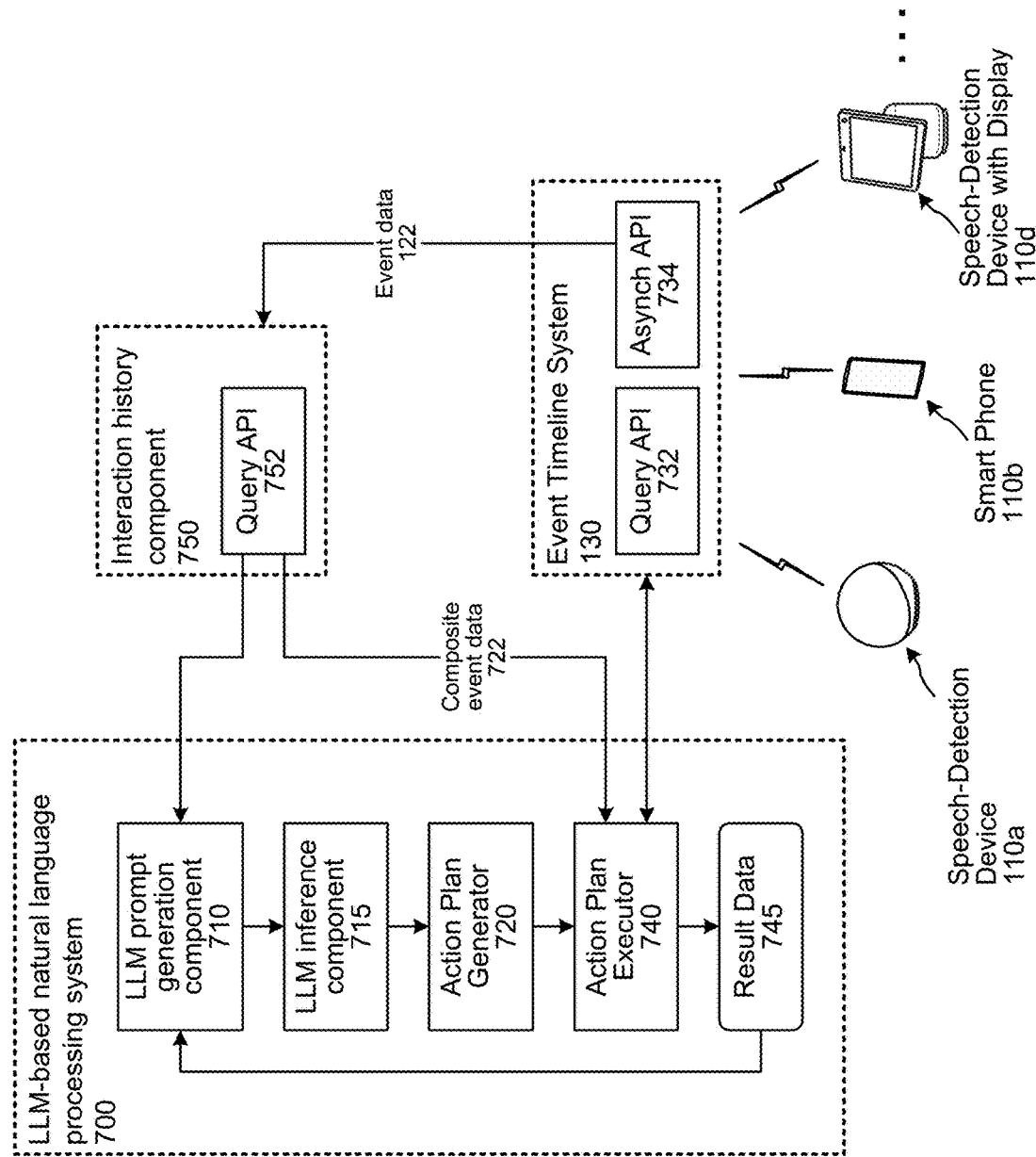
FIG. 7A depicts an example of a large language model (LLM)-based natural language processing system in communication with an event timeline system, according to embodiments of the present disclosure.

FIG. 7A depicts an example of an LLM-based natural language processing system 700 in communication with an event timeline system 130, according to embodiments of the present disclosure. Some natural language processing flows may employ one or more LLMs such as the LLM 165 for use in processing natural language requests. An LLM is an AI model that may be capable of processing and generating text based on latent information it has learned from vast amounts of training data. In a generative context, an LLM may generate text responsive to a prompt provided to the LLM. LLMs may be trained on relatively large amounts of data that include a wide variety of text from various sources, enabling the LLMs to parse and/or reflect grammar, context, and/or relationships between words and sentences. In various examples described herein, a natural language processing flow may employ an LLM to process a natural language request. In some examples, an LLM-based natural language processing flow may generate a prompt from ASR output data representing a user utterance (e.g., the ASR output data 610). The prompt may be fed into the LLM. In other examples, a text input (e.g., text typed on a keyboard) may be used as an input prompt (or may be used to generate an input prompt) to the LLM. The LLM may be trained to output a text-based action plan which may be a formatted into a series of computer-executable actions (including directives to make API requests (sometimes referred to as "API calls", "API requests", or "API directives") to various subsystems) that may be taken in order to perform processing in response to the natural language request. In various examples, an LLM-based processing flow may be a recursive process wherein the initial action plan may be executed (e.g., by making various API calls to API providers to receive results/responses), and the responses (e.g., result data received in response to the API calls) may be used to generate updated LLM prompts which may then be input into the LLM for generation of an updated action plan and/or response to the user input. In various examples, the prompts used as input during LLM inference may include a text representation of the user request (e.g., a request to answer a question, control a user device, set a calendar reminder, etc.) in addition to other context information that the LLM may use during inference.

For example, a human may be engaged in a dialog with an LLM-based personal assistant and may ask "What is the weather forecast in Seattle today?" The LLM may call an API of a weather service to return the weather forecast to the user. Thereafter, the user may ask "What about tomorrow?" In this example, the LLM may use the previous user request ("What is the weather forecast in Seattle today?" and the previous response ("The weather in Seattle today is sunny with a high of 71 degrees, Fahrenheit.") as context when answering the user's follow-up question. For example, text representing the previous question and response may be included in prompt data used during this round of LLM inference such that the LLM may determine that the user is asking about the weather forecast in Seattle for the day after the current day.

Some LLMs are implemented using a transformer neural network. A transformer is a type of machine learning architecture that includes an encoder network and a decoder network. The encoder may take an input (e.g., a "prompt") and generate feature representations (e.g., feature vectors, feature maps, etc.) representing the input. The feature representations may capture the semantic meaning of the input. The feature representations may then be fed into a decoder, which may generate an output based on the feature representations. In natural language processing, a transformer may take sequences of words as input. The transformer may receive a sentence and/or a paragraph (or any other quantum of text) comprising a sequence of words as an input. The encoder network of the transformer may include a set of encoding layers that processes the input data (e.g., one layer after another). Each encoder layer may generate encodings (referred to herein as "tokens"). The tokens may represent feature representations (e.g., feature vectors and/or maps) that include information about which parts of the input data are relevant to each other. An encoder layer may pass its token output to a subsequent encoder layer.

The decoder network may take the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, natural language response generation, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer may have an additional attention mechanism which draws information from the outputs of previous decoders, prior to the decoder layer determining information from the encodings. Both the encoder and decoder layers have a feed-forward neural network for additional processing of the outputs. The encoder and/or decoder may also include one or more residual connections and layer normalization steps.

A transformer neural network may include one or more scaled dot-product attention units. When input data is passed into a transformer, attention weights may be calculated between every token simultaneously. The attention unit may produce embeddings for every token that contain information not only about the token itself, but also a weighted combination of other relevant tokens weighted by the attention weights.

For example, the transformer may learn three weight matrices: the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights may be calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights may then be passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens may be expressed as one large matrix calculation, which may be useful for training and/or inference due to computational matrix operation optimizations which make matrix operations fast to compute. The matrices Q, K, and V may be defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

One set of ($W_Q$, $W_K$, $W_V$) matrices is referred to herein as an attention head. In some implementations, a transformer may have multiple attention heads. An attention head may, for a given token, attend to other tokens that are relevant to the token. With multiple attention heads, the transformer may learn to attend to other tokens for different definitions of "relevance." In some cases, the relevance encoded by an attention head may be interpretable by humans. For example, in the natural language context, an attention head may, for every token, attend mostly to the next word, from verbs to their direct objects, etc. Because some transformers have multiple attention heads, they may be capable of capturing multiple types and/or levels of relevance, from surface-level to semantic. In some implementations, multiple outputs from a multi-head attention layer may be concatenated and passed to a feed-forward neural network.

Each encoder may include two major components: a self-attention mechanism and a feed-forward neural network. The self-attention mechanism may take in a set of input encodings from the previous encoder and weighs their relevance to each other to generate a set of output encodings. The feed-forward neural network may further process output encodings individually. The output encodings may pass to a next encoder and/or to a decoder.

In some implementations, a first encoder may take position information and embeddings of the input data as its input, rather than encodings. The position information may be used by the transformer to make use of the order of the input data. In various examples described herein, the position embedding may describe an order of a sequence of words.

In some implementations, a decoder layer may include three components: a self-attention mechanism (e.g., scaled dot product attention), an attention mechanism over the encodings, and a feed-forward neural network. The decoder may function in a similar fashion to the encoder, but with an additional attention mechanism configured to draw relevant information from the encodings generated by the encoders. In a self-attention layer, the keys, values and queries come from the same place; for example, in the case of the encoder, the output of the previous layer in the encoder. Each position in the encoder may attend to all positions in the previous layer of the encoder. In "encoder-decoder attention" layers (sometimes referred to as "cross-attention"), the queries may come from the previous decoder layer, while the keys and values come from the output of the encoder. This may allow every position in the decoder to attend over all positions in the input sequence. In other words, the decoder may attend to the encoder features.

Returning to FIG. 7A, the LLM-based natural language processing system 700 may communicate with the event timeline system 130, and/or an interaction history component 750. In various examples, a user device 110 (e.g., one or more of a speech-detection device 110a, smart phone 110b, speech-detection device with display 110d, etc.) may receive spoken requests (e.g., via one or more microphones) and/or other natural language requests (e.g., written text) and process the input using various components shown in FIG. 7A. The components may reside locally on the user device 110, on one or more system components 120 communicating with the user device 110, and/or some combination thereof. The system 700 may, alone or in conjunction with another device 110/component 120, take one or more actions and/or perform requested tasks. In some examples, if the input request is a spoken request, ASR processing may be used to transform the spoken request into text or text representation prior to taking the actions described in FIG. 7A.

An LLM orchestrator (e.g., LLM orchestrator 730 described below in reference to FIG. 7D) may receive the text data representing the request and may communicate the text data to the LLM prompt generation component 710. In some examples, the LLM prompt generation component 710 may query the event timeline system 130 to retrieve contextual information related to the user request. For example, in some examples the LLM prompt generation component 710 may itself be implemented as an LLM and may determine that the user request relates to turning off the lights. Accordingly, the LLM prompt generation component 710 may query the event timeline system 130 (e.g., via a query API 732) to retrieve device state data from the home associated with the account identifier (e.g., an account identifier associated with the user device 110 that received the user request). The query may include the account identifier and, in response to the query, the event timeline system 130 may return device state data of smart devices registered to the account identifier provided in the query. The LLM prompt generation component 710 may insert this state information into the prompt used for LLM inference. For example, the prompt may include the text representing the user request (e.g., "Turn off the light in here") along with the device state data as context (e.g., Device_ID: 1237; Device_type [smartlight]; Device_state: ON; Device_ID: 2375; Device_type [smartlight]; Device_state: OFF, etc.).

An LLM inference component 715 may consider the user request in view of the context data in the prompt when generating LLM inference output. The output of the LLM inference component 715 may be natural language text comprising a series of actions or tasks to be performed. For example, the LLM inference component 715 may generate a series of observations, such as "I can determine in which room the user audio has been received and determine which lights are on in the vicinity of that room.").

An action plan generator (APG) 720 may receive the LLM inference output and may generate a series of computer-executable API and/or function calls that may be used to carry out one or more tasks in the LLM inference output. For example, the APG 720 may generate a call to an API of an in-home security sensor to determine a room in which the user making the request is located.

Figure 7B:
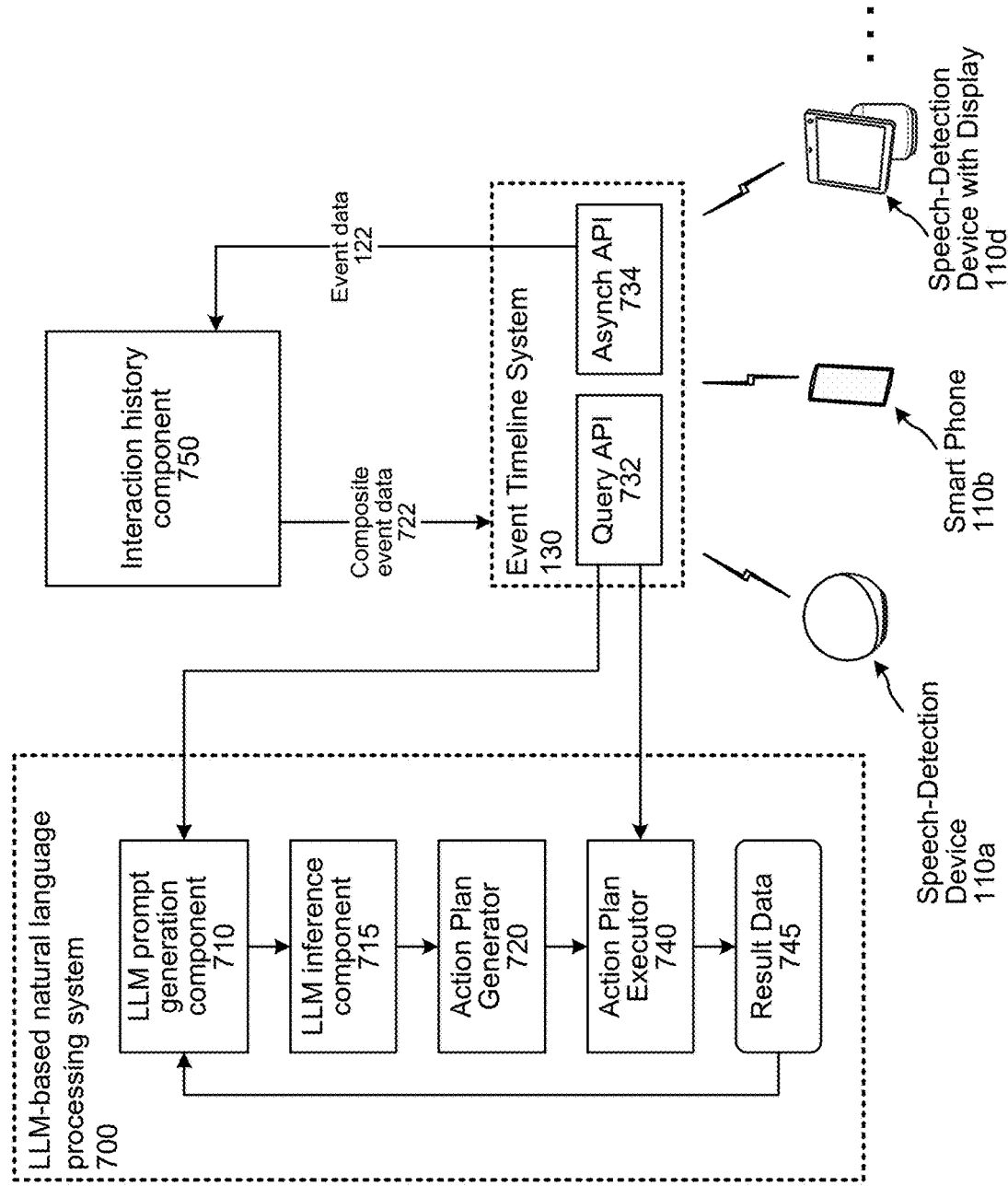
FIG. 7B depicts an alternate implementation of communication between the LLM-based natural language processing system and the event timeline system, according to embodiments of the present disclosure.

An action plan executor (APE) 740 may receive action plan generated by the APG 720. The APE 740 may carry out the relevant API calls of the action plan. In some cases, the action plan generated by the APG 720 may comprise retrieving further event data 122 from the event timeline system 130. For example, the home security sensor may provide presence detection event data to the event timeline service (e.g., via asynchronous API 734). Thus, the APG 720 may generate an API call to the query API 732 to retrieve event data 122 for the relevant event type related to presence detection from persistent storage (e.g., low-latency store 154). The APE 740 may execute the API call and may retrieve the result data 745 from the event timeline system 130. In another example, the interaction history component 750 may subscribe to one or more event types registered with the event timeline system 130. In the current example, the presence information may be an event type to which the interaction history component 750 subscribes. The interaction history component 750 may receive various event data 122 and may combine the various event data into composite event data 722. For example, event data 122 indicating that a first user device 110 was powered off, a home security system was armed, and a door was locked may be stitched into a composite event (that indicates that the user may be going to sleep). The interaction history component 750 may receive the presence information event type, generate one or more composite events (e.g., composite event data 722) and may store this data locally and/or may send it to the event timeline system 130, as shown in FIG. 7B. Accordingly, the APG 720 may instead query the presence information from the query API 732. In some implementations, an intermediate service, such as interaction history component 750, may be used to anonymize data and/or to provide added security. For example, while the presence data may reflect an account identifier, the event data 122 provided by the interaction history component 750 may provide only a Boolean value indicating whether any human has been detected in a particular location.

As described herein, processing by the LLM-based natural language processing system 700 may be recursive in nature, with a task requested by an input request being broken down into a variety of sub-tasks. For example, the LLM inference component 715 and action plan generator 720 may generate action plans for the various subtasks. Execution of these action plans may include API calls to various other services and/or tools (e.g., SQL tools, programming tools, other purpose-built machine learning models, the event timeline system 130, online search engines, etc.). Various parameters may be included in the API calls to these other services/tools (e.g., device identifier data, account identifier data, device state data, etc.). The result data 745 may be used by LLM prompt generation component 710 to generate a new prompt to perform further tasks on the basis of the result data 745 received during the previous iteration. However, in some examples, the result data 745 may be determined to be a complete response to the user's question. Accordingly, in such instances the LLM orchestrator may take the requested action and/or may output the relevant response to the user's request.

FIG. 7B depicts an alternate implementation of communication between the LLM-based natural language processing system 700 and the event timeline system 130, according to embodiments of the present disclosure. In some implementations, the interaction history component 750 may subscribe to particular event types published to the event timeline system 130. The interaction history component 750 may generate composite events (composite event data 722) by combining event data 122 according to predefined event histories (e.g., of a predefined format). For example, a user's vehicle 110c arriving home, followed by a garage door open event, and a door unlock event may be a predefined event history. This may be a predefined event history that may be useful as context for processing by the LLM-based natural language processing system 700. The interaction history component 750 may send the composite event data 722 to the event timeline system 130 and the event timeline system 130 may store the composite event data 722 (e.g., in low-latency store 154, long-term store 156, and/or offline store 158) and/or may send the composite event data 722 to one or more subscribing systems 145 via an asynchronous event-driven architecture (e.g., via a query API 752).

As previously described, the prompt data generated for LLM inference component 715 may include event data as context to ground the prompt data and the input user query. For example, the composite event data 722 may be inserted into the prompt data. In various examples, timestamped event data 122 from a variety of diverse devices and/or services may provide context that may be used to ground prompt data. However, in order to avoid prompt bloat and/or to provide the most relevant context for LLM inference component 715, the event data 122 may be summarized for prompt inclusion.

One technique that may be used to summarize event data for prompt inclusion is to build a semantic search index by encoding the various event data (e.g., using an encoder such as BERT, DistilBERT, etc.) into a high dimensional numeric vector. Thereafter, an input user query may be used to search the semantic search index by encoding the vector into the common embedding space and determining the most similar embeddings stored in the semantic search index (e.g., using cosine distance, cosine similarity, Euclidean distance, etc.). Such a technique may be used to retrieve the top k most relevant events (and/or composite events) which may be included in the prompt as potentially useful context together with the user input request.

Another technique that may be used to summarize event data for prompt inclusion (which may be used alone or together with one or more other approaches) may be to cache event data that is relevant to various predefined scenarios (e.g., for common experiences that can offer improved user experiences). For example, the LLM-based natural language processing system 700 may offer a sleep tracking user experience. For this user experience, a number of snoring audio events may be compiled. Accordingly, when a user asks, "How often did I snore last night?" the system may retrieve the predefined sleep event data (e.g., 27 hours' worth of detected sleep events for a particular device identifier) and may use this to determine the length of time and/or the number of snoring events. The foregoing event summary (e.g., sleep-related audio events) is merely an illustrative example and the specific event summaries may be engineered for the particular user experiences to be offered.

Figure 7C:
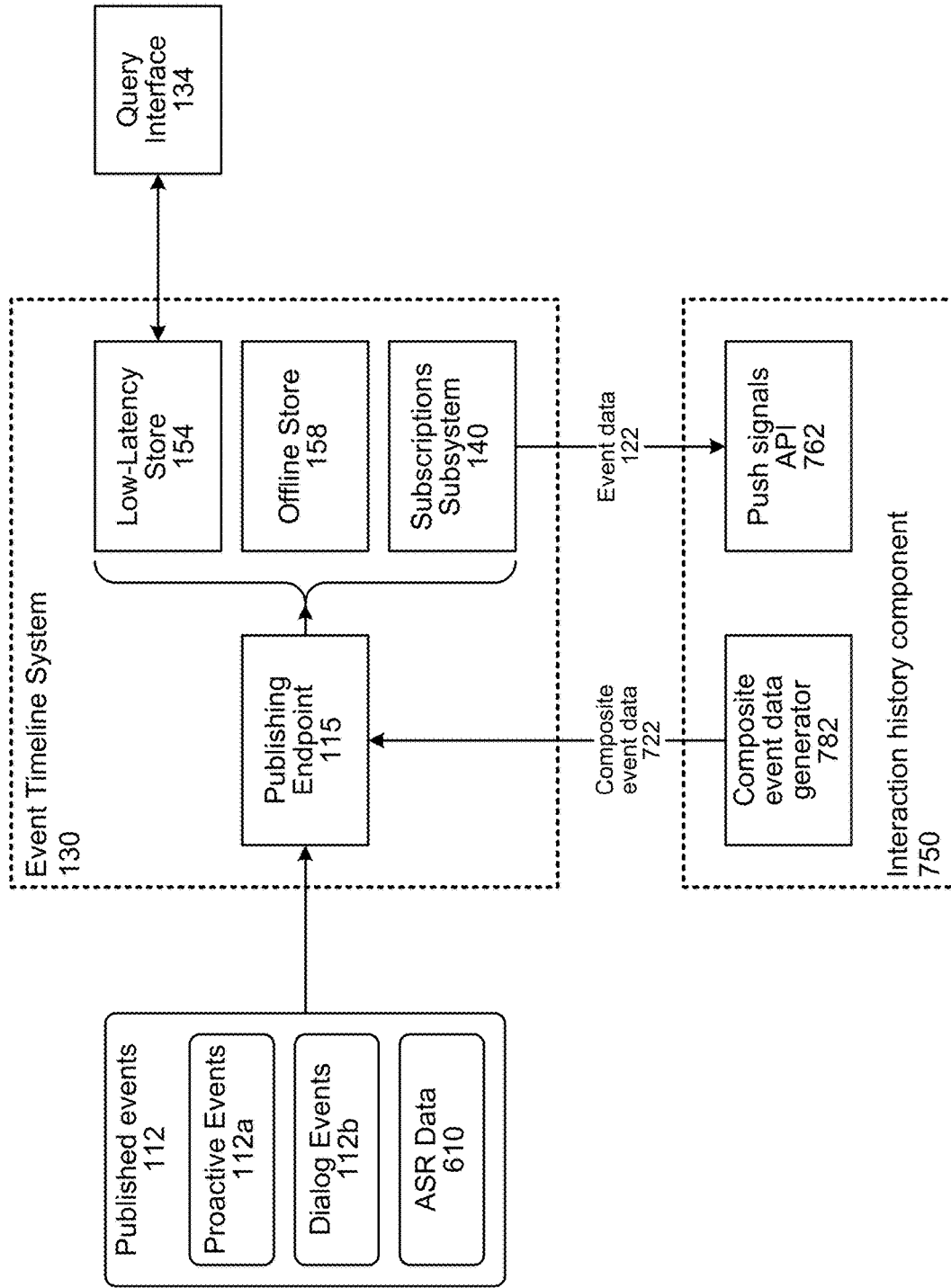
FIG. 7C depicts a block diagram illustrating example interaction between the event timeline system and the interaction history component, according to embodiments of the present disclosure.

FIG. 7C depicts a block diagram illustrating example interaction between the event timeline system 130 and the interaction history component 750, according to embodiments of the present disclosure. The event timeline system 130 may receive various event data 122. The event data 122 are shown by way of example only and may include these and/or any other type of timestamped data generated by a user device 110, accessory device, a system component 120, etc. The event data 122 may include proactive events 112a, which may include notifications, EDA message data, and/or other generated device and/or system events (e.g., generated as part of a system log and/or application log) that may be published using an EDA to the publishing endpoint 115 of the event timeline system 130. The event data 122 may include dialog events 112b (e.g., dialog history) including past turns of dialog between a user 45 and a natural language command processing system 400. The event data 122 may include ASR output data 610, which may include ASR hypotheses for input user speech as well as their associated confidence scores.

The publishing endpoint 115 may send the event data 122 to the appropriate component of event timeline system 130 (e.g., as determined by event router 125 of FIGS. 1 and 5A). The event timeline system may have a runtime event store such as the low-latency store 154 (and/or the long-term store 156 as shown in FIGS. 1 and 5A). The low-latency store 154 may be, for example, a low-latency cache of event data 122 that is persisted for a relatively short time (e.g., during a dialog session) and which may exhibit a faster retrieval time than other data stores such as the long-term store 156 and/or offline store 158. The offline store 158 may store data for bulk access, as previously described. The subscriptions subsystem 140 may be a message broker of an EDA and may publish timestamped event data 122 to subscribing system 145 subscribed to event data 122 of the relevant type, as shown in FIGS. 1 and 5A.

The interaction history component 750 may subscribe to certain event types and thus receive subscribed-to event data 122 at a push signals API 762. The push signals (e.g., event data 122) may represent timestamped events to which the interaction history component 750 subscribes.

The interaction history component 750 may a composite event data generator 782. The composite event data generator 782 may generate the composite event data 722. For example, the composite event data generator 782 may generate the composite event data 722 by combining event data 122 according to predefined event histories (e.g., of a predefined format). For example, a user's vehicle 110c arriving home, followed by a garage door open event, and a door unlock event may be a predefined event history. Such a predefined event history may be useful as context for processing by the natural language command processing system 400 and/or the LLM-based natural language processing system 700. The composite event data generator 782 may include software and/or logic to modify, aggregate, and/or extract values from received event data 122. The composite event data generator 782 may combine the resulting data according to a certain predefined composite event data format or schema. For example, for a particular system log event received, the composite event data generator 782 may extract a value from a particular field for inclusion in composite event data 722 while excluding other information from the system log event. In an aggregation example, the composite event data generator 782 may include all events of a certain type that occurred over a given time period (e.g., the number of times that presence information was detected by a camera device or presence sensor over a 27-hour time period). In still further examples, the event data may be transformed (e.g., according to predefined functions executed by the composite event data generator 782). For example, certain values may be extracted from a received event and may be transformed according to a predefined function. A naïve example may be transforming event data from one unit type (e.g., Fahrenheit) to another unit type (e.g., Celsius).

The interaction history component 750 may send the composite event data 722 to the event timeline system 130 (e.g., to the publishing endpoint 115). The event timeline system 130 may store the composite event data 722 (e.g., in the low-latency store 154, the long-term store 156, and/or the offline store 158) and/or may send the composite event data 722 to one or more subscribing systems 145 (which may include the interaction history component 750) via the asynchronous event-driven architecture. Additionally, consuming systems may use query interface 134 to retrieve the composite event data 722.

Figure 7D:
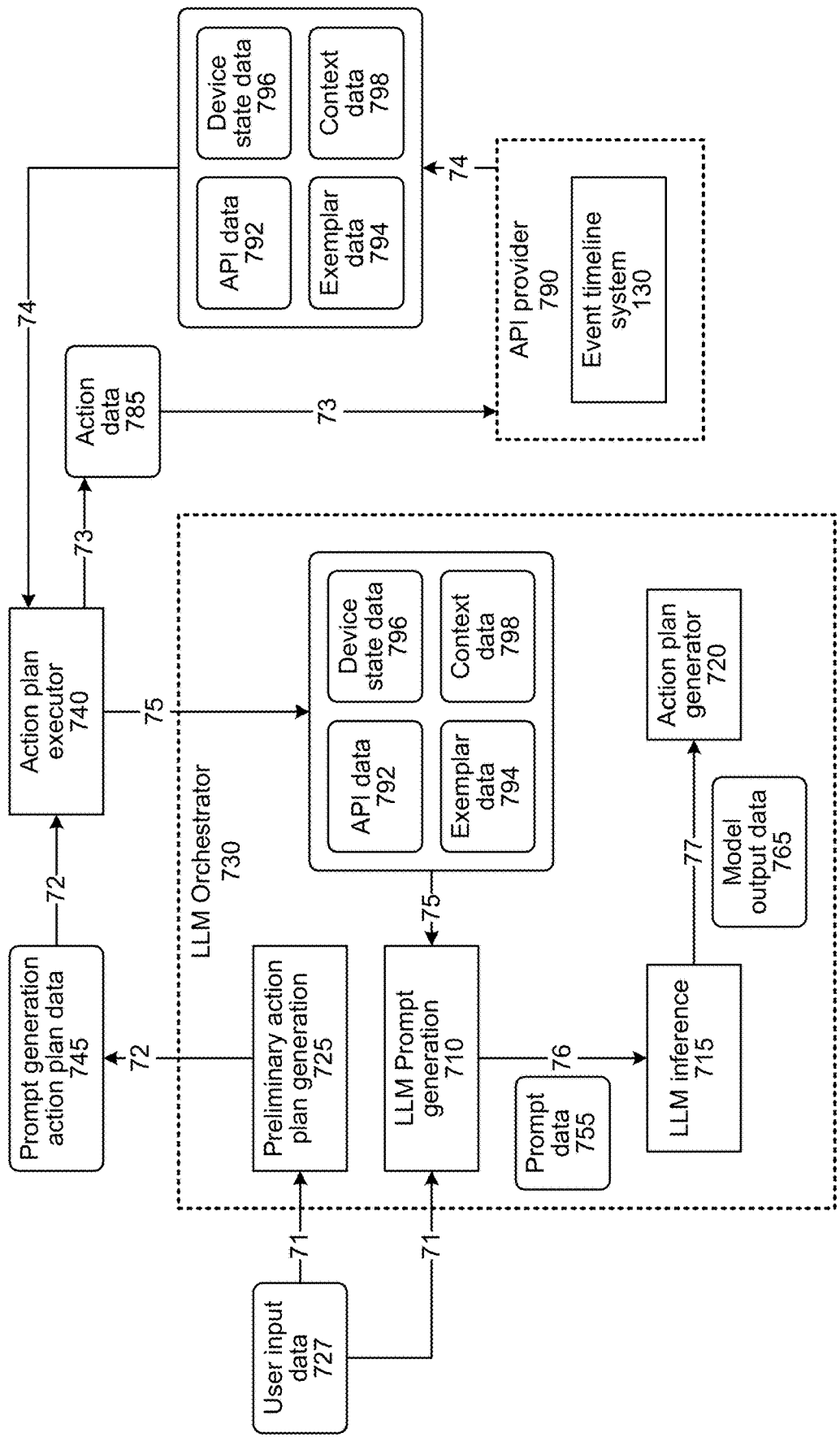
FIG. 7D depicts an example LLM-based natural language processing flow, according to embodiments of the present disclosure.

FIG. 7D depicts an example LLM-based natural language processing flow, according to embodiments of the present disclosure. The example processing flow may occur in an LLM architecture similar to that described above with reference to FIGS. 7A through 7C, etc., and may use the same or similar components. An LLM orchestrator 730 may include a preliminary action plan generation component 725, an LLM prompt generation component 710, an LLM inference component 715, and an action plan generator 720. In some implementations, the LLM inference component 715 may be configured as a generative model.

In some examples, the LLM inference component 715 may be a transformer-based seq2seq model involving an encoder-decoder architecture. In some such embodiments, the LLM inference component 715 may be a multilingual (approximately) 20 billion parameter seq2seq model that is pretrained on a combination of denoising and Causal Language Model (CLM) tasks in various languages (e.g., English, French, German, Arabic, Hindi, Italian, Japanese, Spanish, etc.), and the LLM inference component 715 may be pretrained with approximately 1 trillion tokens. Being trained on CLM tasks, the LLM inference component 715 may be capable of in-context learning. An example of such a LLM is Alexa Teacher Model (Alexa™).

In various examples, the input to the LLM inference component 715 may be in the form of a prompt. A prompt may be a natural language input, for example, an instruction, for the LLM inference component 715 to generate an output according to the prompt. The output generated by the LLM inference component 715 may be a natural language output responsive to the prompt. The prompt and the output may be text in a particular spoken language. For example, for an example prompt "how do I cook beans?", the LLM inference component 715 may output a recipe (e.g., a step-by-step process) to cook beans. As another example, for an example prompt "I am hungry. What restaurants in the area are open?", the LLM may output a list of restaurants near the user that are open at the current time.

The LLM inference component 715 may be configured using various machine learning techniques. In some embodiments, after pretraining, the LLM inference component 715 may be configured (e.g., finetuned) using few-shot learning. In few-shot learning, a pretrained model may how to learn to solve a particular problem. In this approach, the model may be provided with a limited number of examples (e.g., "few shots") corresponding to the target task, and the model may use this information to adapt to that task. Few-shot learning may require fewer training examples than other finetuning techniques.

In some embodiments, the LLM inference component 715 may be configured using one-shot learning. One-shot learning may be similar to few-shot learning, except the model is provided with a single example. In some embodiments, the LLM inference component 715 may be configured using zero-shot learning. In zero-shot learning, the model solves the given problem based on its pretraining and without specific examples representing the target task. For example, a model may attempt to classify data sampled from a class not observed during pretraining.

The LLM orchestrator 730 may be configured to generate a prompt to be used by the LLM inference component 715 to determine an action responsive to a user input. As shown in FIG. 7D, the LLM orchestrator 730 may receive user input data 727 (Step 71). In some instances, the user input data 727 may correspond to text or tokenized representation of a user input. For example, prior to the LLM orchestrator 730 receiving the user input data 727, another component (e.g., the ASR component 450) may receive audio data representing the user input. The ASR component may perform ASR processing on the audio data to determine ASR output data 610 corresponding to the user input. As previously described, the ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 727 may include a top scoring ASR hypothesis of the ASR output data 610.

As illustrated in FIG. 7D, the user input data 727 may be received by a preliminary action plan generation component 725 and an LLM prompt generation component 710 of the LLM orchestrator 730. The preliminary action plan generation component 725 may process the user input data 727 to generate prompt generation action plan data 745 corresponding to an instruction(s) (e.g., a request(s)) for one or more portions of data usable to generate a language model prompt for determining an action responsive to the user input). The one or more portions of data may be data that is determined to be relevant for processing of the user input. In various examples, the event timeline system 130 may be queried to obtain context data 798 that may be used during prompt generation. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 727 represents a user input of "please turn on the kitchen lights every morning at 7 am," then the preliminary action plan generation component 725 may determine prompt generation action plan data 745 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. As previously described, devices and/or services may publish timestamped event data to the event timeline system 130 and the LLM may execute API calls to the query interface 134 of the event timeline system 130 to retrieve such data that may thereafter be used in prompts for subsequent iterations of LLM processing.

For further example, if the user input data 727 represents a user input of "What is the elevation of Mt. Everest," then the preliminary action plan generation component 725 may determine prompt generation action plan data 745 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 745 may include one or more executable API calls usable for retrieving the one or more portions of data from the corresponding component. For example, instructions included in the prompt generation action plan data 745 may include "FETCH_API," "FETCH_EXEMPLAR," "FETCH DEVICE_STATE," "FETCH_CONTEXT," etc., along with optional API arguments/inputs. In some embodiments, the prompt generation action plan data 745 may also include the user input data 727. The prompt generation action plan data 745 may be sent to the action plan executor 740 (Step 72).

In some examples, the preliminary action plan generation component 725 may be configured to process the user input data 727 to determine a representation of the user's request. In various examples, the representation of the user's request may be a reformulation of the user's request. For example, the if the user input data 727 represents a user input of "I have always wanted to travel to Japan, I have heard it is beautiful. How tall is Mt. Fuji?", then the preliminary action plan generation component 725 may determine the representation of the user's request as being "How tall is Mt. Fuji," or the like. The preliminary action plan generation component 725 may generate the prompt generation action plan data 745 using the determined representation of the user's request.

In some examples, the preliminary action plan generation component 725 may implement one or more machine learning (ML) models. A first ML model(s) may be configured to take as input the user input data 727 and generate a representation of the user's request. For example, the ML model may be a text summarization model or a text rewrite model. A second ML model (or the first ML model) may be configured to take as input the representation of the user's request (or the user input data 727) and determine the one or more portions of data relevant for processing of the user input. For example, the second ML model may be a classifier trained to classify the user's request (or the user input data 727) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.).

In other embodiments, the preliminary action plan generation component 725 may be an LLM, similar to the LLM inference component 715. In such embodiments, the architecture may include a further component configured to generate a prompt to be provided to the LLM (e.g., similar to the LLM prompt generation component 710) or the prompt may be generated by the LLM prompt generation component 710. The component may generate a prompt (e.g., according to a template) including the user input data 727 and instructions to determine the one or more portions of data (e.g., contextual data or other types of data) relevant to the processing of the user input. The LLM may process the prompt and generate model output data representing the one or more portions of data (or types of data). The preliminary action plan generation component 725 may process the model output data to determine the prompt generation action plan data 745.

The action plan executor 740 may process the prompt generation action plan data 745 to execute the one or more instructions to retrieve/receive data corresponding to the user input and that may be used to generate the language model prompt (e.g., including time series event data retrieved from the event timeline system 130). As shown in FIG. 7D, the action plan executor 740 may process the prompt generation action plan data 745 to generate action data 785 representing an action included in the prompt generation action plan data 745 (e.g., a single instruction, such as FETCH_CONTEXT). For example, in the situation where the action is represented by an API call, the action data 785 may represent the action plan executor 740 executing the API call included in the prompt generation action plan data 745. The action data 785 may be sent to the API provider component 790 (Step 73). In the situation where the prompt generation action plan data 745 includes more than one instruction, the action plan executor 740 may generate more than one instance of action data 785 (e.g., one instance for each instruction included in the prompt generation action plan data 745) and send each instance to the API provider component 790.

The API provider component 790 may process the (one or more instances of the) action data 785 and cause the retrieval of the (one or more portions of) data associated with the action data 785 (e.g., result data). The API provider component 790 may include a knowledge provider component and/or the event timeline system 130 (among other potential API providers). The knowledge provider component may include an API retrieval component, an exemplar retrieval component, a device state retrieval component, and an "other" context retrieval component. The knowledge provider component may provide the action data 785 to the component(s) configured to determine the data corresponding to the request(s) represented by the action data 785.

For example, the API retrieval component (not shown) may process the action data 785 to generate API data 792 representing one or more APIs that correspond to an action performable with respect to the user input. For example, if the user input corresponds to "turn on the kitchen light," the API retrieval component may determine an API usable to control a device and include an API definition corresponding to the API in the API data 792. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "urn on the kitchen light," the API definition may further include a natural language description of "used to power on a device." In some embodiments, the one or more API definitions may be included in the API data 792 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 792. In some embodiments, the API retrieval component may include the top-n identified API definitions in the API data 792. The API data 792 may be sent to the action plan executor 740 as shown in FIG. 7D (Step 74).

For further example, the exemplar retrieval component may process the action data 785 to generate exemplar data 794 representing one or more exemplars associated with one or more APIs (e.g., the API represented by the API data 792). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 794 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action (device: str)" and "Routine.create_time_trigger (hour: [hour value])" and the current user input "please turn on the kitchen light every day at 7 am," the exemplar retrieval component may select an exemplar representing:
{
Customer: turn on the kitchen light every day at 7 am
Thought: the customer is trying to create a routine
Action: Routine.create_routine (trigger-Routine.create_time_trigger (hour=7), action=Routine.create_turn_on_action (device="kitchen light"))
Observation: routine created successfully
Thought: time to respond
Response: I have created a routine for you. Anything else?
}
Although not illustrated in FIG. 7D, in some embodiments, the API provider component 790 and/or a knowledge provider component may provide the exemplar retrieval component with the action data 785 and a list of API call(s) to which the determined exemplars are to be associated (e.g., the API call(s) included in the API data 792). In some embodiments, the one or more exemplars may be included in the exemplar data 794 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 794. In some embodiments, the exemplar retrieval component may include the top-n identified exemplars in the exemplar data 794. The exemplar data 794 may be sent to the action plan executor 740 as shown in FIG. 7D (Step 74).

As another example, a device state retrieval component (not shown in FIG. 7D) may process the action data 785 to generate device state data 796 representing one or more states of one or more devices associated with/relevant to the user input (e.g., whether the device is powered on or off, a volume level associated with the device, etc.). For example, if the user input corresponds to "Please turn on the kitchen light," the device state data 796 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 796. As previously described, in some examples, the event timeline system 130 may provide the device state data 796 and/or other context data 798. In some embodiments, the one or more devices may be determined to be relevant to the user input based on device profile information. For example, the device state retrieval component may be capable of comparing device profile information for a device (e.g., device identifier, device group identifier, a location associated with the device, etc.) to the user input to determine whether the device is relevant to the user input. In some embodiments, the device state retrieval component may include the top-n identified device states in the device state data 796. The device state data 796 may be sent to the action plan executor 740 as shown in FIG. 7D (Step 74).

As a further example, a context retrieval component (not shown) may process the action data 785 to generate other context data 798 (apart from the device state data 796, the API data 792, the exemplar data 794, etc.) representing one or more contexts associated with/relevant to the user input. For example, the other context data 798 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 798. The other context data 798 may be sent to the action plan executor 740 as shown in FIG. 7D (Step 74).

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 792) indicates that a related API definition was identified, then the knowledge provider component (or another component) may cause the exemplar retrieval component to process to determine one or more exemplars related to the identified API definitions. For further example, if the output of the API retrieval component (e.g., the API data 792) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 725, as discussed above).

The action plan executor 740 may send the data received from the API provider component 790 (e.g., the API data 792, the exemplar data 794, the device state data 796, and the other context data 798) to the LLM prompt generation component 710 (Step 75). The LLM prompt generation component 710 may be configured to generate prompt data 755 (e.g., using the user input data 727, the API data 792, the exemplar data 794, the device state data 796, and/or the other context data 798) to be used by the LLM inference component 715.

In some examples, the LLM prompt generation component 710 may generate the prompt data 755 representing a prompt for input to the LLM inference component 715 (Step 76). The prompt data 755 may include time series event data retrieved from the event timeline system 130 as context (e.g., as context data 798 and/or device state data 796). In some embodiments, such prompt data 755 may be generated based on combining the user input data 727, the API data 792, the exemplar data 794, the device state data 796, and the other context data 798. The prompt data 755 may be an instruction to determine an action(s) responsive to the user input data 727 given the other information (e.g., the API data 792, the exemplar data 794, the device state data 796, the other context data 798) included in the prompt data 755. In some embodiments, the LLM prompt generation component 710 may also include in the prompt data 755 a sample processing format to be used by the LLM inference component 715 when processing the prompt and generating the response. In some embodiments, the prompt data 755 may be generated according to a template format. For example, the prompt data 755 may adhere to a template format of:

{
You have access to the following API's:
[API(s) (e.g., the API data 792)]
Use the following format:
User: the input utterance of a user
Thought: optionally think about what to do
Action: take an action by calling APIs
Observation: what the API execution returns . . . (this thought/action/action input/observation can repeat N times)
Thought: done
Response: the proper response to the user (end of turn)
Examples:
[Exemplar(s) (e.g., the exemplar data 794)]
Context: [device state(s) (e.g., the device state data 796)]
  [other context(s) (e.g., the other context data 798)]
User: [the user input (e.g., the user input data 727)]
}

In some examples, the template format may instruct the LLM inference component 715 as to how it should process to determine the action responsive to the user input and/or how it should generate the output including the action response to the user input. For example, as shown in the example above, the format may include the directive tag "User:" labelling the following string of characters/tokens as the user input. For further example, the format may include the directive tag "Thought:" instructing the LLM inference component 715 to generate an output representing the determined interpretation of the user input by the LLM inference component 715 (e.g., the user is requesting [intent of the user input], the user is trying to [intent of the user Input], etc.) As another example, the format may include the directive tag "Observation:" labeling the following string of characters/tokens as the result of performance of an action determined by the LLM inference component 715/the LLM inference component 715's interpretation of the result of the performance of the action determined by the LLM inference component 715. As a further example, the format may include a directive tag of "Response:" instructing the LLM inference component 715 to generate a response (e.g., a natural language output for a user) to the prompt.

Following such a template format, for example, and for a user input of "turn on the living room light" and corresponding API data, exemplar data, device state data, and other context data, the LLM prompt generation component 710 may generate example prompt data 755a:
{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns . . . (this thought/action/action input/observation can repeat N times)
Thought: done
Response: the proper response to the user (end of turn)
Examples:
User: turn on all indoor lights
Thought: the user is trying to turn lights on
Action: turn_on_device (device="indoor light 1")
turn_on_device (device="indoor light 2")
Observation: success
Thought: time to respond
Response: Anything else I can help you with?
Context: the user has the following devices, bathroom light,
bedroom light, kitchen light, and living room light.
User: turn on the living room light.
}

In some embodiments, the LLM prompt generation component 710 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM inference component 715 processes the prompt data 755 to generate model output data 765 representing an action responsive to the user input. For example, based on processing the example prompt data provided above, the LLM inference component 715 may output model output data 765: {"Thought: the user is trying to turn on the living room light; Action: turn_on_device (device="living room light"),"} or the like. The model output data 765 is sent to the action plan generator 720. The action plan generator 720 may parse the model output data 765 to determine action plan data representing the action generated by the LLM inference component 715 (Step 77). For example, for the model output data 765: "Action: turn_on_device (device="living room light")," the corresponding action plan data may correspond to "turn_on_device (device=" living room light ")" (e.g., corresponding to the action generated by the LLM inference component 715, without the label of "Action"). In some embodiments, the action plan generator 720 may determine an API call corresponding to the "Action" data included in the model output data 765. For example, in some embodiments, the action plan generator 720 may fill in the arguments/inputs, if any, for the API call, which may be included in the action plan data. For further example, in some embodiments, the action plan executor 740 may fill in the arguments/inputs, if any, for the API call.

In some embodiments, the LLM orchestrator 730 (e.g., the action plan generator 720 or another component of the LLM orchestrator 730) may determine whether the LLM inference component 715 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 730 may use a knowledge base, web search, etc. to fact-check information included in the output. It should be noted that the above description generally describes one iteration of LLM-based processing. However, the LLM orchestrator 730 may control the system to execute multiple iterations of LLM-based processing comprising a variety of sub-tasks used to fulfill the input request.

Figure 8A:
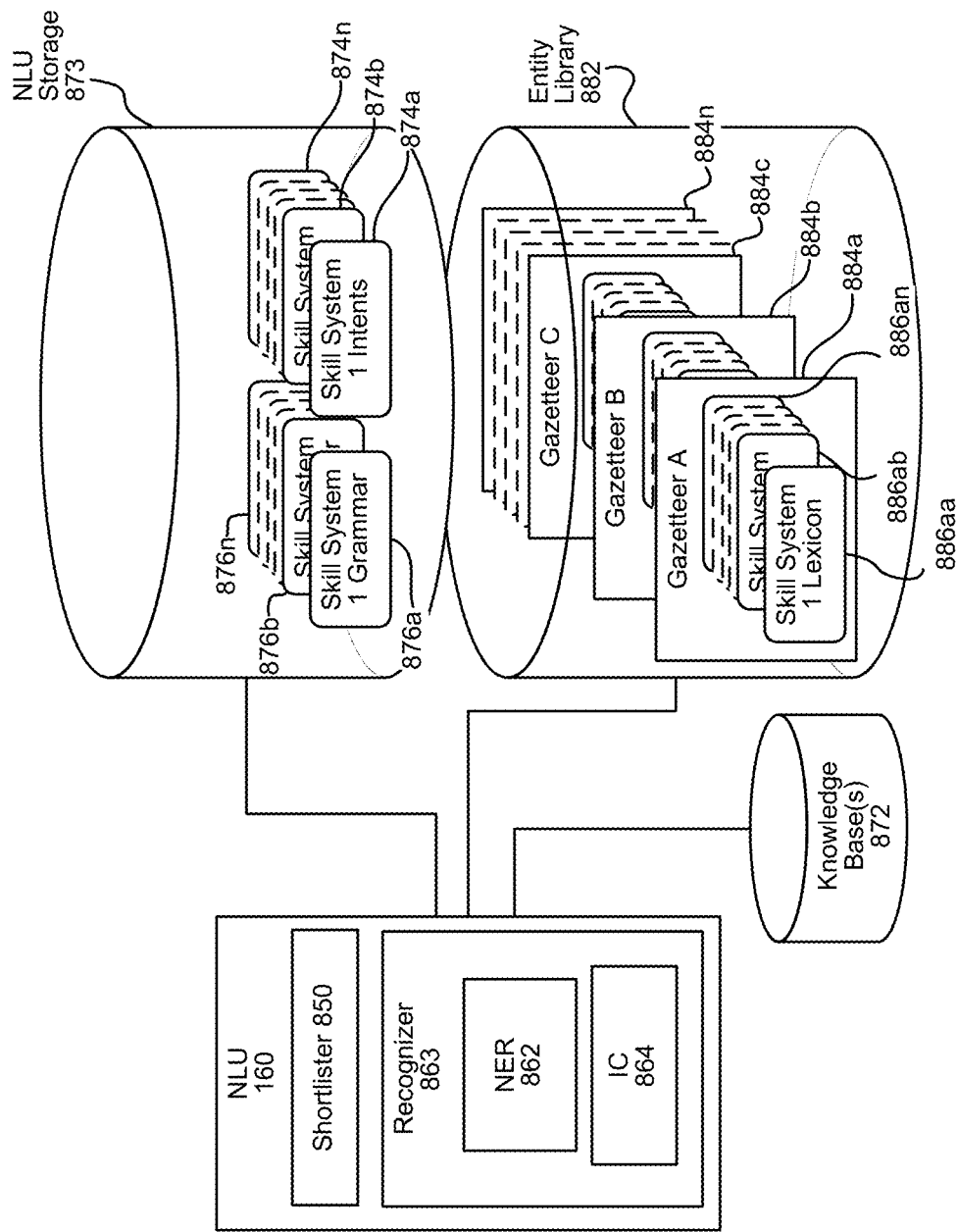
FIG. 8A is a conceptual diagram of an example natural language understanding component, according to embodiments of the present disclosure.
Figure 8B:
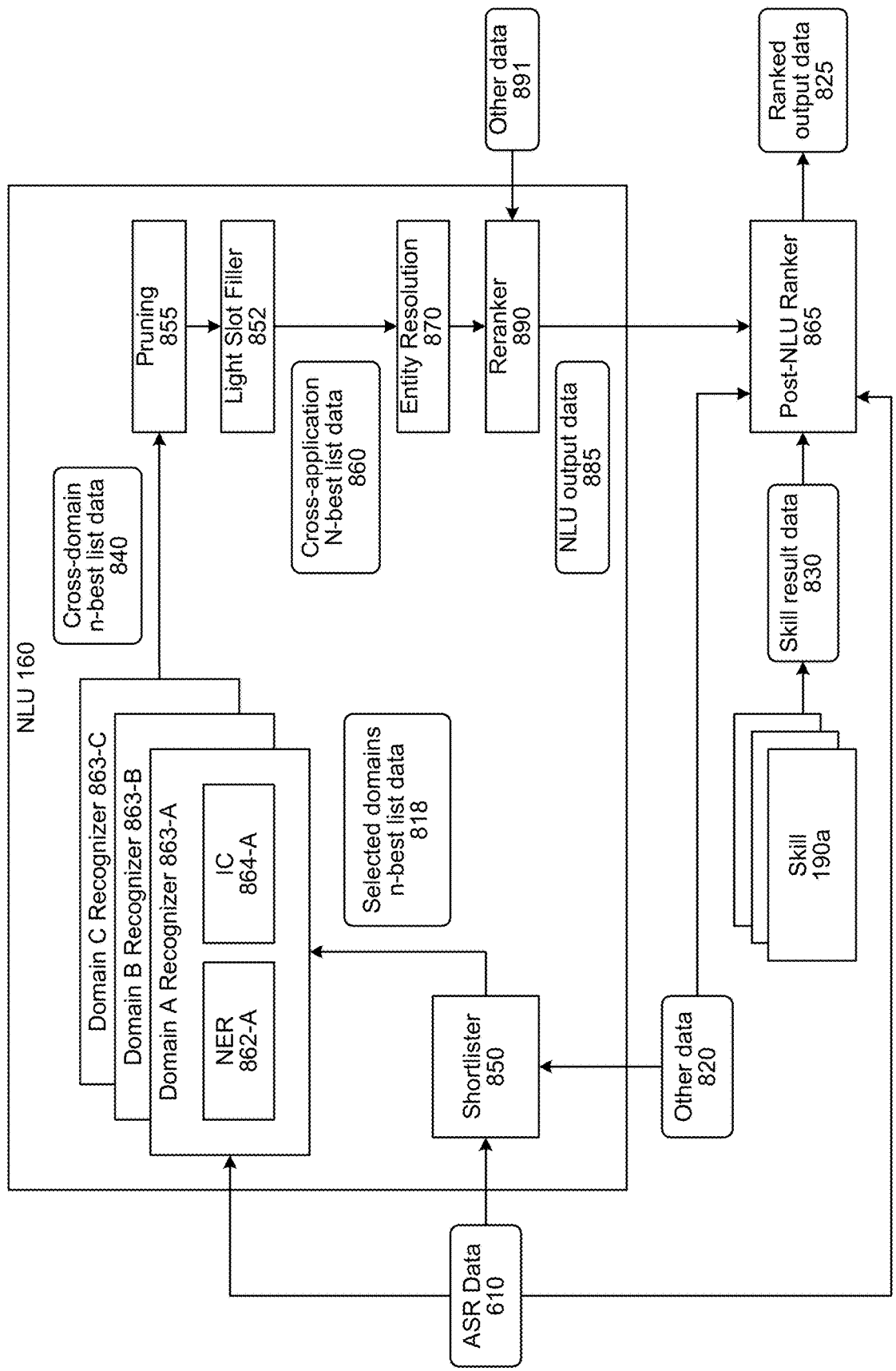
FIG. 8B is a conceptual diagram of how natural language processing is performed, according to embodiments of the present disclosure.

FIGS. 8A and 8B illustrate an example NLU component 160 and how it may perform NLU processing, according to embodiments of the present disclosure. The NLU component 160 may process text data (or representation of text data) including one or more ASR hypotheses corresponding to a user input. For example, if the ASR component 450 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 850. The shortlister component 850 selects skills that may execute with respect to ASR output data 610 input to the NLU component 160 (e.g., applications that may execute with respect to the user input). The ASR output data 610 (which may also be referred to as ASR output data 610) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 160 may process ASR output data 610 input thereto with respect to every skill of the system, either in parallel, in series, or using some combination thereof. By implementing a shortlister component 850, the NLU component 160 may process ASR output data 610 with respect to only the skills that may execute with respect to the user input. This reduces total compute power and latency attributed to NLU processing.

The shortlister component 850 may include one or more trained models. The model(s) may be trained to recognize various forms of user inputs that may be received by the system component(s) 120. For example, during a training period skill system component(s) 195 associated with a skill may provide the system component(s) 120 with training text data representing sample user inputs that may be provided by a user to invoke the skill. For example, for a ride sharing skill, a skill system component(s) 195 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system component(s) 120 may solicit the skill system component(s) 195 associated with the skill regarding whether the determined other user input structures are permissible, from the perspective of the skill system component(s) 195, to be used to invoke the skill. The alternate user input structures may be derived by one or more trained models during model training and/or may be based on user input structures provided by different skills. The skill system component(s) 195 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system component(s) 120 may use the sample user inputs provided by a skill system component(s) 195, and related sample user inputs potentially determined during training, as binary examples to train a model associated with a skill associated with the skill system component(s) 195. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 610 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 160 may include one or more recognizers 863. In at least some embodiments, a recognizer 863 may be associated with a skill system component(s) 195 (e.g., the recognizer may be configured to interpret text data to correspond to the skill system component(s) 195). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 610 is potentially associated with multiple domains, the recognizers 863 associated with the domains may process the ASR output data 610, while recognizers 863 not indicated in the shortlister component 850's output may not process the ASR output data 610. The "shortlisted" recognizers 863 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 160) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884*a*) includes skill-indexed lexical information 886*aa* to 886*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database of intents/actions 874 (e.g., for words linked to intents). For example, a music intent database may link words and phrases such as "quiet," "volume off," and "mute" to a <Mute> intent. An IC component 864 identifies potential intents by comparing words and phrases in text data (representing at least a portion of the user input) to the words and phrases in a database of intents/actions 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 610 output from the ASR component 450 or output from the device 110b (as illustrated in FIG. 8B). The ASR component 450 may embed the ASR output data 610 into a form processable by a trained model(s) using sentence embedding techniques as known in the art. Sentence embedding results in the ASR output data 610 including text in a structure that enables the trained models of the shortlister component 850 to operate on the ASR output data 610. For example, an embedding of the ASR output data 610 may be a vector representation of the ASR output data 610.

The shortlister component 850 may make binary determinations (e.g., yes or no) regarding which domains relate to the ASR output data 610. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 818 representing domains that may execute with respect to the user input represented in the ASR output data 610. The size of the n-best list represented in the n-best list data 818 is configurable. In an example, the n-best list data 818 may indicate every domain of the system as well as contain an indication, for each domain, regarding whether the domain is likely capable to execute the user input represented in the ASR output data 610. In another example, instead of indicating every domain of the system, the n-best list data 818 may only indicate the domains that are likely to be able to execute the user input represented in the ASR output data 610. In yet another example, the shortlister component 850 may implement thresholding such that the n-best list data 818 may indicate no more than a maximum number of domains that may execute the user input represented in the ASR output data 610. In an example, the threshold number of domains that may be represented in the n-best list data 818 is ten. In another example, the domains included in the n-best list data 818 may be limited by a threshold a score, where only domains indicating a likelihood to handle the user input is above a certain score (as determined by processing the ASR output data 610 by the shortlister component 850 relative to such domains) are included in the n-best list data 818.

The ASR output data 610 may correspond to more than one ASR hypothesis. When this occurs, the shortlister component 850 may output a different n-best list (represented in the n-best list data 818) for each ASR hypothesis. Alternatively, the shortlister component 850 may output a single n-best list representing the domains that are related to the multiple ASR hypotheses represented in the ASR output data 610.

As indicated above, the shortlister component 850 may implement thresholding such that an n-best list output therefrom may include no more than a threshold number of entries. If the ASR output data 610 includes more than one ASR hypothesis, the n-best list output by the shortlister component 850 may include no more than a threshold number of entries irrespective of the number of ASR hypotheses output by the ASR component 450. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 850 may generate confidence scores representing likelihoods that domains relate to the ASR output data 610. If the shortlister component 850 implements a different trained model for each domain, the shortlister component 850 may generate a different confidence score for each individual domain trained model that is run. If the shortlister component 850 runs the models of every domain when ASR output data 610 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 610.

N-best list data 818 including confidence scores that may be output by the shortlister component 850 may be represented as, for example:

Search domain, 0.67
Recipe domain, 0.62
Information domain, 0.87
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 820 when determining which domains may relate to the user input represented in the ASR output data 610 as well as respective confidence scores. The other data 820 may include even data 122 provided by the event timeline system 130.

The other data 820 may also include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 610 (e.g., as determined by a user recognition component).

The other data 820 may be character embedded prior to being input to the shortlister component 850. The other data 820 may alternatively be embedded using other techniques known in the art prior to being input to the shortlister component 850.

The other data 820 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 850 receives the ASR output data 610, the shortlister component 850 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 610. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system component(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 818 generated by the shortlister component 850 as well as the different types of other data 820 considered by the shortlister component 850 are configurable. For example, the shortlister component 850 may update confidence scores as the other data 820 is considered. For further example, the n-best list data 818 may exclude relevant domains if thresholding is implemented. Thus, for example, the shortlister component 850 may include an indication of a domain in the n-best list data 818 unless the shortlister component 850 is one hundred percent confident that the domain may not execute the user input represented in the ASR output data 610 (e.g., the shortlister component 850 determines a confidence score of zero for the domain).

The shortlister component 850 may send the ASR output data 610 to recognizers 863 associated with domains represented in the n-best list data 818. Alternatively, the shortlister component 850 may send the n-best list data 818 or some other indicator of the selected subset of domains to another component (such as the orchestrator component 175) which may in turn send the ASR output data 610 to the recognizers 863 corresponding to the domains included in the n-best list data 818 or otherwise indicated in the indicator. If the shortlister component 850 generates an n-best list representing domains without any associated confidence scores, the shortlister component 850/orchestrator component 175 may send the ASR output data 610 to recognizers 863 associated with domains that the shortlister component 850 determines may execute the user input. If the shortlister component 850 generates an n-best list representing domains with associated confidence scores, the shortlister component 850/orchestrator component 175 may send the ASR output data 610 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 160 may compile the output tagged text data of the recognizers 863 into a single cross-domain n-best list data 840 and may send the cross-domain n-best list data 840 to a pruning component 855. Each entry of tagged text (e.g., each NLU hypothesis) represented in the cross-domain n-best list data 840 may be associated with a respective score indicating a likelihood that the NLU hypothesis corresponds to the domain associated with the recognizer 863 from which the NLU hypothesis was output. For example, the cross-domain n-best list data 840 may be represented as (with each line corresponding to a different NLU hypothesis):

[0.98] Intent: <PlayMusic> ArtistName: Beethoven Song-Name: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 855 may sort the NLU hypotheses represented in the cross-domain n-best list data 840 according to their respective scores. The pruning component 855 may perform score thresholding with respect to the cross-domain NLU hypotheses. For example, the pruning component 855 may select NLU hypotheses associated with scores satisfying (e.g., meeting and/or exceeding) a threshold score. The pruning component 855 may also or alternatively perform number of NLU hypothesis thresholding. For example, the pruning component 855 may select the top scoring NLU hypothesis(es). The pruning component 855 may output a portion of the NLU hypotheses input thereto. The purpose of the pruning component 855 is to create a reduced list of NLU hypotheses so that downstream, more resource intensive, processes may only operate on the NLU hypotheses that most likely represents the user's intent.

The NLU component 160 may include a light slot filler component 852. The light slot filler component 852 can take text from slots represented in the NLU hypotheses output by the pruning component 855 and alter them to make the text more easily processed by downstream components. The light slot filler component 852 may perform low latency operations that do not involve heavy operations such as reference to a knowledge base (e.g., 872. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 872) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity identifiers) about the specific entities mentioned in the slots and/or more detailed slot data that can eventually be used by a skill. The NLU component 160 may include multiple entity resolution components 870 and each entity resolution component 870 may be specific to one or more domains.

The NLU component 160 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include even data 122 provided by the event timeline system 130. In another example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, account identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 8-10 hypotheses).

The NLU component 160 may perform NLU processing described above with respect to domains associated with skills wholly implemented as part of the system component(s) 120 (e.g., by the skill system components 195 illustrated in FIG. 4). The NLU component 160 may separately perform NLU processing described above with respect to domains associated with skills that are at least partially implemented as part of the skill system component(s) 195. In an example, the shortlister component 850 may only process with respect to these latter domains. Results of these two NLU processing paths may be merged into NLU results data 885, which may be sent to a post-NLU ranker 865, which may be implemented by the system component(s) 120.

The post-NLU ranker 865 may include a statistical component that produces a ranked list of intent/skill pairs with associated confidence scores. Each confidence score may indicate an adequacy of the skill's execution of the intent with respect to NLU results data associated with the skill. The post-NLU ranker 865 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 865. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 865 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 865 (or other scheduling component such as orchestrator component 175) may solicit the first skill and the second skill to provide potential result data 830 based on the first NLU hypothesis and the second NLU hypothesis, respectively. For example, the post-NLU ranker 865 may send the first NLU hypothesis to the first skill component 190a along with a request for the first skill component 190a to at least partially execute with respect to the first NLU hypothesis. The post-NLU ranker 865 may also send the second NLU hypothesis to the second skill component 190b along with a request for the second skill component 190b to at least partially execute with respect to the second NLU hypothesis. The post-NLU ranker 865 receives, from the first skill component 190a, first result data 830a generated from the first skill component 190a's execution with respect to the first NLU hypothesis. The post-NLU ranker 865 also receives, from the second skill component 190b, second result data 830b generated from the second skill component 190b's execution with respect to the second NLU hypothesis.

The result data 830 may include various portions. For example, the result data 830 may include content (e.g., audio data, text data, and/or video data) to be output to a user. The result data 830 may also include a unique identifier used by the system component(s) 120 and/or the skill system component(s) 195 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 865 may consider the first result data 830a and the second result data 830b to alter the first confidence score and the second confidence score of the first NLU hypothesis and the second NLU hypothesis, respectively. That is, the post-NLU ranker 865 may generate a third confidence score based on the first result data 830a and the first confidence score. The third confidence score may correspond to how likely the post-NLU ranker 865 determines the first skill will correctly respond to the user input. The post-NLU ranker 865 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 865 may also consider the other data 820 to generate the third confidence score and the fourth confidence score. While it has been described that the post-NLU ranker 865 may alter the confidence scores associated with first and second NLU hypotheses, one skilled in the art will appreciate that the post-NLU ranker 865 may alter the confidence scores of more than two NLU hypotheses. The post-NLU ranker 865 may select the result data 830 associated with the skill component 190 with the highest altered confidence score to be the data output in response to the current user input. The post-NLU ranker 865 may also consider the ASR output data 610 to alter the NLU hypotheses confidence scores.

The orchestrator component 175 may, prior to sending the NLU results data 885 to the post-NLU ranker 865, associate intents in the NLU hypotheses with skill components 190. For example, if a NLU hypothesis includes a <PlayMusic> intent, the orchestrator component 175 may associate the NLU hypothesis with one or more skill components 190 that can execute the <PlayMusic> intent. Thus, the orchestrator component 175 may send the NLU results data 885, including NLU hypotheses paired with skill components 190, to the post-NLU ranker 865. In response to ASR output data 610 corresponding to "what should I do for dinner today,"

the orchestrator component 175 may generates pairs of skill components 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 865 queries each skill component 190, paired with a NLU hypothesis in the NLU results data 885, to provide result data 830 based on the NLU hypothesis with which it is associated. That is, with respect to each skill, the post-NLU ranker 865 colloquially asks the skill "if given this NLU hypothesis, what would you do with it." According to the above example, the post-NLU ranker 865 may send skill components 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 865 may query each of the skill components 190 in parallel or substantially in parallel.

A skill component 190 may provide the post-NLU ranker 865 with various data and indications in response to the post-NLU ranker 865 soliciting the skill component 190 for result data 830. A skill component 190 may simply provide the post-NLU ranker 865 with an indication of whether or not the skill can execute with respect to the NLU hypothesis it received. A skill component 190 may also or alternatively provide the post-NLU ranker 865 with output data generated based on the NLU hypothesis it received. In some situations, a skill component 190 may need further information in addition to what is represented in the received NLU hypothesis to provide output data responsive to the user input. In these situations, the skill component 190 may provide the post-NLU ranker 865 with result data 830 indicating slots of a framework that the skill component 190 further needs filled or entities that the skill component 190 further needs resolved prior to the skill component 190 being able to provide result data 830 responsive to the user input. The skill component 190 may also provide the post-NLU ranker 865 with an instruction and/or computer-generated speech indicating how the skill component 190 recommends the system solicit further information needed by the skill component 190. The skill component 190 may further provide the post-NLU ranker 865 with an indication of whether the skill component 190 will have all needed information after the user provides additional information a single time, or whether the skill component 190 will need the user to provide various kinds of additional information prior to the skill component 190 having all needed information. According to the above example, skill components 190 may provide the post-NLU ranker 865 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 830 includes an indication provided by a skill component 190 indicating whether or not the skill component 190 can execute with respect to a NLU hypothesis; data generated by a skill component 190 based on a NLU hypothesis; as well as an indication provided by a skill component 190 indicating the skill component 190 needs further information in addition to what is represented in the received NLU hypothesis.

The post-NLU ranker 865 uses the result data 830 provided by the skill components 190 to alter the NLU processing confidence scores generated by the reranker 890. That is, the post-NLU ranker 865 uses the result data 830 provided by the queried skill components 190 to create larger differences between the NLU processing confidence scores generated by the reranker 890. Without the post-NLU ranker 865, the system may not be confident enough to determine an output in response to a user input, for example when the NLU hypotheses associated with multiple skills are too close for the system to confidently determine a single skill component 190 to invoke to respond to the user input. For example, if the system does not implement the post-NLU ranker 865, the system may not be able to determine whether to obtain output data from a general reference information skill or a medical information skill in response to a user input corresponding to "what is acne."

The post-NLU ranker 865 may prefer skill components 190 that provide result data 830 responsive to NLU hypotheses over skill components 190 that provide result data 830 corresponding to an indication that further information is needed, as well as skill components 190 that provide result data 830 indicating they can provide multiple responses to received NLU hypotheses. For example, the post-NLU ranker 865 may generate a first score for a first skill component 190*a* that is greater than the first skill's NLU confidence score based on the first skill component 190*a* providing result data 830*a* including a response to a NLU hypothesis. For further example, the post-NLU ranker 865 may generate a second score for a second skill component 190*b* that is less than the second skill's NLU confidence score based on the second skill component 190*b* providing result data 830*b* indicating further information is needed for the second skill component 190*b* to provide a response to a NLU hypothesis. Yet further, for example, the post-NLU ranker 865 may generate a third score for a third skill component 190*c* that is less than the third skill's NLU confidence score based on the third skill component 190*c* providing result data 830*c* indicating the third skill component 190*c* can provide multiple responses to a NLU hypothesis.

The post-NLU ranker 865 may consider other data 820 in determining scores. The other data 820 may include rankings associated with the queried skill components 190. A ranking may be a system ranking or a user-specific ranking. A ranking may indicate a veracity of a skill from the perspective of one or more users of the system. For example, the post-NLU ranker 865 may generate a first score for a first skill component 190*a* that is greater than the first skill's NLU processing confidence score based on the first skill component 190*a* being associated with a high ranking. For further example, the post-NLU ranker 865 may generate a second score for a second skill component 190*b* that is less than the second skill's NLU processing confidence score based on the second skill component 190*b* being associated with a low ranking.

The other data 820 may include information indicating whether or not the user that originated the user input has enabled one or more of the queried skill components 190. For example, the post-NLU ranker 865 may generate a first score for a first skill component 190*a* that is greater than the first skill's NLU processing confidence score based on the first skill component 190*a* being enabled by the user that originated the user input. For further example, the post-NLU ranker 865 may generate a second score for a second skill component 190*b* that is less than the second skill's NLU processing confidence score based on the second skill component 190*b* not being enabled by the user that originated the user input. When the post-NLU ranker 865 receives the NLU results data 885, the post-NLU ranker 865 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 865 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 865 may increase the NLU processing confidence score associated with a first skill configured to output visual data and/or decrease the NLU processing confidence score associated with a second skill configured to output audio data.

The other data 820 may include information indicating the veracity of the result data 830 provided by a skill component 190. For example, if a user says "tell me a recipe for pasta sauce," a first skill component 190*a* may provide the post-NLU ranker 865 with first result data 830*a* corresponding to a first recipe associated with a five star rating and a second skill component 190*b* may provide the post-NLU ranker 865 with second result data 830*b* corresponding to a second recipe associated with a one star rating. In this situation, the post-NLU ranker 865 may increase the NLU processing confidence score associated with the first skill component 190*a* based on the first skill component 190*a* providing the first result data 830*a* associated with the five star rating and/or decrease the NLU processing confidence score associated with the second skill component 190*b* based on the second skill component 190*b* providing the second result data 830*b* associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 865 may increase the NLU processing confidence score associated with a first skill component 190*a* corresponding to a room service skill associated with the hotel and/or decrease the NLU processing confidence score associated with a second skill component 190*b* corresponding to a food skill not associated with the hotel.

The other data 820 may include information indicating a location of the device and/or user that originated the user input. The system may be configured with skill components 190 that may only operate with respect to certain geographic locations. For example, a user may provide a user input corresponding to "when is the next train to Portland." A first skill component 190*a* may operate with respect to trains that arrive at, depart from, and pass through Portland, Oregon. A second skill component 190*b* may operate with respect to trains that arrive at, depart from, and pass through Portland, Maine. If the device and/or user that originated the user input is located in Seattle, Washington, the post-NLU ranker 865 may increase the NLU processing confidence score associated with the first skill component 190*a* and/or decrease the NLU processing confidence score associated with the second skill component 190*b*. Likewise, if the device and/or user that originated the user input is located in Boston, Massachusetts, the post-NLU ranker 865 may increase the NLU processing confidence score associated with the second skill component 190*b* and/or decrease the NLU processing confidence score associated with the first skill component 190*a*.

The other data 820 may include information indicating a time of day. The system may be configured with skill components 190 that operate with respect to certain times of day. For example, a user may provide a user input corresponding to "order me food." A first skill component 190*a* may generate first result data 830*a* corresponding to breakfast. A second skill component 190*b* may generate second result data 830*b* corresponding to dinner. If the system component(s) 120 receives the user input in the morning, the post-NLU ranker 865 may increase the NLU processing confidence score associated with the first skill component 190*a* and/or decrease the NLU processing score associated with the second skill component 190*b*. If the system component(s) 120 receives the user input in the afternoon or evening, the post-NLU ranker 865 may increase the NLU processing confidence score associated with the second skill component 190*b* and/or decrease the NLU processing confidence score associated with the first skill component 190*a*.

The other data 820 may include information indicating user preferences. The system may include multiple skill components 190 configured to execute in substantially the same manner. For example, a first skill component 190*a* and a second skill component 190*b* may both be configured to order food from respective restaurants. The system may store a user preference (e.g., in the profile storage 170) that is associated with the user that provided the user input to the system component(s) 120 as well as indicates the user prefers the first skill component 190*a* over the second skill component 190*b*. Thus, when the user provides a user input that may be executed by both the first skill component 190*a* and the second skill component 190*b*, the post-NLU ranker 865 may increase the NLU processing confidence score associated with the first skill component 190*a* and/or decrease the NLU processing confidence score associated with the second skill component 190*b*.

The other data 820 may include information indicating system usage history associated with the user that originated the user input. For example, the system usage history may indicate the user originates user inputs that invoke a first skill component 190*a* more often than the user originates user inputs that invoke a second skill component 190*b*. Based on this, if the present user input may be executed by both the first skill component 190*a* and the second skill component 190*b*, the post-NLU ranker 865 may increase the NLU processing confidence score associated with the first skill component 190*a* and/or decrease the NLU processing confidence score associated with the second skill component 190*b*.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 865 may increase the NLU processing confidence score associated with a first skill component 190*a* that generates audio data. The post-NLU ranker 865 may also or alternatively decrease the NLU processing confidence score associated with a second skill component 190*b* that generates image data or video data.

The other data 820 may include information indicating how long it took a skill component 190 to provide result data 830 to the post-NLU ranker 865. When the post-NLU ranker 865 multiple skill components 190 for result data 830, the skill components 190 may respond to the queries at different speeds. The post-NLU ranker 865 may implement a latency budget. For example, if the post-NLU ranker 865 determines a skill component 190 responds to the post-NLU ranker 865 within a threshold amount of time from receiving a query from the post-NLU ranker 865, the post-NLU ranker 865 may increase the NLU processing confidence score associated with the skill component 190. Conversely, if the post-NLU ranker 865 determines a skill component 190 does not respond to the post-NLU ranker 865 within a threshold amount of time from receiving a query from the post-NLU ranker 865, the post-NLU ranker 865 may decrease the NLU processing confidence score associated with the skill component 190.

It has been described that the post-NLU ranker 865 uses the other data 820 to increase and decrease NLU processing confidence scores associated with various skill components 190 that the post-NLU ranker 865 has already requested result data from. Alternatively, the post-NLU ranker 865 may use the other data 820 to determine which skill components 190 to request result data from. For example, the post-NLU ranker 865 may use the other data 820 to increase and/or decrease NLU processing confidence scores associated with skill components 190 associated with the NLU results data 885 output by the NLU component 160. The post-NLU ranker 865 may select n-number of top scoring altered NLU processing confidence scores. The post-NLU ranker 865 may then request result data 830 from only the skill components 190 associated with the selected n-number of NLU processing confidence scores.

As described, the post-NLU ranker 865 may request result data 830 from all skill components 190 associated with the NLU results data 885 output by the NLU component 160. Alternatively, the system component(s) 120 may prefer result data 830 from skills implemented entirely by the system component(s) 120 rather than skills at least partially implemented by the skill system component(s) 195. Therefore, in the first instance, the post-NLU ranker 865 may request result data 830 from only skills associated with the NLU results data 885 and entirely implemented by the system component(s) 120. The post-NLU ranker 865 may only request result data 830 from skills associated with the NLU results data 885, and at least partially implemented by the skill system component(s) 195, if none of the skills, wholly implemented by the system component(s) 120, provide the post-NLU ranker 865 with result data 830 indicating either data response to the NLU results data 885, an indication that the skill can execute the user input, or an indication that further information is needed.

As indicated above, the post-NLU ranker 865 may request result data 830 from multiple skill components 190. If one of the skill components 190 provides result data 830 indicating a response to a NLU hypothesis and the other skills provide result data 830 indicating either they cannot execute or they need further information, the post-NLU ranker 865 may select the result data 830 including the response to the NLU hypothesis as the data to be output to the user. If more than one of the skill components 190 provides result data 830 indicating responses to NLU hypotheses, the post-NLU ranker 865 may consider the other data 820 to generate altered NLU processing confidence scores, and select the result data 830 of the skill associated with the greatest score as the data to be output to the user.

A system that does not implement the post-NLU ranker 865 may select the highest scored NLU hypothesis in the NLU results data 885. The system may send the NLU hypothesis to a skill component 190 associated therewith along with a request for output data. In some situations, the skill component 190 may not be able to provide the system with output data. This results in the system indicating to the user that the user input could not be processed even though another skill associated with lower ranked NLU hypothesis could have provided output data responsive to the user input.

The post-NLU ranker 865 reduces instances of the aforementioned situation. As described, the post-NLU ranker 865 queries multiple skills associated with the NLU results data 885 to provide result data 830 to the post-NLU ranker 865 prior to the post-NLU ranker 865 ultimately determining the skill component 190 to be invoked to respond to the user input. Some of the skill components 190 may provide result data 830 indicating responses to NLU hypotheses while other skill components 190 may providing result data 830 indicating the skills cannot provide responsive data. Whereas a system not implementing the post-NLU ranker 865 may select one of the skill components 190 that could not provide a response, the post-NLU ranker 865 only selects a skill component 190 that provides the post-NLU ranker 865 with result data corresponding to a response, indicating further information is needed, or indicating multiple responses can be generated.

The post-NLU ranker 865 may select result data 830, associated with the skill component 190 associated with the highest score, for output to the user. Alternatively, the post-NLU ranker 865 may output ranked output data 825 indicating skill components 190 and their respective post-NLU ranker rankings. Since the post-NLU ranker 865 receives result data 830, potentially corresponding to a response to the user input, from the skill components 190 prior to the post-NLU ranker 865 selecting one of the skills or outputting the ranked output data 825, little to no latency occurs from the time skills provide result data 830 and the time the system outputs responds to the user.

If the post-NLU ranker 865 selects result audio data to be output to a user and the system determines content should be output audibly, the post-NLU ranker 865 (or another component of the system component(s) 120) may cause the device 110*a* and/or the device 110*b* to output audio corresponding to the result audio data. If the post-NLU ranker 865 selects result text data to output to a user and the system determines content should be output visually, the post-NLU ranker 865 (or another component of the system component(s) 120) may cause the device 110*b* to display text corresponding to the result text data. If the post-NLU ranker 865 selects result audio data to output to a user and the system determines content should be output visually, the post-NLU ranker 865 (or another component of the system component(s) 120) may send the result audio data to the ASR component 450. The ASR component 450 may generate output text data corresponding to the result audio data. The system component(s) 120 may then cause the device 110*b* to display text corresponding to the output text data. If the post-NLU ranker 865 selects result text data to output to a user and the system determines content should be output audibly, the post-NLU ranker 865 (or another component of the system component(s) 120) may send the result text data to the TTS component 180. The TTS component 180 may generate output audio data (corresponding to computer-generated speech) based on the result text data. The system component(s) 120 may then cause the device 110a and/or the device 110b to output audio corresponding to the output audio data.

As described, a skill component 190 may provide result data 830 either indicating a response to the user input, indicating more information is needed for the skill component 190 to provide a response to the user input, or indicating the skill component 190 cannot provide a response to the user input. If the skill component 190 associated with the highest post-NLU ranker score provides the post-NLU ranker 865 with result data 830 indicating a response to the user input, the post-NLU ranker 865 (or another component of the system component(s) 120, such as the orchestrator component 175) may simply cause content corresponding to the result data 830 to be output to the user. For example, the post-NLU ranker 865 may send the result data 830 to the orchestrator component 175. The orchestrator component 175 may cause the result data 830 to be sent to the device (110a/110b), which may output audio and/or display text corresponding to the result data 830. The orchestrator component 175 may send the result data 830 to the ASR component 450 to generate output text data and/or may send the result data 830 to the TTS component 180 to generate output audio data, depending on the situation.

The skill component 190 associated with the highest post-NLU ranker score may provide the post-NLU ranker 865 with result data 830 indicating more information is needed as well as instruction data. The instruction data may indicate how the skill component 190 recommends the system obtain the needed information. For example, the instruction data may correspond to text data or audio data (i.e., computer-generated speech) corresponding to "please indicate" The instruction data may be in a format (e.g., text data or audio data) capable of being output by the device (110a/110b). When this occurs, the post-NLU ranker 865 may simply cause the received instruction data be output by the device (110a/110b). Alternatively, the instruction data may be in a format that is not capable of being output by the device (110a/110b). When this occurs, the post-NLU ranker 865 may cause the ASR component 450 or the TTS component 180 to process the instruction data, depending on the situation, to generate instruction data that may be output by the device (110a/110b). Once the user provides the system with all further information needed by the skill component 190, the skill component 190 may provide the system with result data 830 indicating a response to the user input, which may be output by the system as detailed above.

The system may include "informational" skill components 190 that simply provide the system with information, which the system outputs to the user. The system may also include "transactional" skill components 190 that require a system instruction to execute the user input. Transactional skill components 190 include ride sharing skills, flight booking skills, etc. A transactional skill component 190 may simply provide the post-NLU ranker 865 with result data 830 indicating the transactional skill component 190 can execute the user input. The post-NLU ranker 865 may then cause the system to solicit the user for an indication that the system is permitted to cause the transactional skill component 190 to execute the user input. The user-provided indication may be an audible indication or a tactile indication (e.g., activation of a virtual button or input of text via a virtual keyboard). In response to receiving the user-provided indication, the system may provide the transactional skill component 190 with data corresponding to the indication. In response, the transactional skill component 190 may execute the command (e.g., book a flight, book a train ticket, etc.). Thus, while the system may not further engage an informational skill component 190 after the informational skill component 190 provides the post-NLU ranker 865 with result data 830, the system may further engage a transactional skill component 190 after the transactional skill component 190 provides the post-NLU ranker 865 with result data 830 indicating the transactional skill component 190 may execute the user input.

In some instances, the post-NLU ranker 865 may generate respective scores for first and second skills that are too close (e.g., are not different by at least a threshold difference) for the post-NLU ranker 865 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 175, post-NLU ranker 865, shortlister 850, or other component may be trained and operated according to various machine learning techniques.

Figure 9:
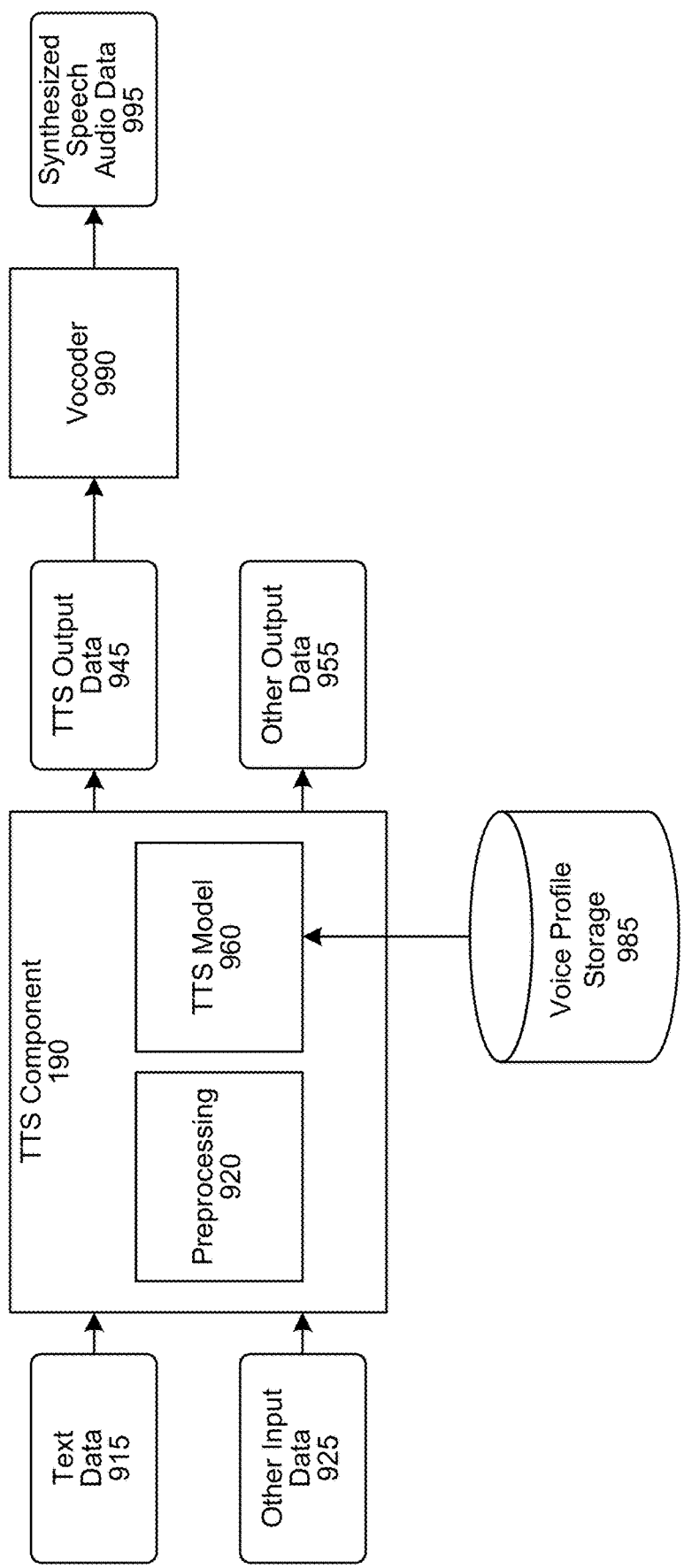
FIG. 9 is a conceptual diagram of an example text-to-speech component according to embodiments of the present disclosure.

FIG. 9 is a conceptual diagram of an example TTS component 180 according to embodiments of the present disclosure. Components of a system that may be used to perform unit selection, parametric TTS processing, and/or model-based audio synthesis are shown in FIG. 9. FIG. 9 is a conceptual diagram that illustrates operations for generating synthesized speech using a TTS component 180, according to embodiments of the present disclosure. The TTS component 180 may receive text data 915 and process it using one or more TTS models 960 to generate TTS output data 945 representing synthesized speech. In some embodiments the TTS output data 945 may represent synthesized speech in the form of, for example, spectrogram data. In other embodiments, the TTS output data 945 may comprise other data, for example data representing a latent representation (e.g., embedding data) representing synthesized speech. A vocoder 990 or other component may convert the TTS output data 945 into synthesized speech audio data 995, which may represent a time-domain waveform suitable for amplification and output as audio (e.g., from a loudspeaker).

The TTS component 180 may additionally receive other input data 925. The other input data 925 may include, for example, identifiers and/or labels corresponding to a desired speaker identity, voice characteristics, emotion, speech style, etc. desired for the synthesized speech. In some implementations, the other input data 925 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 915 and/or the other input data 925 such as metadata accompanying a TTS request and indicating what text should be whispered (or have some other indicated audio characteristic).

The TTS component 180 may include a preprocessing component 920 that can convert the text data 915 and/or other input data 925 into a form suitable for processing by the TTS model 960. The text data 915 may be from, for example an application, a skill component (described further below), an NLG component, another device or source, or may be input by a user. The text data 915 received by the TTS component 180 may not necessarily be text, but may include other data (such as symbols, code, other data, etc.) that may reference text (such as an indicator of a word and/or phoneme) that is to be synthesized. The preprocessing component 920 may transform the text data 915 into, for example, a symbolic linguistic representation, which may include linguistic context features such as phoneme data, punctuation data, syllable-level features, word-level features, and/or emotion, speaker, accent, or other features for processing by the TTS component 180. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 915, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 920 may include functionality and/or components for performing text normalization, linguistic analysis, linguistic prosody generation, or other such operations. During text normalization, the preprocessing component 920 may first process the text data 915 and generate standard text, converting such things as numbers, abbreviations (such as Apt., St., etc.), symbols ($, %, etc.) into the equivalent of written out words.

During linguistic analysis, the preprocessing component 920 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 960 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 920 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

The output of the preprocessing component 920 may be a symbolic linguistic representation, which may include a sequence of phonetic units. In some implementations, the sequence of phonetic units may be annotated with prosodic characteristics. In some implementations, prosody may be applied in part or wholly by a TTS model 960. This symbolic linguistic representation may be sent to the TTS model 960 for conversion into audio data (e.g., in the form of Mel-spectrograms or other frequency content data format).

The TTS component 180 may retrieve one or more previously trained and/or configured TTS models 960 from the voice profile storage 985. A TTS model 960 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 960 may be stored in the voice profile storage 985. A TTS model 960 may represent a particular speaker identity and may be conditioned based on speaking style, emotion, etc. In some implementations, a particular speaker identity may be associated with more than one TTS model 960; for example, with a different model representing a different speaking style, language, emotion, etc. in some implementations, a particular TTS model 960 may be associated with more than one speaker identity; that is, be able to produce synthesized speech that reproduces voice characteristics of more than one character. Thus a first TTS model 960*a* may be used to create synthesized speech for a first user device 110/first system component(s) 120 while a second, different, TTS model 960*b* may be used to create synthesized speech for a second user device 110/second system component(s) 120. In some cases, the TTS model 960 may generate the desired voice characteristics based on conditioning data received or determined from the text data 915 and/or the other input data 925. For example a synthesized voice of the first user device 110/first system component(s) 120 may be different from a synthesized voice of the second user device 110/second system component(s) 120.

The TTS component 180 may, based on an indication received with the text data 915 and/or other input data 925, retrieve a TTS model 960 from the voice profile storage 985 and use it to process input to generate synthesized speech. The TTS component 180 may provide the TTS model 960 with any relevant conditioning labels to generate synthesized speech having the desired voice characteristics. The TTS model 960 may generate TTS output data 945 in the form of, for example, spectrogram data (frequency content data) representing the synthesized speech, and send it to the vocoder 990 for conversion into an audio signal.

The TTS component 180 may generate other output data 955. The other output data 955 may include, for example, indications or instructions for handling and/or outputting the synthesized speech. For example, the text data 915 and/or other input data 925 may be received along with metadata, such as SSML tags, indicating that a selected portion of the text data 915 should be louder or quieter. Thus, the other output data 955 may include a volume tag that instructs the vocoder 990 to increase or decrease an amplitude of the synthesized speech audio data 995 at times corresponding to the selected portion of the text data 915. Additionally or alternatively, a volume tag may instruct a playback device to raise or lower a volume of the synthesized speech from the device's current volume level, or lower a volume of other media being output by the device (e.g., to deliver an urgent message).

The vocoder 990 may convert the TTS output data 945 generated by the TTS model 960 into an audio signal (e.g., an analog or digital time-domain waveform) suitable for amplification and output as audio. The vocoder 990 may be, for example, a universal neural vocoder based on Parallel WaveNet or related model. The vocoder 990 may take as input audio data in the form of, for example, a Mel-spectrogram with 90 coefficients and frequencies ranging from 50 Hz to 12 kHz. The synthesized speech audio data 995 may be a time-domain audio format (e.g., pulse-code modulation (PCM), waveform audio format (WAV), u-law, etc.) that may be readily converted to an analog signal for amplification and output by a loudspeaker. The synthesized speech audio data 995 may consist of, for example, 9-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
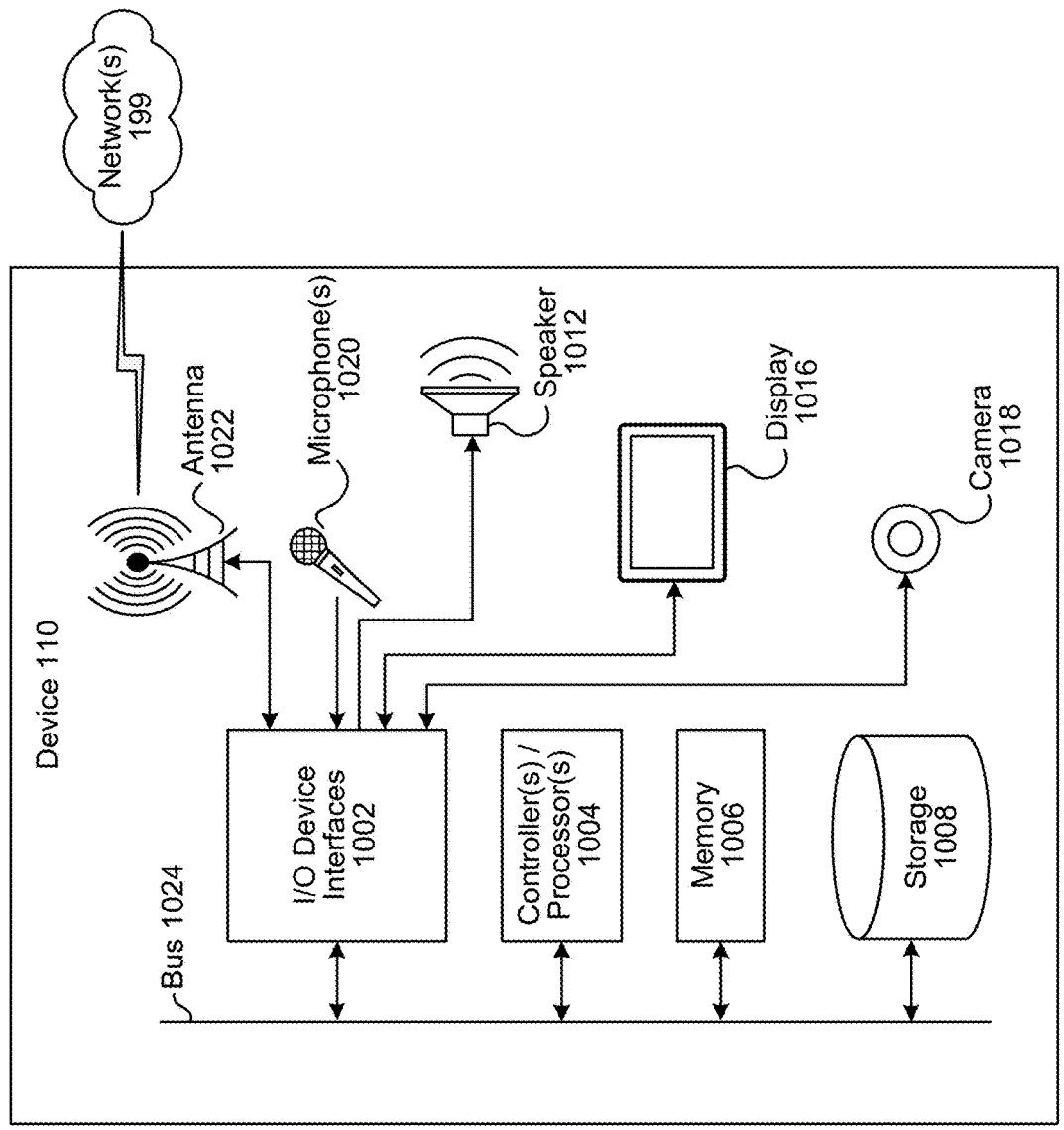
FIG. 10 is a block diagram conceptually illustrating example components of a device, according to embodiments of the present disclosure.
Figure 11:
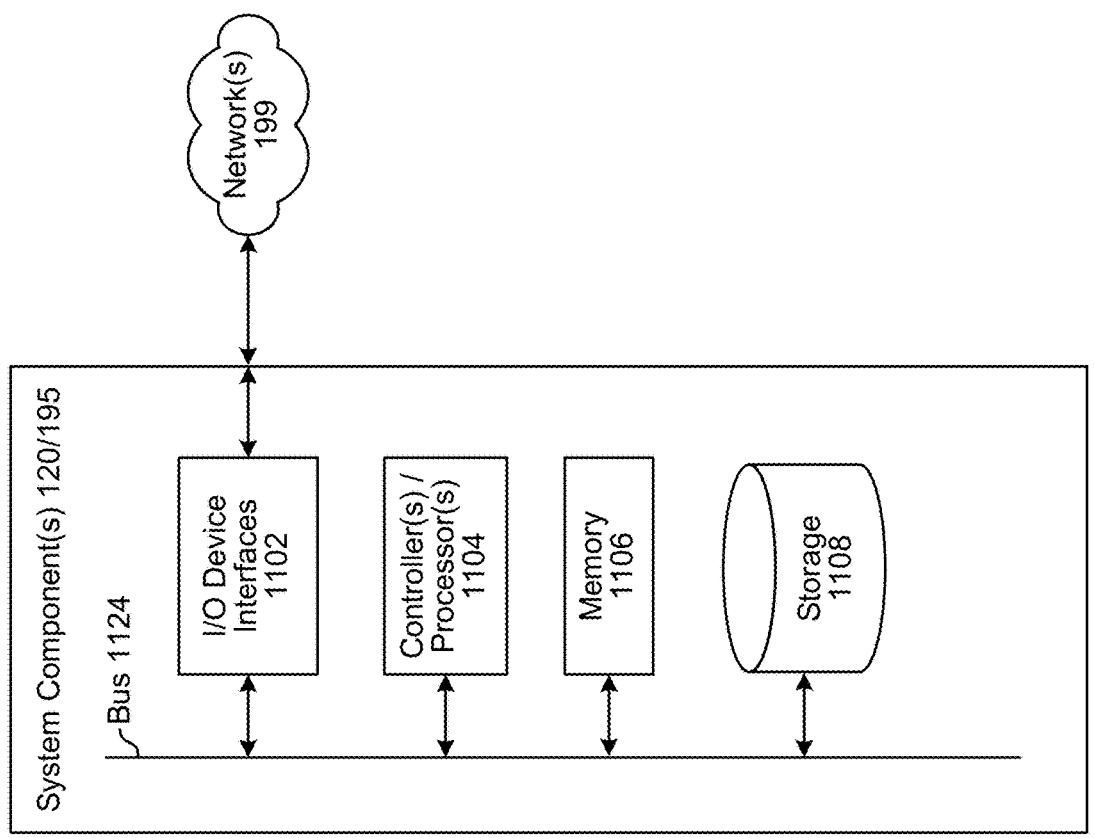
FIG. 11 is a block diagram conceptually illustrating an example system component, according to embodiments of the present disclosure.

FIG. 10 is a block diagram conceptually illustrating a device such as a user device 110 and/or accessory device that may be used with the system 100 and/or 400. FIG. 11 is a block diagram conceptually illustrating example components of a system component 120 a skill system component 195. A system component (120/195) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). In some implementations, the system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/195) may be included in the overall system 100 of the present disclosure, such as one or more natural language processing system component(s) 120 for performing ASR processing, one or more natural language processing system component(s) 120 for performing NLU processing, one or more skill system component(s) 195, etc. In operation, each of these systems may include computer-readable and computer-executable instructions that reside on the respective system component (120/195), as will be discussed further below.

Each of these devices/system components (110/120/195) may include one or more controllers/processors (1004/1104), which may each include a central processing unit (CPU) for processing data and computer-readable instructions, and a memory (1006/1106) for storing data and instructions of the respective device. In some implementations, the processor(s) (1004/1104) may be and/or include one or more graphics processing units, which may improve performance of a device/system component (110/120/195)

when performing training and/or inference using machine learning models such as deep neural networks. The memories (1006/1106) may individually include volatile random-access memory (RAM), non-volatile read only memory (ROM), non-volatile magnetoresistive memory (MRAM), and/or other types of memory. Each device/system component (110/120/195) may also include a data storage component (1008/1108) for storing data and controller/processor-executable instructions. Each data storage component (1008/1108) may individually include one or more non-volatile storage types such as magnetic storage, optical storage, solid-state storage, etc. Each device/system component (110/120/195) may also be connected to removable or external non-volatile memory and/or storage (such as a removable memory card, memory key drive, networked storage, etc.) through respective input/output device interfaces (1002/1102).

Computer instructions for operating each device/system component (110/120/195) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device/system component (110/120/195) includes input/output device interfaces (1002/1102). A variety of components may be connected through the input/output device interfaces (1002/1102), as will be discussed further below. Additionally, each device/system component (110/120/195) may include an address/data bus (1024/1124) for conveying data among components of the respective device. Each component within a device/system component (110/120/195) may also be directly connected to other components in addition to (or instead of) being connected to other components across the bus (1024/1124).

Referring to FIG. 11, the user device 110 may include input/output device interfaces 1002 that connect to a variety of components such as an audio output component such as a speaker 1012, a wired headset or a wireless headset (not illustrated), or other component capable of outputting audio. The user device 110 may also include an audio capture component. The audio capture component may be, for example, a microphone 1020 or array of microphones, a wired headset, or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1016 for displaying content. The user device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the user device(s) 110, the natural language command processing system component(s), or a skill system component(s) 195 may include their own dedicated processors, memory, and/or storage. Alternatively, one or more of the components of the user device(s) 110, the natural language command processing system component(s), or a skill system component(s) 195 may utilize the I/O interfaces (1002/1102), processor(s) (1004/1104), memory (1006/1106), and/or storage (1008/1108) of the user device(s) 110, natural language command processing system component(s), or the skill system component(s) 195, respectively. Thus, the ASR component 450 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s), and a skill system component(s) 195, as described herein, are illustrative, and may be located as a stand-alone device or may be included, in whole or in part, as a component of a larger device or system. As can be appreciated, a number of components may exist either on a system component(s) and/or on user device 110. Unless expressly noted otherwise, the system component version of such components may operate similarly to the user device version of such components and thus the description of one version (e.g., the system component version or the user device version) applies to the description of the other version (e.g., the user device version or system component version) and vice-versa.

Figure 12:
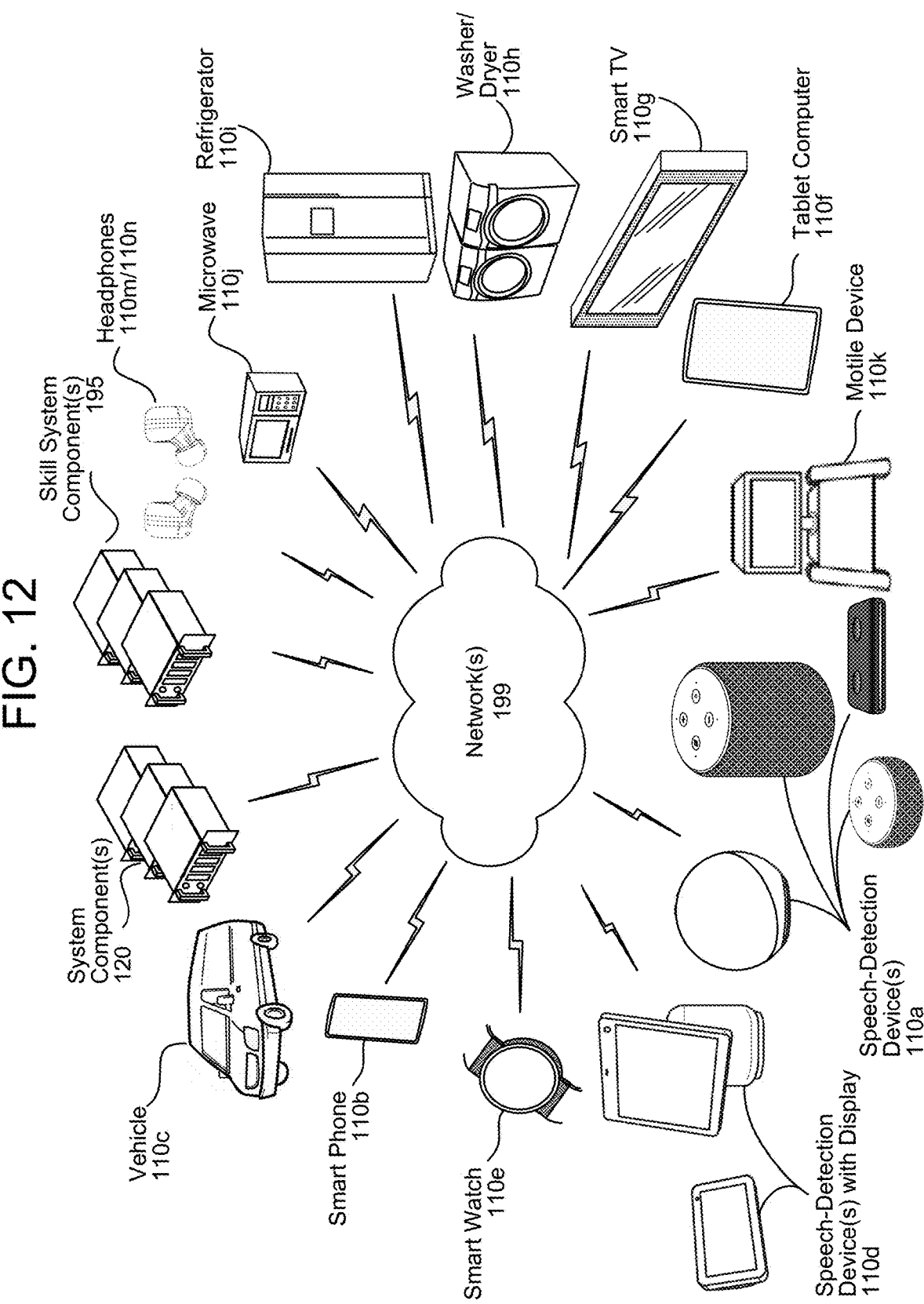
FIG. 12 illustrates an example of a computer network for use with the overall system, according to embodiments of the present disclosure.

As illustrated in FIG. 12, multiple devices/system components (110a-110n, 120, 195) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a vehicle 110c, a speech-detection device with display 110d, a smart watch 110e, a tablet computer 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 195, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 160, etc. of the natural language command processing system component(s) 120.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first event data representing a first user interaction with a computer system;
   determining that the first event data corresponds to a first attribute of an attribute category;
   generating a first key-value pair for storing the first event data, the first key-value pair having a first key corresponding to a first event identifier and the first attribute, and a first value representing a first aspect of the first user interaction;
   generating a second key-value pair representing a first index update corresponding to storage of the first key-value pair, the second key-value pair having a second key corresponding to the first attribute and a second value representing the first event identifier;
   receiving an indication to implement a compound index representing an operation with respect to the first attribute and a second attribute of the attribute category, the compound index corresponding to a label;
   receiving second event data representing a second user interaction with the computer system;
   determining that the second event data corresponds to the first attribute;
   generating a third key-value pair for storing the second event data, the third key-value pair having a third key corresponding to a second event identifier and the first attribute, and a third value representing a second aspect of the second user interaction;
   determining that the second event data corresponds to the operation;
   in response to determining that the second event data corresponds to the operation, generating a fourth key-value pair representing a second index update corresponding to storage of the third key-value pair, the fourth key-value pair having a fourth key corresponding to the label and a fourth value representing the second event identifier;
   receiving a first query corresponding to the compound index; and
   sending, in response to the first query, a plurality of key-value pairs corresponding to the label, the plurality of key-value pairs including the third key-value pair.

2. The computer-implemented method of claim 1, further comprising:
   prior to receiving the indication:
      receiving first data representing: (i) a second query corresponding to a first account identifier and the first attribute, and (ii) a third query corresponding to the first account identifier and the second attribute;
      determining, using the first data, the operation to represent returning first key-value pairs corresponding to the first attribute and second key-value pairs corresponding to the second attribute; and
      generating the label to represent the compound index.

3. The computer-implemented method of claim 1, further comprising:
   prior to receiving the indication:
      receiving first data representing a request to generate the compound index;
      determining, using the first data, that the operation represents returning first key-value pairs corresponding to the first attribute and second key-value pairs corresponding to the second attribute; and
      determining the label to represent the compound index.

4. The computer-implemented method of claim 1, further comprising:

in response to determining that the second event data corresponds to the operation, storing the third key-value pair in a first storage component corresponding to first storage characteristics;
receiving third event data representing a third user interaction with the computer system;
determining that the third event data does not correspond to the operation; and
in response to determining that the third event data does not correspond to the operation, storing a fifth key-value pair representing the third event data in a second storage component corresponding to second storage characteristics, the first storage characteristics representing a faster retrieval time than the second storage characteristics.

5. A computer-implemented method comprising:
receiving first data for storage in a computer system;
determining a first attribute of the first data;
generating a first key-value pair having a first key corresponding to the first attribute and a first value representing the first data;
storing the first key-value pair in one or more data storage components of the computer system;
associating a first identifier corresponding to the first key-value pair with the first attribute;
receiving an indication to implement a compound index corresponding to the first attribute and a second attribute, the compound index corresponding to a label;
receiving second data for storage in the computer system;
determining that the second data corresponds to the first attribute;
generating a second key-value pair having a second key corresponding to the first attribute and a second value representing the second data;
determining that the second data corresponds to the compound index;
in response to determining that the second data corresponds to the compound index, associating a second identifier corresponding to the second key-value pair with the label; and
storing the second key-value pair in the one or more data storage components.

6. The computer-implemented method of claim 5, further comprising:
receiving, from a first system component, a request for data corresponding to the first attribute and a second attribute;
determining that the request corresponds to the compound index;
retrieving, from the one or more data storage components, a plurality of key-value pairs corresponding to the label, the plurality of key-value pairs including the second key-value pair; and
sending, to the first system component, the plurality of key-value pairs.

7. The computer-implemented method of claim 6, further comprising:
receiving a natural language input;
generating first prompt data using the natural language input;
generating, by a large language model (LLM) using the first prompt data, a first directive to send the request to a second system component;
receiving, from the second system component in response to the request, the plurality of key-value pairs;
generating second prompt data using the natural language input and the plurality of key-value pairs; and
generating, by the LLM using the second prompt data, a natural language output responsive to the natural language input.

8. The computer-implemented method of claim 5, further comprising:
receiving third data representing: a first request corresponding to a first account identifier and the first attribute, and a second request corresponding to the first account identifier and the second attribute;
determining, using the third data, an operation to represent returning key-value pairs corresponding to the first attribute or the second attribute; and
generating the label to represent the operation.

9. The computer-implemented method of claim 5, further comprising:
receiving a user request to generate the compound index;
determining an operation to represent returning key-value pairs corresponding to the first attribute or the second attribute; and
generating the label to represent the operation.

10. The computer-implemented method of claim 5, further comprising:
in response to determining that the second data corresponds to the compound index, storing the second key-value pair in a first data storage component corresponding to first storage characteristics;
receiving third data for storage in the computer system; and
storing a third key-value pair corresponding to the third data in a second data storage component corresponding to second storage characteristics different from the first storage characteristics.

11. The computer-implemented method of claim 5, further comprising:
receiving a natural language input;
generating, by a large language model (LLM) using the natural language input, a first directive to send a first request to a first interface of a first computer-implemented system;
receiving the first data from the first computer-implemented system in response to the first request, the first data representing a first timestamped event associated with a first device; and
generating, by the LLM using the natural language input and the first data, a first output action responsive to the natural language input.

12. The computer-implemented method of claim 5, further comprising:
receiving first audio data representing a user utterance;
performing speech processing of the first audio data to determine intent data representing an intent corresponding to the user utterance;
processing the intent data to determine response data representing a response to the user utterance;
sending the response data to a user device, the response data causing the user device to perform an action in response to the user utterance;
receiving third data from the user device, the third data representing a result of the user device performing the action; and
generating the first data using the intent data, the response data, and the third data.

13. A system, comprising:
at least one processor; and
at least one memory comprising instructions that, when executed by the at least one processor, cause the system to:

receive first data for storage in a computer system;
determine a first attribute of the first data;
generate a first key-value pair having a first key corresponding to the first attribute and a first value representing the first data;
store the first key-value pair in one or more data storage components of the computer system;
associate a first identifier corresponding to the first key-value pair with the first attribute;
receive an indication to implement a compound index corresponding to the first attribute and a second attribute, the compound index corresponding to a label;
receive second data for storage in the computer system;
determine that the second data corresponds to the first attribute;
generate a second key-value pair having a second key corresponding to the first attribute and a second value representing the second data;
determine that the second data corresponds to the compound index;
in response to determining that the second data corresponds to the compound index, associate a second identifier corresponding to the second key-value pair with the label; and
store the second key-value pair in the one or more data storage components.

14. The system of claim 13, wherein the instructions further cause the system to:
receive, from a first system component, a request for data corresponding to the first attribute and a second attribute;
determine that the request corresponds to the compound index;
retrieve, from the one or more data storage components, a plurality of key-value pairs corresponding to the label, the plurality of key-value pairs including the second key-value pair; and
send, to the first system component, the plurality of key-value pairs.

15. The system of claim 14, wherein the instructions further cause the system to:
receive a natural language input;
generate first prompt data using the natural language input;
generate, by a large language model (LLM) using the first prompt data, a first directive to send the request to a second system component;
receive, from the second system component in response to the request, the plurality of key-value pairs;
generate second prompt data using the natural language input and the plurality of key-value pairs; and
generate, by the LLM using the second prompt data, a natural language output responsive to the natural language input.

16. The system of claim 13, wherein the instructions further cause the system to:
receive third data representing: a first request corresponding to a first account identifier and the first attribute, and a second request corresponding to the first account identifier and the second attribute;
determine, using the third data, an operation to represent returning key-value pairs corresponding to the first attribute or the second attribute; and
generate the label to represent the operation.

17. The system of claim 13, wherein the instructions further cause the system to:
receive a user request to generate the compound index;
determine an operation to represent returning key-value pairs corresponding to the first attribute or the second attribute; and
generate the label to represent the operation.

18. The system of claim 13, wherein the instructions further cause the system to:
in response to determining that the second data corresponds to the compound index, store the second key-value pair in a first data storage component corresponding to first storage characteristics;
receive third data for storage in the computer system; and
store a third key-value pair corresponding to the third data in a second data storage component corresponding to second storage characteristics different from the first storage characteristics.

19. The system of claim 13, wherein the instructions further cause the system to:
receive a natural language input;
generate, by a large language model (LLM) using the natural language input, a first directive to send a first request to a first interface of a first computer-implemented system;
receive the first data from the first computer-implemented system in response to the first request, the first data representing a first timestamped event associated with a first device; and
generate, by the LLM using the natural language input and the first data, a first output action responsive to the natural language input.

20. The system of claim 13, wherein the instructions further cause the system to:
receive first audio data representing a user utterance;
perform speech processing of the first audio data to determine intent data representing an intent corresponding to the user utterance;
process the intent data to determine response data representing a response to the user utterance;
send the response data to a user device, the response data causing the user device to perform an action in response to the user utterance;
receive third data from the user device, the third data representing a result of the user device performing the action; and
generate the first data using the intent data, the response data, and the third data.

* * * * *